United States Patent
Shelby et al.

(10) Patent No.: US 12,085,406 B2
(45) Date of Patent: Sep. 10, 2024

(54) VENUES MAP APPLICATION AND SYSTEM

(71) Applicant: Apple Inc., Cupertino, CA (US)

(72) Inventors: Ryan D. Shelby, Mountain View, CA (US); Ryan W. Apuy, San Francisco, CA (US); Vincent P. Arroyo, Union City, CA (US); Sunny Chan, Cupertino, CA (US); Jae Woo Chang, Cupertino, CA (US); Megan M. Frost, Menlo Park, CA (US); Brett L. Lareau, San Jose, CA (US); Sean P. O'Brien, San Francisco, CA (US); Tadayasu Sasada, Cupertino, CA (US); Sebastian A. Araya, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/056,162

(22) Filed: Nov. 16, 2022

(65) Prior Publication Data
US 2023/0152118 A1 May 18, 2023

Related U.S. Application Data

(63) Continuation of application No. 17/245,722, filed on Apr. 30, 2021, now Pat. No. 11,536,585, which is a
(Continued)

(51) Int. Cl.
*G06F 17/00* (2019.01)
*G01C 21/20* (2006.01)
(Continued)

(52) U.S. Cl.
CPC ....... *G01C 21/3682* (2013.01); *G01C 21/206* (2013.01); *G01C 21/3614* (2013.01);
(Continued)

(58) Field of Classification Search
CPC ............ G01C 21/206; G01C 21/3638; G01C 21/367; G01C 21/3682; G01C 21/3614;
(Continued)

(56) References Cited

U.S. PATENT DOCUMENTS

| 7,130,742 B2 | 10/2006 | Kobuya et al. |
| 7,920,072 B2 * | 4/2011 | Smith .................. G09B 29/007 340/995.1 |

(Continued)

FOREIGN PATENT DOCUMENTS

| CN | 101983315 A | 3/2011 |
| CN | 102762955 A | 10/2012 |

(Continued)

OTHER PUBLICATIONS

Ozdenizci et al., Development of an Indoor Navigation System Using NFC Technology, 2011, IEEE, pp. 11-14 (Year: 2011).*

(Continued)

*Primary Examiner* — Laurie A Ries
(74) *Attorney, Agent, or Firm* — Invoke

(57) ABSTRACT

In some implementations, a computing device can provide a map application providing a representation of a physical structure of venues (e.g., shopping centers, airports) identified by the application. In addition, the application can provide an inside view that includes the physical layout and geometry of the venue's structure as well as the location, structure and layout of points of interest (e.g., stores, security check points, restrooms) within the venue. The views become more detailed as the user zooms into the venue to reveal points of interest and to give the user a feel for traversing the venue.

29 Claims, 71 Drawing Sheets

Related U.S. Application Data continuation of application No. 15/990,456, filed on May 25, 2018, now Pat. No. 11,029,173.

(60) Provisional application No. 62/514,547, filed on Jun. 2, 2017.

(51) Int. Cl.
| | |
|---|---|
| *G01C 21/36* | (2006.01) |
| *G06F 3/04815* | (2022.01) |
| *G06F 3/0482* | (2013.01) |
| *G06F 3/04845* | (2022.01) |
| *G06F 16/00* | (2019.01) |
| *G06F 16/29* | (2019.01) |
| *G06F 16/9535* | (2019.01) |
| *G06F 16/9537* | (2019.01) |
| *G06T 17/05* | (2011.01) |
| *G09B 29/10* | (2006.01) |
| *G06Q 90/00* | (2006.01) |
| *G06T 13/20* | (2011.01) |

(52) U.S. Cl.
CPC ....... *G01C 21/3638* (2013.01); *G01C 21/367* (2013.01); *G01C 21/3673* (2013.01); *G06F 3/04815* (2013.01); *G06F 3/0482* (2013.01); *G06F 3/04845* (2013.01); *G06F 16/00* (2019.01); *G06F 16/29* (2019.01); *G06F 16/9535* (2019.01); *G06F 16/9537* (2019.01); *G06T 17/05* (2013.01); *G09B 29/10* (2013.01); *G09B 29/102* (2013.01); *G01C 21/3611* (2013.01); *G01C 21/3617* (2013.01); *G06F 2203/04806* (2013.01); *G06Q 90/20* (2013.01); *G06T 13/20* (2013.01)

(58) Field of Classification Search
CPC ............ G01C 21/3673; G01C 21/3611; G01C 21/3617; G01C 21/3415; G01C 21/3492; G01C 21/3641; G01C 21/3811; G01C 21/383; G06F 3/04815; G06F 3/0482; G06F 2203/04806; G06F 3/04845; G06F 16/00; G06F 16/29; G06F 16/9535; G06F 16/9537; G06T 13/20; G06T 17/05; G06T 19/003; G09B 29/10; G09B 29/102; G06Q 90/20

See application file for complete search history.

(56) References Cited

U.S. PATENT DOCUMENTS

| | | | |
|---|---|---|---|
| 8,010,279 B2 | 8/2011 | Kobuya et al. | |
| 8,112,299 B2 | 2/2012 | Kim et al. | |
| 8,464,181 B1 | 6/2013 | Bailiang et al. | |
| 8,490,025 B2 | 7/2013 | Jakobson et al. | |
| 8,817,049 B2 | 8/2014 | Ofek et al. | |
| 8,823,734 B1 | 9/2014 | Bailiang | |
| 8,868,337 B2 | 10/2014 | Pierfelice | |
| 8,928,657 B2 | 1/2015 | Bailiang | |
| 8,972,186 B2 | 3/2015 | Kobuya et al. | |
| 9,113,309 B2 | 8/2015 | Uilecan et al. | |
| 9,310,205 B2 | 4/2016 | Xu et al. | |
| 9,311,750 B2* | 4/2016 | Moore ................ | G06F 3/04883 |
| 9,323,420 B2 | 4/2016 | Bailiang et al. | |
| 9,417,777 B2 | 8/2016 | Pensack-Rinehart et al. | |
| 9,423,268 B2 | 8/2016 | Blumenberg et al. | |
| 9,467,660 B1* | 10/2016 | Edelstein ................ | H04N 7/18 |
| 9,488,481 B2 | 11/2016 | Javed et al. | |
| 9,525,976 B2 | 12/2016 | Dharwada et al. | |
| 9,538,332 B1 | 1/2017 | Mendelson | |
| 9,600,544 B2 | 3/2017 | Snellman et al. | |
| 9,626,025 B2 | 4/2017 | Suzuki | |
| 9,629,118 B2 | 4/2017 | Rhoads | |
| 9,646,416 B2 | 5/2017 | Kishikawa et al. | |
| 9,891,070 B2 | 2/2018 | Park et al. | |
| 10,008,046 B2 | 6/2018 | Suni et al. | |
| 10,030,979 B2 | 7/2018 | Bjorke et al. | |
| 10,057,399 B2 | 8/2018 | Song et al. | |
| 10,108,693 B2 | 10/2018 | Edecker et al. | |
| 10,185,788 B2 | 1/2019 | Wither et al. | |
| 10,281,289 B2 | 5/2019 | Nevrekar et al. | |
| 10,489,014 B2 | 11/2019 | Greenwald et al. | |
| 10,636,207 B1 | 4/2020 | Swidersky et al. | |
| 10,753,762 B2 | 8/2020 | Shelby et al. | |
| 11,193,788 B2 | 12/2021 | Shelby et al. | |
| 2001/0025278 A1 | 9/2001 | Yourlo et al. | |
| 2006/0069504 A1 | 3/2006 | Bradley et al. | |
| 2006/0238383 A1* | 10/2006 | Kimchi ................ | G09B 29/106 340/995.1 |
| 2008/0109718 A1 | 5/2008 | Narayanaswami | |
| 2009/0144143 A1 | 6/2009 | Iyer | |
| 2009/0172600 A1 | 7/2009 | Yajun et al. | |
| 2009/0198767 A1 | 8/2009 | Jakobson et al. | |
| 2009/0201176 A1 | 8/2009 | Shimada et al. | |
| 2010/0020093 A1 | 1/2010 | Stroila et al. | |
| 2010/0088631 A1* | 4/2010 | Schiller ................ | G06F 3/0485 715/784 |
| 2010/0146436 A1 | 6/2010 | Jakobson et al. | |
| 2011/0025531 A1 | 2/2011 | Geelen et al. | |
| 2011/0184945 A1 | 7/2011 | Das et al. | |
| 2011/0218864 A1 | 9/2011 | Pentz et al. | |
| 2011/0320215 A1 | 12/2011 | Cooper et al. | |
| 2012/0016578 A1 | 1/2012 | Coppens | |
| 2012/0065944 A1 | 3/2012 | Nielsen et al. | |
| 2012/0166077 A1* | 6/2012 | Herzog ................ | G01C 21/3652 701/425 |
| 2012/0176525 A1* | 7/2012 | Garin ................ | G01C 21/3647 348/333.02 |
| 2012/0274642 A1 | 11/2012 | Ofek et al. | |
| 2013/0054573 A1 | 2/2013 | Snellman et al. | |
| 2013/0101163 A1 | 4/2013 | Gupta et al. | |
| 2013/0191911 A1 | 7/2013 | Dellinger et al. | |
| 2013/0321400 A1* | 12/2013 | van Os ................ | G06F 16/2291 345/419 |
| 2013/0321401 A1* | 12/2013 | Piemonte ............ | G09B 29/006 345/419 |
| 2013/0321466 A1 | 12/2013 | Kocienda | |
| 2013/0326425 A1 | 12/2013 | Forstall et al. | |
| 2013/0328871 A1* | 12/2013 | Piemonte ................ | G06T 13/00 345/420 |
| 2014/0012497 A1 | 1/2014 | Pierfelice | |
| 2014/0013263 A1 | 1/2014 | Bailiang et al. | |
| 2014/0165091 A1 | 6/2014 | Abhyanker | |
| 2014/0223360 A1 | 8/2014 | Bailiang | |
| 2014/0240350 A1 | 8/2014 | Chen et al. | |
| 2014/0245232 A1 | 8/2014 | Bailiang | |
| 2014/0253538 A1 | 9/2014 | Bailiang | |
| 2014/0253582 A1 | 9/2014 | Chen et al. | |
| 2014/0257687 A1 | 9/2014 | Chen et al. | |
| 2014/0274138 A1 | 9/2014 | Chao et al. | |
| 2014/0280180 A1* | 9/2014 | Edecker ................ | G06F 16/285 707/769 |
| 2014/0297666 A1 | 10/2014 | Morris | |
| 2014/0310630 A1* | 10/2014 | Asikainen ........... | G06F 3/04815 715/771 |
| 2014/0323163 A1 | 10/2014 | Venkatraman et al. | |
| 2014/0342662 A1 | 11/2014 | Das et al. | |
| 2015/0019625 A1 | 1/2015 | Pensack-Rinehart et al. | |
| 2015/0020008 A1 | 1/2015 | Pensack-Rinehart et al. | |
| 2015/0024711 A1 | 1/2015 | Stob | |
| 2015/0052460 A1 | 2/2015 | Mohammad et al. | |
| 2015/0061938 A1* | 3/2015 | Moraleda ............ | G01C 21/165 342/452 |
| 2015/0130788 A1 | 5/2015 | Bailiang | |
| 2015/0153180 A1* | 6/2015 | Ettinger ................ | G01C 21/206 701/410 |
| 2015/0161819 A1 | 6/2015 | Chen et al. | |
| 2015/0170256 A1 | 6/2015 | Pettyjohn et al. | |
| 2015/0177923 A1 | 6/2015 | Philip et al. | |
| 2015/0187100 A1 | 7/2015 | Berry et al. | |
| 2015/0233715 A1 | 8/2015 | Xu et al. | |

(56) References Cited

U.S. PATENT DOCUMENTS

| | | |
|---|---|---|
| 2015/0268801 A1 | 9/2015 | Song et al. |
| 2015/0286324 A1 | 10/2015 | Suzuki |
| 2015/0369623 A1 | 12/2015 | Blumenberg et al. |
| 2016/0012635 A1 | 1/2016 | Kishikawa et al. |
| 2016/0034827 A1 | 2/2016 | Morris |
| 2016/0102983 A1 | 4/2016 | Javed et al. |
| 2016/0161277 A1 | 6/2016 | Park et al. |
| 2016/0258767 A1 | 9/2016 | Nevrekar et al. |
| 2016/0259500 A1 | 9/2016 | Greenwald et al. |
| 2017/0052672 A1* | 2/2017 | Forstall ............... G01C 21/367 |
| 2017/0103145 A1 | 4/2017 | Wither et al. |
| 2017/0336936 A1 | 11/2017 | Mohammad et al. |
| 2018/0005454 A1 | 1/2018 | Suni et al. |
| 2018/0143023 A1* | 5/2018 | Bjorke ................. G06T 19/003 |
| 2018/0301111 A1 | 10/2018 | Park et al. |
| 2018/0347988 A1 | 12/2018 | Marusco et al. |
| 2018/0348011 A1 | 12/2018 | Shelby et al. |
| 2018/0348985 A1 | 12/2018 | Shelby et al. |
| 2018/0349413 A1 | 12/2018 | Shelby et al. |
| 2020/0272143 A1 | 8/2020 | Scott et al. |

FOREIGN PATENT DOCUMENTS

| | | | |
|---|---|---|---|
| CN | 102782450 | A | 11/2012 |
| CN | 102804181 | A | 11/2012 |
| CN | 103630132 | A | 3/2014 |
| CN | 103838807 | A | 6/2014 |
| CN | 104246436 | A | 12/2014 |
| CN | 104680397 | A | 6/2015 |
| CN | 104899237 | A | 9/2015 |
| CN | 105183862 | A | 12/2015 |
| CN | 105191387 | A | 12/2015 |
| CN | 105431710 | A | 3/2016 |
| CN | 106030684 | A | 10/2016 |
| CN | 106127850 | A | 11/2016 |
| CN | 106153049 | A | 11/2016 |
| CN | 106289260 | A | 1/2017 |
| CN | 106303964 | A | 1/2017 |
| CN | 106705953 | A | 5/2017 |
| CN | 106776813 | A | 5/2017 |
| EP | 2878923 | A1 | 6/2015 |
| WO | 2011/091306 | A1 | 7/2011 |
| WO | WO-2013184449 | A2 * | 12/2013 ............ G01C 21/26 |

OTHER PUBLICATIONS

Liu et al., XYZ Indoor Navigation Through Augmented Reality, 2016, IEEE International Conferences, p. 299-306 (Year: 2016).*

Krueger, Robert, et al, "Visual Analysis of Movement Behavior Using Web Data for Context Enrichment", 2014 IEEE Pacific Visualization Symposium (pp. 193-200), Mar. 1, 2014. (Year: 2014).*

Elhamshary, Moustafa, et al., "SemSense: Automatic construction of semantic indoor floorplans", IEEE Conference Paper, ISBN (Electronic): 978-1-4673-8402-5, pp. 1-11, Oct. 1, 2015. (Year: 2015).*

Anonymous: "Go Inside with Indoor Maps", Retrieved from https://www.google.com/maps/about/partners/indoormaps/, Oct. 21, 2022, 6 Pages.

Anonymous: "Schiphol Airport Releases Indoor Wayfinding", Retrieved from https://www.m2mobi.com/blog/schiphol-airport-releases-indoor-wayfinding, Jan. 14, 2016, 11 Pages.

Businesswire: "Indoor Retail Mapping Leader aisle411 Delivers In-Store 3D Mapping on Google's Project Tango", Retrieved from https://www.youtube.com/watch?v=6QHaUAnecuM, Jun. 25, 2014, 3 Pages.

Google Developers, "Google I/O 2013—The Next Frontier: Indoor Maps", May 16, 2013, Retrieved from the Internet: URL: https://www.youtube.com/watch?v=oLOUXNEcAJk.

Hughesy Tech, "3-D indoor venue maps on @HERE app for Android", Feb. 17, 2015, Retrieved from the Internet: URL: https://www.youtube.com/watch?v=5JeBOibfTRI.

Miles, "6 Indoor Navigation Platforms for Retailers", Retrieved from https://streetfightmag.com/2013/01/29/6-indoor-navigation-platforms-for-retailers/, Jan. 29, 2013, 5 Pages.

Phonearena, "Google Maps 6.0 with indoor navigation overview", Nov. 30, 2011, p. 1, Retrieved from the Internet: URL: https://www.youtube.com/watch?v=cPsTWj03Qs.

* cited by examiner

VENUES MAP APPLICATION AND SYSTEM

INCORPORATION BY REFERENCE; DISCLAIMER

Each of the following applications are hereby incorporated by reference: application Ser. No. 17/245,722 filed on Apr. 30, 2021; application Ser. No. 15/990,456 filed on May 25, 2018; application No. 62/514,547 filed on Jun. 2, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to providing map related features concerning venues in a map application.

BACKGROUND

Mobile devices, such as smart phones, tablet computers, smart watches, and other computing devices, often include applications that provide interfaces that allow users to utilize services from network service providers. An example of such applications and/or services is map and/or navigation related applications and/or services. For example, while a user is using a map application on a mobile device, the map application can use a network connection (e.g., Internet connection) to obtain map data (e.g., map images, points of interest, etc.) for the mobile device's current location from a map service over the network connection. The map application can then provide various map related services to the user using the map data received from the map service.

These applications allow a user to view a map of an area in the proximity of the user. The map may identify venues such as stores, malls, office buildings and/or airports, to name a few. The user may select a venue and retrieve driving directions thereto. Typical map applications also allow a user to search for a place or address and obtain driving directions to one or more search results. These application, however, do not provide an inside view of a venue or the type of and/or layout of points of interest within the venue. An inside view of the venue could aid the user in determining if the venue is really where the user wants to go or if another venue is available to meet the user's needs. Thus, there is a need and desire for a map application that provides an inside view of a venue located and/or identified by the map application.

Moreover, there is a need and desire for a map application that presents the inside view of venue in a manner that is easy for the user to search for and identify and navigate to points of interest within the venue. The inside view of the map application should also be accessible by other applications and programs on the user's device to enhance the user's experience with those applications and programs.

SUMMARY

In some implementations, a computing device can provide a map application providing a representation of a physical structure of venues (e.g., shopping centers, office buildings, airports). In addition, the application can provide an inside view that includes the physical layout and geometry of the venue's structure as well as the location, structure and layout of points of interest (e.g., stores, restaurants, offices, security check points, restrooms) within the venue. The views become more detailed as the user zooms into the venue to reveal points of interest and to give the user a feel for traversing the venue.

In some implementations, the map application can provide a unique venue directory, providing an easy and visual mechanism to search for categories of points of interest (e.g., clothes, food, restrooms) or specific items within the venue. Search results can be presented on a map of a floor within the venue as well as a listing providing all search results located within the venue.

In some implementations, the inside view of the map application is accessible by other applications and programs on the user's device. Thus, whether intended or not, search results that are identified by the map application as having an inside view of the venue are also presented on a graphical user interface along with typical search results from the other applications.

In some implementations, the map application provides a route and/or turn-by-turn navigation instructions to a destination within a venue comprising one or more floors when desired by the user. The map application can provide an indoor overview navigation mode whereby the route is shown on the one or more floors, including routing through floor connecting devices (e.g., elevators, escalators, stairs). The presentation of the route and venue structures are adjusted to ensure that the indoor navigation route is not hidden from view while the user is traversing the route.

In some implementations, the map application can provide a context driven presentation in an indoor turn-by-turn navigation mode. The map application can present a graphical view of a route and maneuvers as seen from a point of view of a virtual camera. The map application can determine changes in the navigation context of the user's position, upcoming maneuvers and/or venue structure and dynamically modifies the way the virtual camera captures and presents portions of the indoor scene to produce different navigation scenes in the turn-by-turn navigation presentation for the venue.

Particular implementations provide at least the following advantages. The structural layout and location of points of interest within a venue may be inspected using an indoor map even before a user enters the venue. Thus, providing the user with a mechanism for searching for, identifying and navigating to points of interest whether the user is inside the venue or miles away. Particular implementation of the map application's venue directory provides a drastic improvement over traditional directories (such as the ones currently found in malls and airports) as the directory is organized by categories and category selectors that are color coded and described textually in the same manner that the points of interest are represented and identified on a venue map.

Particular implementations of the map application enhance the searching and browsing of external applications and programs by providing these external applications access to the inside views of venues from the map application.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
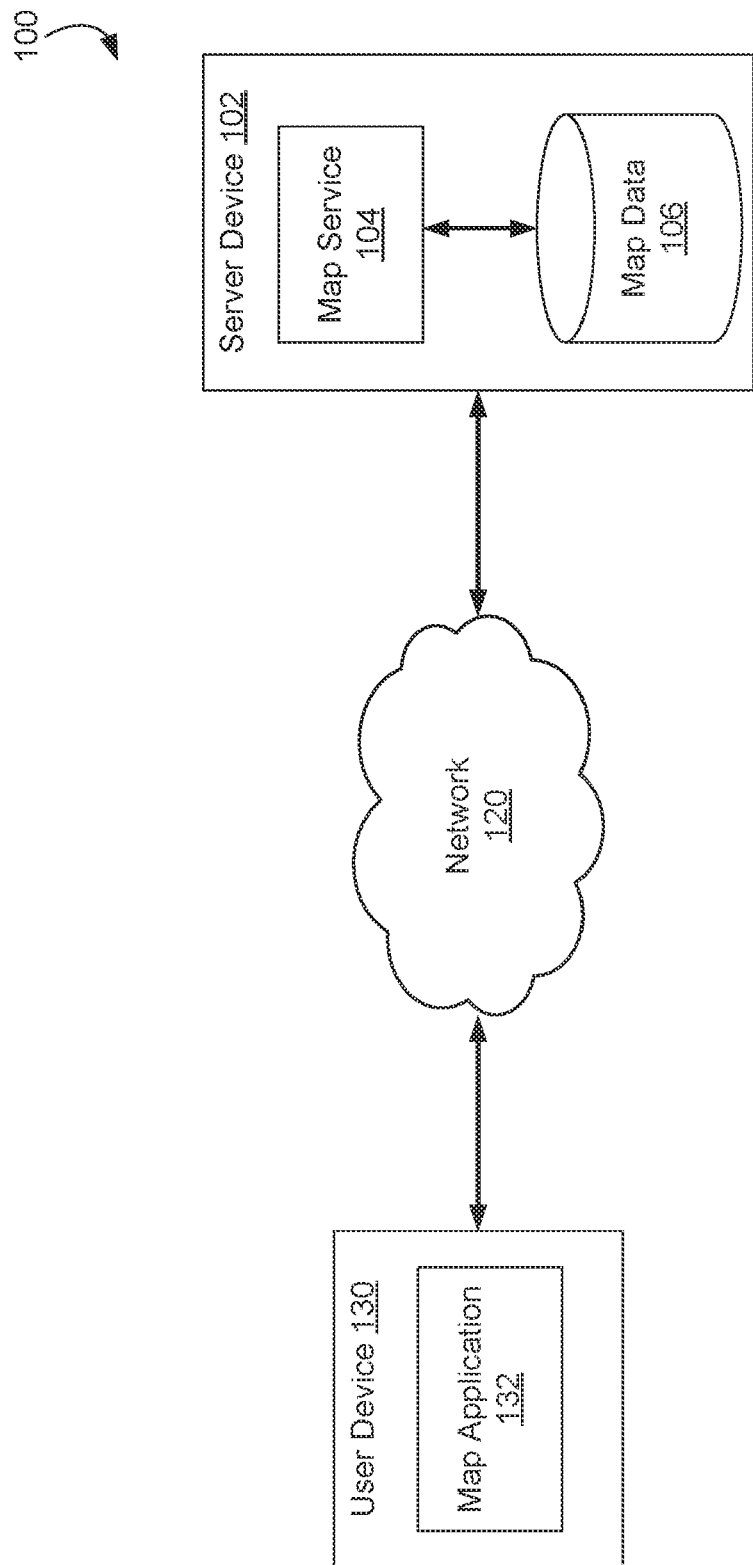
FIG. 1 is a block diagram of an example system for providing venues map information, searching and routing.

FIG. 1 is a block diagram of an example system 100 for providing venues map information, searching and routing according to the disclosed principles. In some implementations, system 100 can include server device 102. For example, server device 102 can represent a computing device or multiple computing devices associated with a map (e.g., navigation) services provider. Server device 102 can correspond to well-known server hardware architectures and include processors for performing operations for providing map and/or navigation services.

In some implementations, server device 102 can include map service 104. For example, map service 104 can be a software server that provides backend processing for a map service provider. Map service 104 can, for example, obtain map data (e.g., map images, points of interest, navigation and/or routing information, etc.) from map data database 106 and send the map data to various client devices (e.g., user device 130) so that the client devices present maps and/or navigation information to the users of the client devices. For example, map service 104 can send map data to a client device while the client device is connected to server device 102 through network 120 (e.g., the Internet). The client device can present the map data to the user using a map or navigation application on the client device.

In some implementations, user device 130 can be a computing device, such as a laptop computer, smart phone, tablet computer, and the like. User device 130 can be a wearable device, such as a smart watch, smart glasses, etc. User device 130 can be a media device, such as a streaming media device, media player, automobile entertainment system, etc. User device 130 can be a client device that connects to network 120 to obtain map data, as described herein.

In some implementations, user device 130 can include map application 132. For example, map application 132 can provide features that allow the user to search for and/or specify a destination. In one implementation, the map application 132 allows the user to search for particular venues and/or items within particular venues and/or venues in a proximity to user device 130. Map application 132 can provide features that allow the user to view representations of maps corresponding to the user's current location, maps corresponding to a location associated with search results or other points of interest, and/or maps corresponding to a destination location or geographical area selected by the user. Map application 132 can receive user input requesting a route to the destination and map application 132 can present a route from a start location (e.g., the current location of user device 130, a user-specified location, etc.) to the specified destination.

Moreover, map application 132 can provide a representation of a physical structure of venues (e.g., shopping centers, airports). In addition, and as discussed below, application 132 can provide a view of the interior of the venue that includes the physical layout and geometry of the venue's structure as well as the location, structure and layout of points of interest (e.g., stores, restaurants, security check points, restrooms) within the venue. The views can become more detailed as the user zooms into the venue to reveal points of interest. In some implementations, the view of the interior of the venue can include outdoor walking spaces or courtyards that are included in some types of venues.

In some implementations, map application 132 can provide a unique venue directory providing a visual mechanism to search for categories of points of interest (e.g., clothes, food, restrooms) or specific items within the venue. Search results can be presented on a map of a floor within the venue as well as a listing providing all search results located within the venue. In some implementations, the inside view provided by map application 132 can be accessible by other applications and programs on the user's device such as e.g., user device 130.

Figure 2:
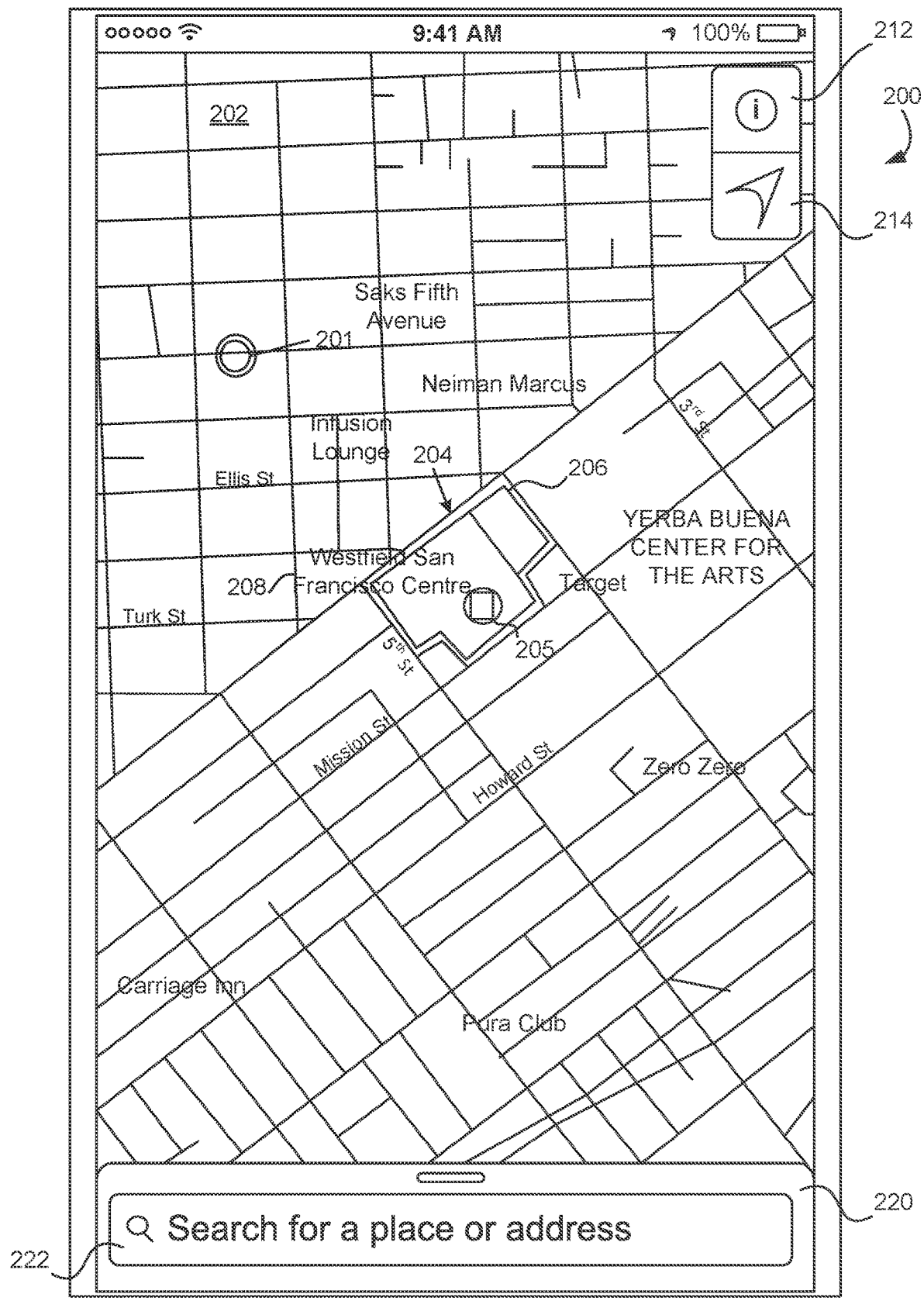
FIG. 2 is an example graphical user interface comprising a map illustrating a first type of venue that can be presented to a display of a user device.

FIG. 2 illustrates an example graphical user interface 200 of map application 132 that can be presented on a display of user device 130. For example, each of the graphical user interfaces (GUIs) described herein can be presented on the display of user device 130 by map application 132. In some implementations, graphical user interface (GUI) 200 is a two-dimensional view and presents map 202. For example, map 202 can initially represent the user's current location using a location puck 201 as well as one or more venues 204 in the vicinity of the user's location. Map application 132 can, for example, send the current location of user device 132 to map service 104 on map server 102. Map service 104 can return data for presenting map 202. In the illustrated implementation, venue 204 is identified by graphic 205 dictating the type of venue 204 (i.e., an icon used by the application to identify a venue), which in this case is a shopping center or mall. In addition, venue 204 is identified by region 206 representing its external physical structure and location and layout on the map 202 and textual label 208 describing venue 204 as "Westfield San Francisco Centre," a shopping center or mall, by way of example only.

In some implementations, GUI 200 can include a tray 220 having graphical element 222 for searching for a place or address. For example, graphical element 222 can be a text input control. When the user selects graphical element 222, user device 130 can present a virtual keyboard that the user can use to enter textual search parameters. After receiving the search parameters, map application 132 can send the search parameters to map service 104 on map server 102. Map service 104 can return locations matching the search parameters as search results. Map application 132 can present the search results on the display of user device 130 (discussed below in more detail). When presenting search results, map 202 can be updated to represent an area around the location of the search results.

In some implementations, GUI 200 can also include first control 212 allowing the user to change map settings for map application 132. The GUI 200 can also include second control 214 allowing the user to change the orientation of map 202, if desired.

General GUI Behavior—Shopping Centers

Figure 3:
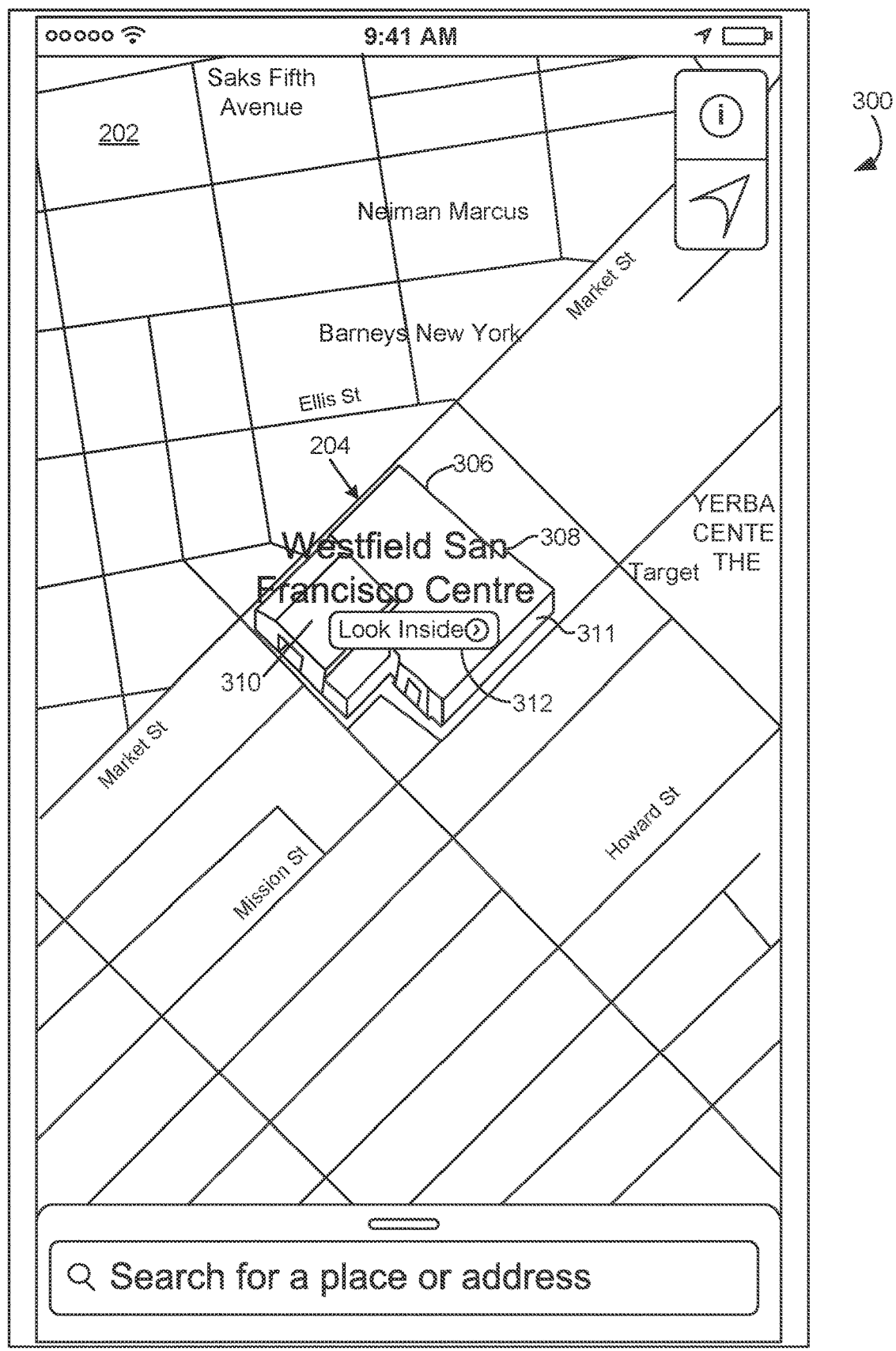
FIG. 3 is an example graphical user interface containing a first zoomed-in view of a map illustrated in FIG. 2.

FIG. 3 illustrates an example graphical user interface 300 containing a first zoomed-in view of map 202 after the user performed a zoom-in operation on map 202. In some implementations, when user device 130 has a touch-sensitive surface, the zoom-in operation can be a gesture such as e.g., a multi-finger gesture often referred to as "de-pinching" whereby two fingers are placed in contact on the device 130 surface and then dragged and spread apart from each other as they continue to touch the surface. The present disclosure should not be limited to any particular technique for zooming-in or out on map 202.

The GUI 300 can show a 2D map 202 similar to the one illustrated in FIG. 2 and as the user zooms-in on map 202, the venue 204 becomes a 3D structure as discussed below in more detail. For example, GUI 300 presents a first zoomed-in representation of venue 204 previously shown in GUI 200. In this representation, venue 204 is now identified by 3D structure 306 representing venue 204's physical structure and location on the zoomed-in two-dimensional map 202. For example, GUI 300 can present a perspective view of 3D structure 306 that includes a roof 310 and walls 311. As is discussed below, the 3D structure 306 may be introduced via an animation or change in viewing angle. Zooming-in further, as is discussed below, causes the structure 306 to fade away and be replaced by internal details/structure (i.e., interior and exterior walls will be presented and sheared in the appropriate direction away from a virtual camera perspective giving them the 3D appearance without the need to change the pitch of the camera). To distinguish or identify an interactive venue (e.g., a venue that the user can look inside) from other non-interactive venues, points of interest, or objects presented on map 202, as the user zooms in on map 202, the 3D structure 306 corresponding to venue 204 can be animated so that it appears to pop up off or rise from the surface of map 202 while other non-interactive venue objects remain flat (e.g., 2-dimensional). Venue 204 is also identified by its corresponding textual label 308 as described above. In some implementations, a zoom level threshold can be used to trigger the animation. In addition, the threshold could change based on the size of the structure. Moreover, venue 204 now contains selector 312 indicating that the user may look inside venue 204 (e.g., via an indoor map for venue 204) by selecting selector 132. In some implementations, the user may also look inside venue 204 by continuing to zoom-in on venue 204. In some implementations, as discussed in more detail below, looking inside a venue will cause an indoor map to be presented on the display of user device 130. The indoor may will present the structural geometry of the inside floor plan for venue 204 as well as the identification of points of interest (e.g., stores, security check points, restrooms, etc.) within venue 204.

Details of 3D structure 306, label 308 and selector 312 are contained in the map data provided from map server 102 over network 120 to user device 130 and processed by map application 132. The map data can be sent when the user performs the zoom-in operation or it can be pre-sent to user device 130 and stored on device 130 while a prior GUI (e.g., GUI 200) is presented on the display. The present disclosure should not be limited to any particular technique or timing for sending the map data to user device 130.

Figure 4:
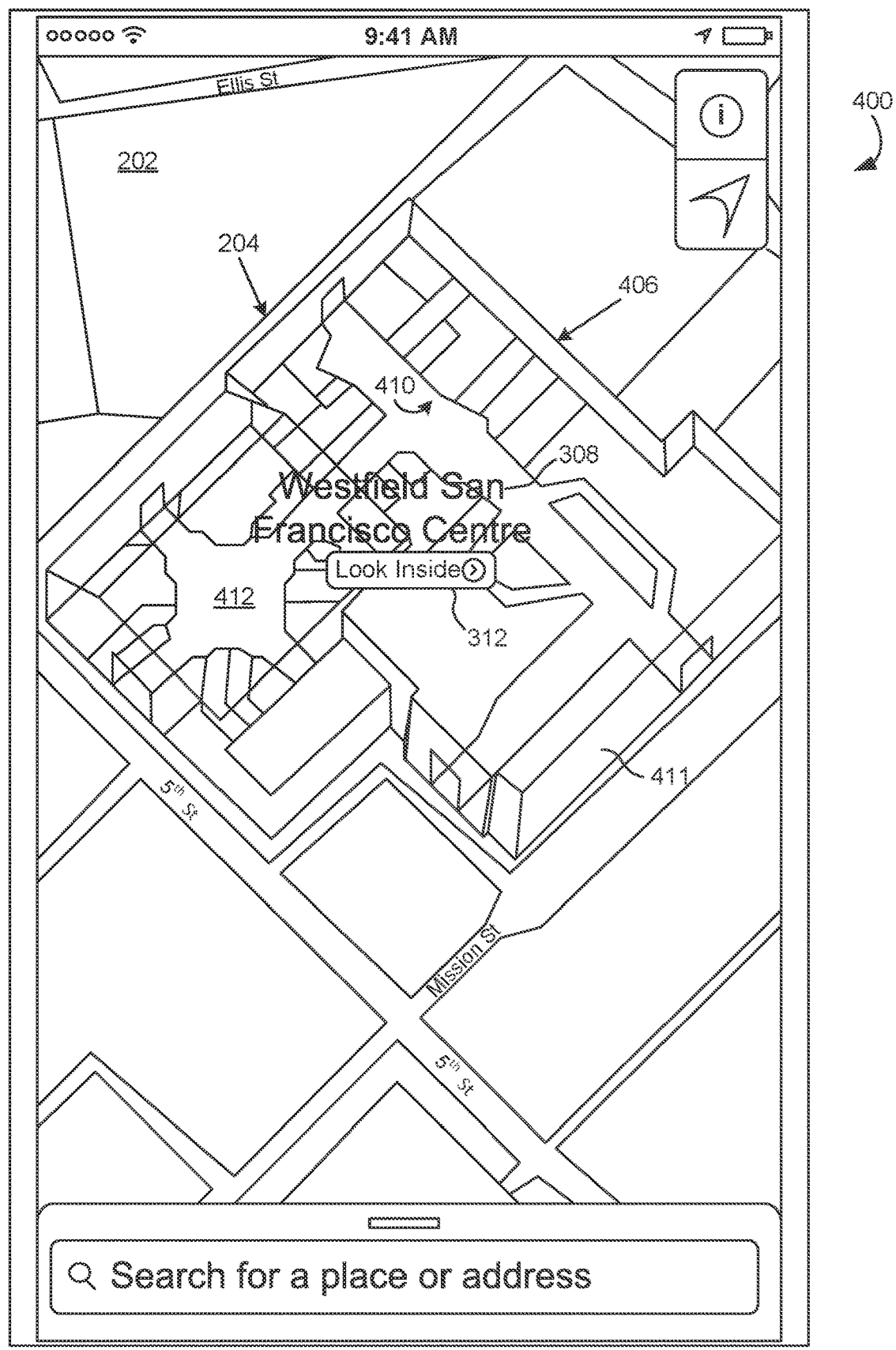
FIG. 4 is an example graphical user interface containing a second zoomed-in view of a map illustrated in FIG. 2.

FIG. 4 illustrates an example graphical user interface 400 containing a second zoomed-in view of map 202 after the user performed another zoom-in operation on map 202 or continues to zoom-in past the zoom level shown in FIG. 3. GUI 400 also presents a second zoomed-in representation of venue 204. Venue 204 is now represented by a cut-away 3D structure 406 having walls 411, but whose virtual roof has been removed to reveal a partial inside view of the venue 204 comprising walkways 412 and points of interest 410

(e.g., stores, restaurants, restrooms) arranged according to the floor plan of venue 204. Details of 3D structure 406, walkways 412 and points of interest 414 are contained in the map data provided from map server 102 over network 120 to user device 130 and processed by map application 132. As with each update of map data described herein, map data can be sent when the user performs the zoom-in operation or it can be pre-sent to user device 130 and stored on device 130 while a prior GUI (e.g., GUI 300) is presented on the display.

In some implementations, 3D structure 406 and points of interest 414 are introduced by an animation. For example, 3D structure 406 and points of interest 414 can be introduced as rising from the ground/floor, dropping from the ceilings, passing through a virtual roof if one is presented on the prior GUI. If the user continues to zoom-in, 3D structure 406 and points of interest 414 can continue to be animated or highlighted, establishing their presence in GUI 400. Animation could also be introduced as a user zooms-out. For example, 3D structure 406 and points of interest 414 could appear to be shrinking, falling into the ground, lifted from the ground, exiting through a virtual roof, being covered by the virtual roof and/or eventually becoming represented as 2D objects or simply disappearing from view. Animation can be provided for any zoom-in or zoom-out operation for any of the venue structures disclosed herein and for any GUI discussed herein, particularly when structure is added or more detail about the venue, its layout and points of interest is being provided.

In GUI 400, venue 204 is still identified by its corresponding textual label 308 and still contains selector 312, indicating that the user may look inside venue 204 (e.g., via an indoor map for venue 204) by selecting selector 312. In some implementations, the user may look inside venue 204 by continuing to zoom-in on venue 204.

Figure 5:
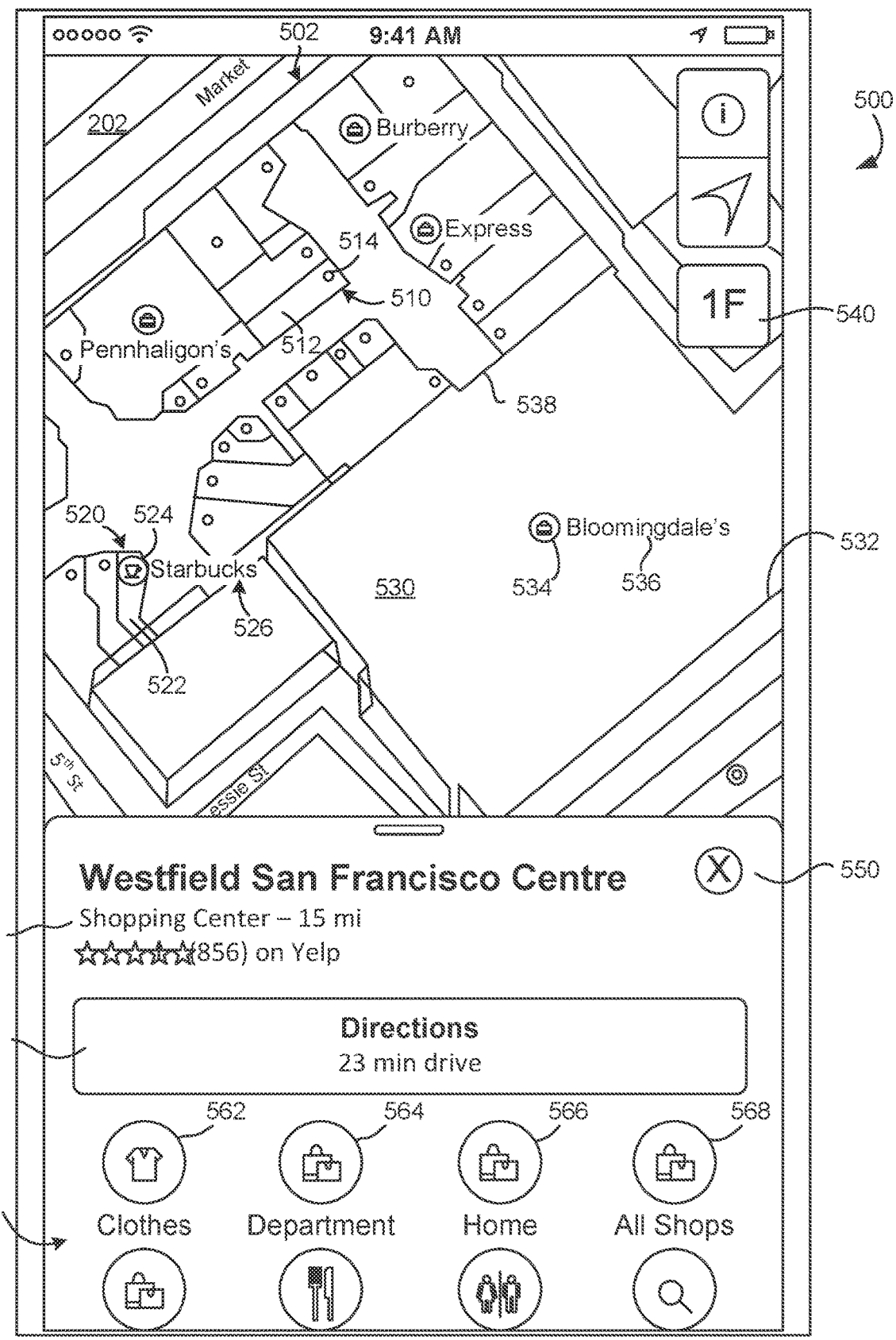
FIG. 5 is an example graphical user interface containing a first indoor map of a first type of venue.

FIG. 5 illustrates an example graphical user interface 500 containing a first, indoor map 502 of venue 204 after the user selected selector 312 from GUI 300 or GUI 400. GUI 500 includes a 3D view of venue 204 while other portions are presented in 2D. The map application 132 zooms-in and frames physical structure 506 of venue 204 and displays a plurality of points of interest (POI) 510, 520 and 530 on indoor map 502 based on map data for venue 204. As discussed below, indoor map 502 contains simplified representations of the physical structure and location of POIs (e.g., stores, restaurants, restrooms), walkways, staircases and other public spaces within venue 204. Non-public spaces are not shown on map 502 as a user would not be able to access them. In one embodiment, the structures within the view comprises gray storefronts, white walkways based on detailed drawing files (e.g., CAD file) provided by the venue. This initial view is simplified e.g., by smoothing out jagged or detailed walls to create more simple spaces; combining adjacent store space and non-public space (e.g., walled and private areas) into one simple shape; and/or removing unnecessary details such as stairs and small open-to-below areas.

In some implementations, labeling of points of interest may be displayed differently based on e.g., the POI's relative size in comparison to other POIs in the venue or whether the POI labeling will occlude another POI or POI labeling. The following is a general description of how POIs are labeled and aligned on map 502, but details of POI presentation, labeling, placement with respect to other POIs and the venue in general, and other processing are discussed below in more detail (see "POI Density" section below).

POI 510, for example, is illustrated by a representation of its physical structure 512 and a POI indicator, which in the illustrated example is POI dot 514. The disclosed embodiments should not be limited to indicators that are dots and that other types of indicators such as letters, arrows, icons, symbols, or graphical elements could be used instead of a dot. As will be discussed below in more detail, POI dot 514 is positioned at a front portion of structure 512 facing walkway 412, but slightly offset from walkway 412.

POI 520, for example, is illustrated by a representation of its physical structure 522, POI category indicator 524 and textual label 526 describing POI 520 as "Starbucks," by way of example. In the illustrated implementation, since physical structure 522 of POI 520 is relatively small in comparison to other larger POIs, such as e.g., POI 530, POI category indicator 524 is positioned at a front portion of structure 522 facing walkway 412, but slightly offset from walkway 412.

POI 530, for example, is illustrated by a representation of its physical structure 532, POI category indicator 534 and textual label 536 describing POI 530 as "Bloomingdales," by way of example. In the illustrated implementation, since physical structure 532 of POI 530 is relatively large in comparison to other POIs, such as e.g., POIs 510 and 520, category indicator 534 is positioned in the approximate center of structure 532. In addition, since physical structure 532 of POI 530 is relatively large in comparison to other POIs, POT 530 could have its own indoor map (i.e., a venue sub-map or POI specific indoor map).

In some implementations, POI dots (e.g., POI dot 514) and POI category indicators of smaller-sized POIs (e.g., POI category indicator 524) are positioned to align with neighboring POI dots and POI category indictors in one direction that aligns with their respective entrances. This provides a uniform representation of POIs on indoor map 502. Floor indicator 540 is used to show what floor or level displayed POI 510, 520 and 530 are within structure 506 of venue 204. Other POIs shown on map 502 (but not labeled or "hidden") can be identified in one of the manners described above for POIs 510, 520 and 530.

In addition to, or alternatively, and as will be discussed below in more detail, in some implementations the initial displayed set of POIs can be customized to match a user's prior experience in venue 204. For example, map application 132 can maintain a user set default/preference for which POIs should be displayed in the initial set of POIs. In addition to or alternatively, the application 132 can maintain a list of POIs that the user last visited, or visited more frequently, which can then be used as the initially displayed POIs. In some implementations, the application 132 can display a set of most popular POIs for all visitors of venue 204. This information can be e.g., retrieved from map server 102 along with map data in the same manner as discussed above.

GUI 500 also includes placecard 550 for venue 204. In some implementations, placecard 550 includes information 552 (e.g., name, type of venue, link to an online review) about venue 204. If user device 130 is not within venue 204 at that time, field 554 for retrieving driving directions is also presented in placecard 550. The location of user device 130 can be determined e.g., by GPS, Wi-Fi fingerprint maps, beacons, or other known techniques.

In some implementations, placecard 550 also includes venue directory 560 containing one or more POI category selectors 562, 564, 566 and 568. Each POI category selector 562, 564, 566 and 568 is associated with a category (e.g., clothes, food, department store, restroom, etc.) that the various POIs of venue 204 have been grouped into. The type of venue dictates the number of and type of categories to be presented by directory 560 and that the disclosed embodiments should not be limited to any number of or type of category for directory 560 or any directory illustrated herein.

By way of example only, category selector 562 can be used to select a category of POIs associated with clothing, category selector 564 can be used to select a category of POIs associated with department stores, category selector 566 can be used to select a category of POIs associated with home goods, and category selector 568 can be used to select a category of POIs associated with "all shops" at venue 204. In some implementations, POI category selectors 562, 564, 566 and 568 of venue directory 560 are color coded (i.e., each one has its own color). In addition, the colors of the POI dots 514 and POI category indicators 524 and 534 are selected to match the colors of POI category selectors 562, 564, 566 and 568 used in venue directory 560. In some implementations, POI dots 514 and POI category indicators 524 and 534 will have colors based on their respective categories regardless of whether venue directory 560 is displayed or not. As will be explained below in more detail, venue directory 560 can be used by a user to a specific category of POIs to search for, browse and/or obtain more information about the POIs present in venue 204.

Figure 6:
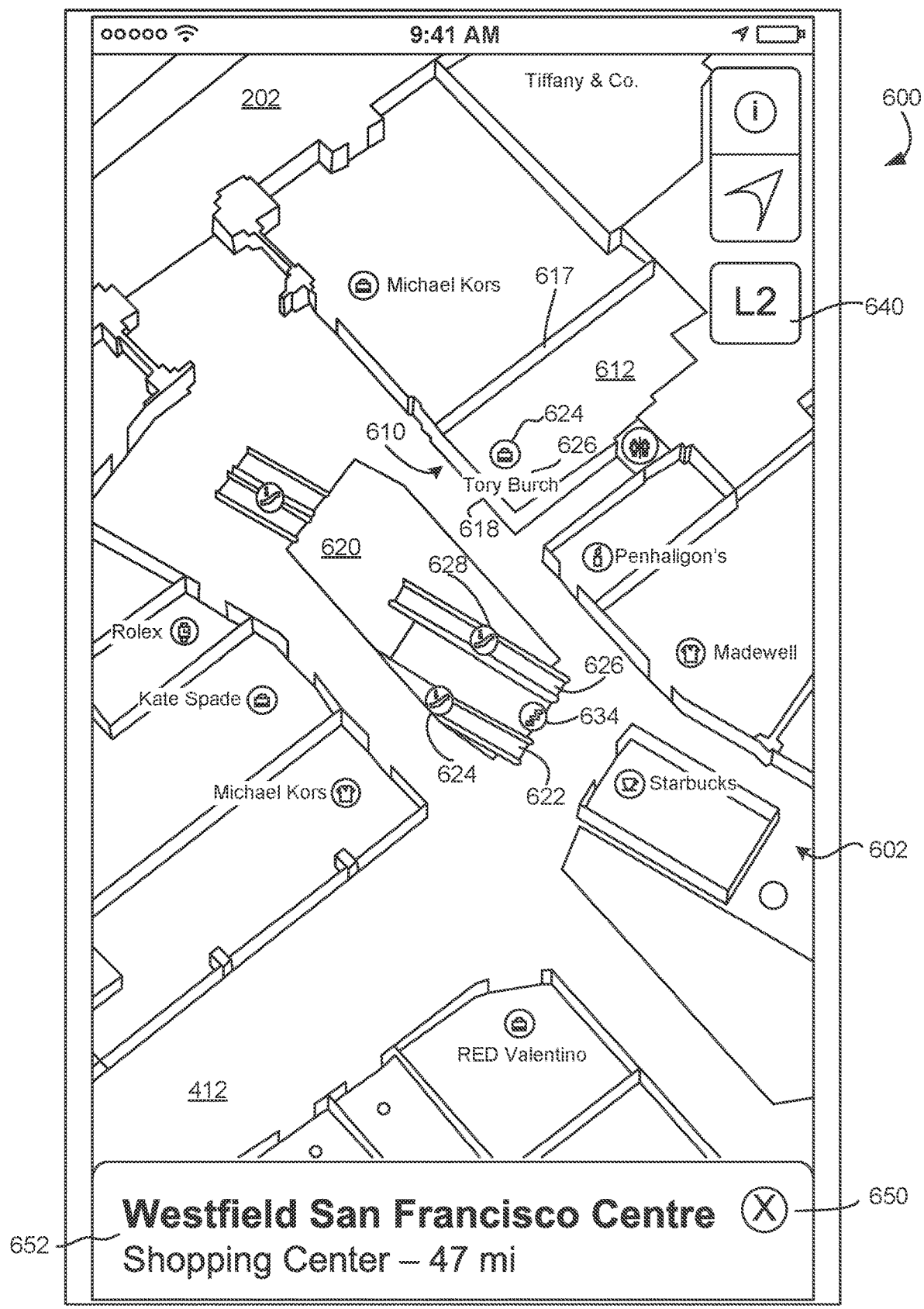
FIG. 6 is an example graphical user interface containing a zoomed-in 3D view of the indoor map illustrated in FIG. 5.

FIG. 6 illustrates an example graphical user interface 600 containing a zoomed-in 3D view 602 of indoor map 502 of venue 204 after or while a user performs a zoom-in operation on map 502 on GUI 500. GUI 600 has level/floor indicator 640 showing that view 602 is of a second level/floor of venue 204. 3D indoor view 602 illustrates geometric features of POIs 610 as well as other structures found on a particular floor of venue 204. For example, GUI 600 illustrates POI 610 and structure 620 comprising escalators 622 and 626 and staircase 632 associated with a second floor. POI 610, for example, is illustrated by a 3D representation of its physical structure 612 comprising walls 617 and entrance 618. POI category indicator 614 and textual label 616 identify POI 610 as "Tory Burch," by way of example. Structure 620 also includes graphics 624 and 628 respectively associated with and identifying escalators 622 and 626 and graphic 634 associated with and identifying staircase 632. Other POIs shown on map 502 can be identified in one of the manners described above for POI 610.

In some implementations, the structures shown in 3D view 602 will be introduced by an animation giving the appearance that e.g., they arise from the floor of venue 204 or drop in from the ceiling, pass through a virtual roof, as discussed above. This type of animation can occur in any GUI described herein when a structure is shown in more detail e.g., by zooming-in on the structure. The animation can also include the removal of the roof portions when a structure is opened to reveal its contents (e.g., for the transition of the view venue 204 from GUI 300 to GUI 400). If the user continues to zoom-in, the structures shown in 3D view 602 can continue to be animated or highlighted, establishing their presence in GUI 600. Animation could also be introduced as a user zooms-out. For example, the structures shown in 3D view 602 could appear to be shrinking, falling into the ground, lifted from the ground and/or eventually becoming represented as 2D objects or hidden from view entirely.

In some implementations, GUI 600 also includes placecard 650. Placecard 650 is shown in its pulled-down state such that only an identifying label 652 is presented on the display. Placecard 650 could be pulled-up by a user to review other options (e.g., venue directory) available on GUI 600.

While GUI 600 is being presented to the user, the user is capable of selecting a POI by touching its representation on 3D view 602. By way of example, the user desires to select POI 610 and may do so by any means allowable on user device 130.

Figure 7:
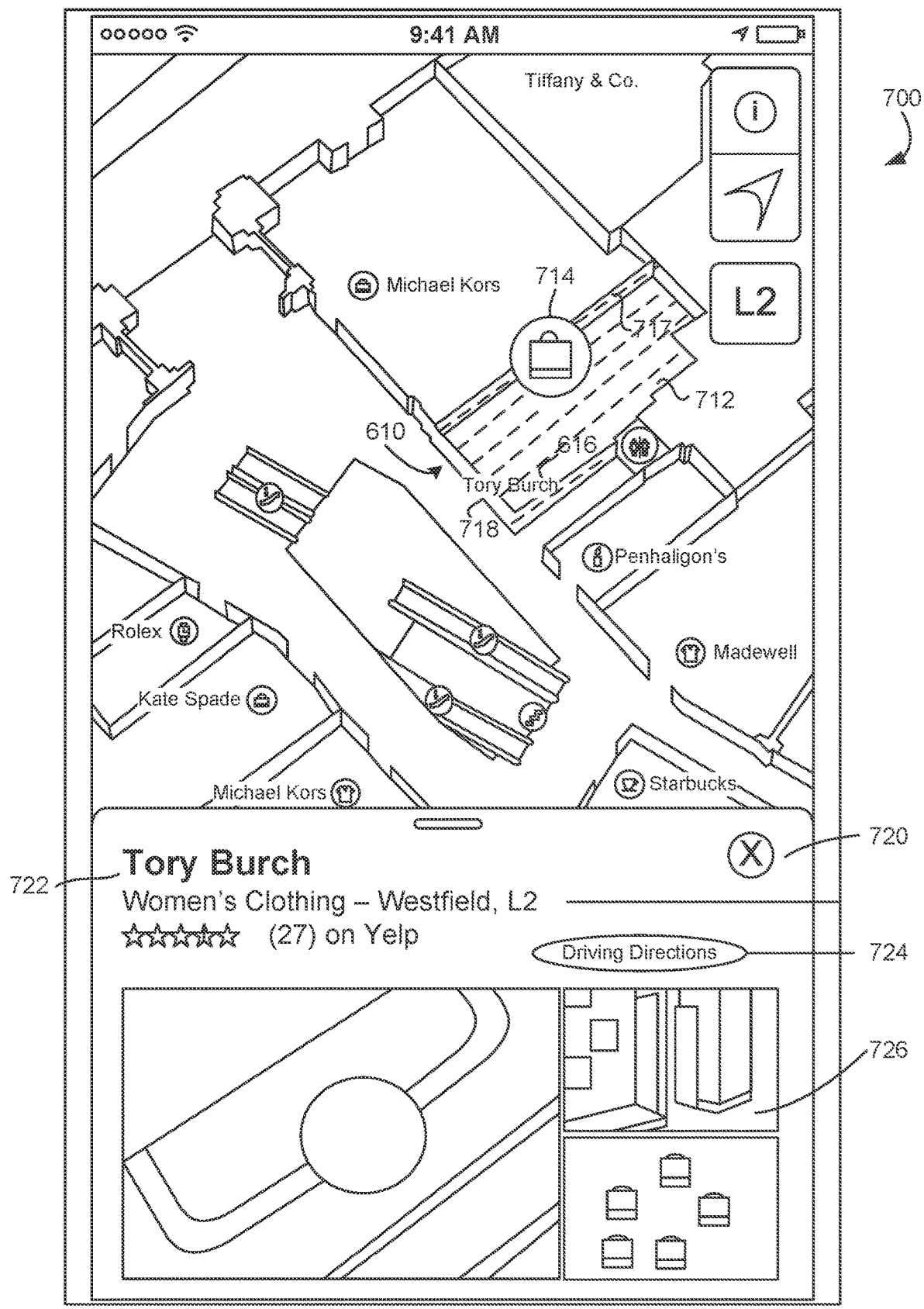
FIG. 7 is an example graphical user interface containing a selected representation of selected point of interest.

FIG. 7 illustrates an example graphical user interface 700 containing a representation of POI 610 from GUI 600 after the user selected POI 610 (e.g., by clicking on it in GUI 600). Specifically, POI 610 in its selected state is now represented by an emphasized or highlighted structure 712 containing highlighted walls 717 and entrance 718 (shown with dashed lines). In addition, a much larger POI category indicator 714 is also presented on the display. In some implementations, POI category indicator 714 may be animated (e.g., flashing, spinning, bouncing up and down) as a further indication that POI 610 was selected.

In some implementations, placecard 720 associated with POI 610 is presented to the display upon selection of POI 610. In some implementations, the placecard 720 includes information 722 (e.g., name, type of POI, link to an online review) about selected POI 610 and ways for contacting the POI (e.g., phone number, text message number or link, instant message link, etc.). If user device 130 is not within venue 204 at the time, field 724 for retrieving driving directions is also presented in placecard 720. Field 724 can be suppressed entirely if the user is inside the venue or it can be replaced by a "get directions" for indoor routing directions as discussed below (see "Indoor Venue Routing" section). In addition, placecard 720 can include and graphics/images 726 associated with POI 610. The information used to populate placecard 720 can be retrieved from map service 104 upon selection of POI 610. In addition to, or alternatively, the information used to populate placecard 720 can be retrieved from map service 104 or another service (e.g., an online service) while GUI 600 or another GUI is presented on the display of user device 130.

General GUI Behavior—Airports

Figure 8:
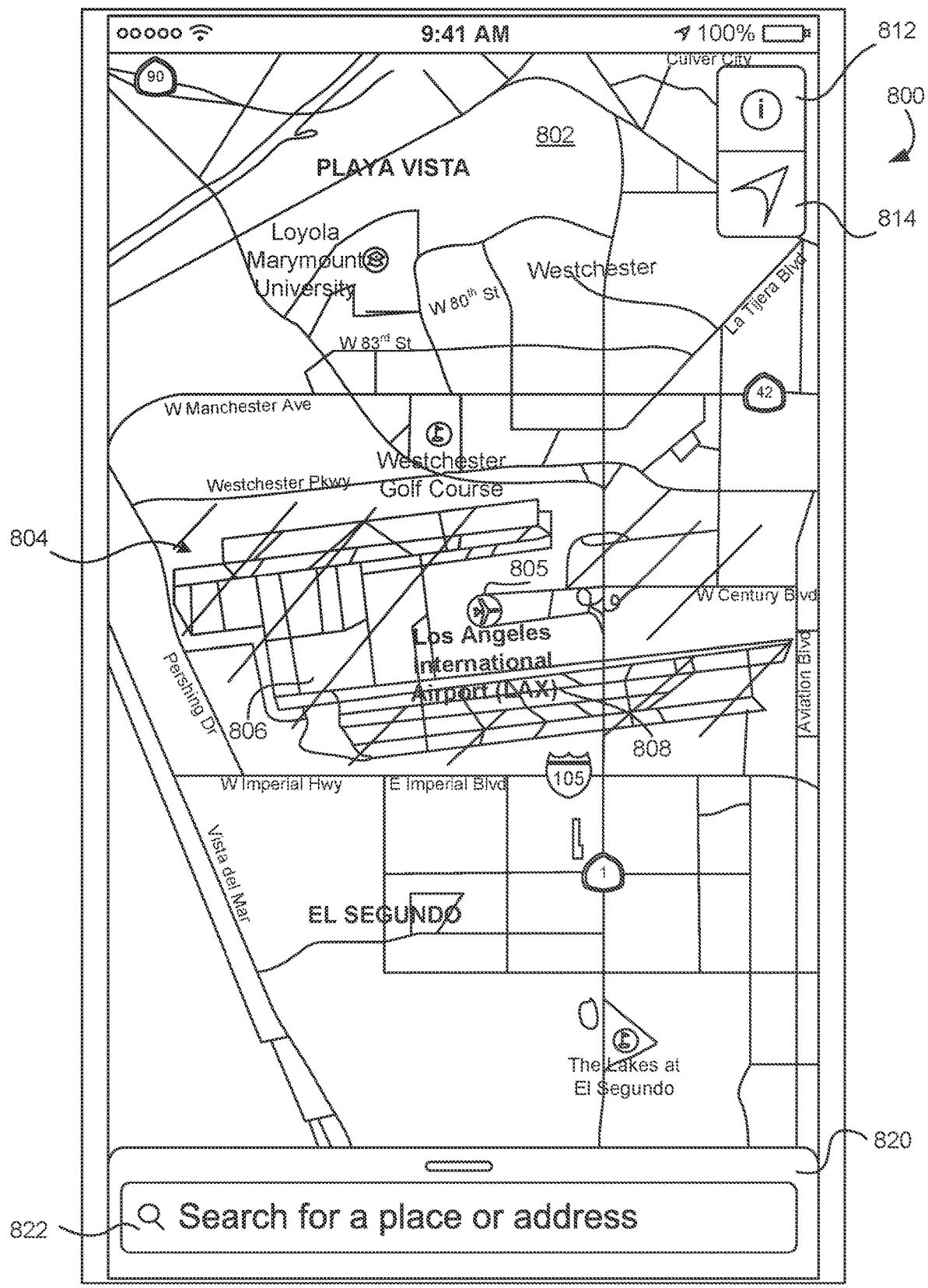
FIG. 8 is an example graphical user interface comprising a map illustrating a second type of venue that can be presented to a display of a user device.

FIG. 8 illustrates an example graphical user interface 800 of map application 132 that can be presented to a display of user device 130. GUI 800 illustrates a different map 802 (or a different portion of map 202 discussed above) showing a different venue 804. In the illustrated implementation, venue 804 is identified by graphic 805 identifying venue 804 as an airport. In addition, venue 804 is identified by region 806 representing its external physical structure and location and layout on map 802 and textual label 808 describing venue 804 as "Los Angeles International Airport (LAX)," by way of example only.

In some implementations, GUI 800 can include a tray 820 having graphical element 822 for searching for a place or address. For example, graphical element 822 can be a text input control. When the user selects graphical element 822, user device 130 can present a virtual keyboard that the user can use to enter textual search parameters. After receiving the search parameters, map application 132 can send the search parameters to map service 104 on map server 102. Map service 104 can return locations matching the search parameters as search results. Map application 132 can present the search results on the display (discussed below in more detail). When presenting search results, map 802 can be updated to represent an area around the location of the search results.

In some implementations, GUI 800 can also include first control 812 allowing the user to change map settings for the map application 132. The GUI 800 can also include second control 814 allowing the user to change the orientation of map 802, if desired.

Figure 9:
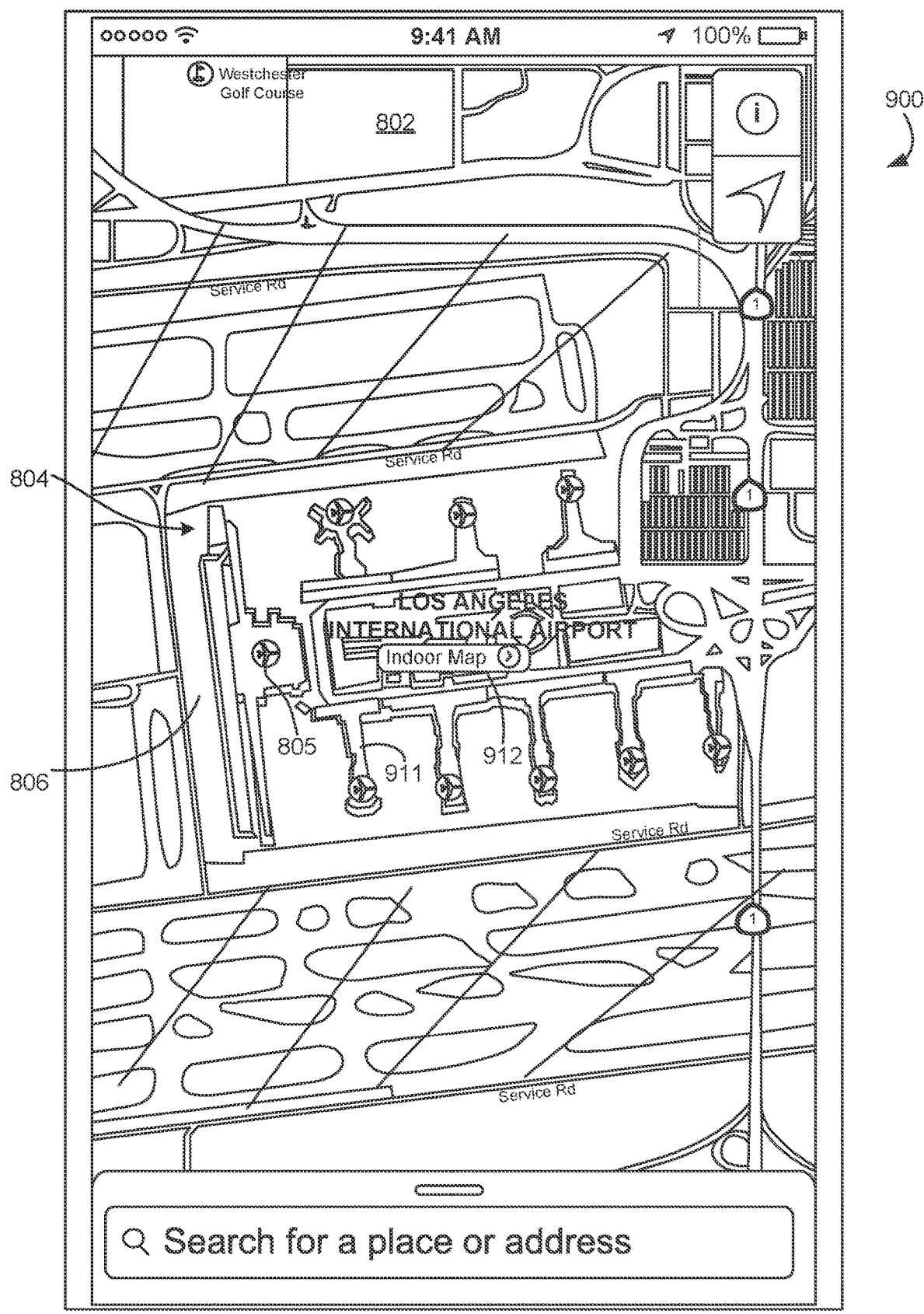
FIG. 9 is an example graphical user interface containing a first zoomed-in view of the map illustrated in FIG. 8.

FIG. 9 illustrates an example graphical user interface 900 containing a first zoomed-in view of map 802 after the user performed a zoom-in operation on map 802. In some implementations, when user device 130 has a touch-sensitive surface, the zoom-in operation can be a gesture such as e.g., a multi-finger gesture often referred to as "de-pinching" whereby two fingers are placed in contact on the device 130 surface and then dragged and spread apart from each other as they continue to touch the surface. The present disclosure should not be limited to any particular technique for zooming-in or out on map 802.

GUI 900 also presents a first zoomed-in representation of venue 904 previously shown in GUI 800. In this representation, venue 804 is now identified by 3D structure 906 representing venue 804's physical structure and location and layout on the zoomed-in map 802. Structure 906 includes roof 910 and walls 911. Venue 804 is also identified by its corresponding textual label 908, which may or may not be a modified version of label 808 from GUI 800. Moreover, venue 804 now contains selector 912 indicating that the user may look inside venue 804 via an indoor map by selecting selector 912. In some implementations, the user may look inside venue 804 by continuing to zoom-in on venue 804. In some implementations, as discussed in more detail below, the indoor map will present the structural geometry of the inside floor plan for venue 804 as well as the identification of points of interest (e.g., stores, security check points, restrooms, etc.) within venue 804.

In some implementations, structure 906 including roof 910 and walls 911 will be introduced by an animation giving the appearance that e.g., they arise from the floor of venue 804 or drop in from the sky, as discussed above. This type of animation can occur in any GUI described herein when a structure is shown in more detail e.g., by zooming-in on the structure. If the user continues to zoom-in, the structures shown in GUI 900 can continue to be animated or highlighted, establishing their presence in GUI 900. Animation could also be introduced as a user zooms-out. For example, the structures shown in GUI 900 could appear to be shrinking, falling into the ground, lifted from the ground and/or eventually becoming represented as 2D objects or hidden from view entirely.

Details of 3D structure 906, label 908 and selector 912 are contained in the map data provided from map server 102 over network 120 to user device 130 and processed by map application 132. The map data can be sent when the user performs the zoom-in operation or it can be pre-sent to user device 130 and stored on device 130 while a prior GUI (e.g., GUI 800) is presented on the display. The present disclosure should not be limited to any particular technique or timing for sending the map data to user device 130.

Figure 10:
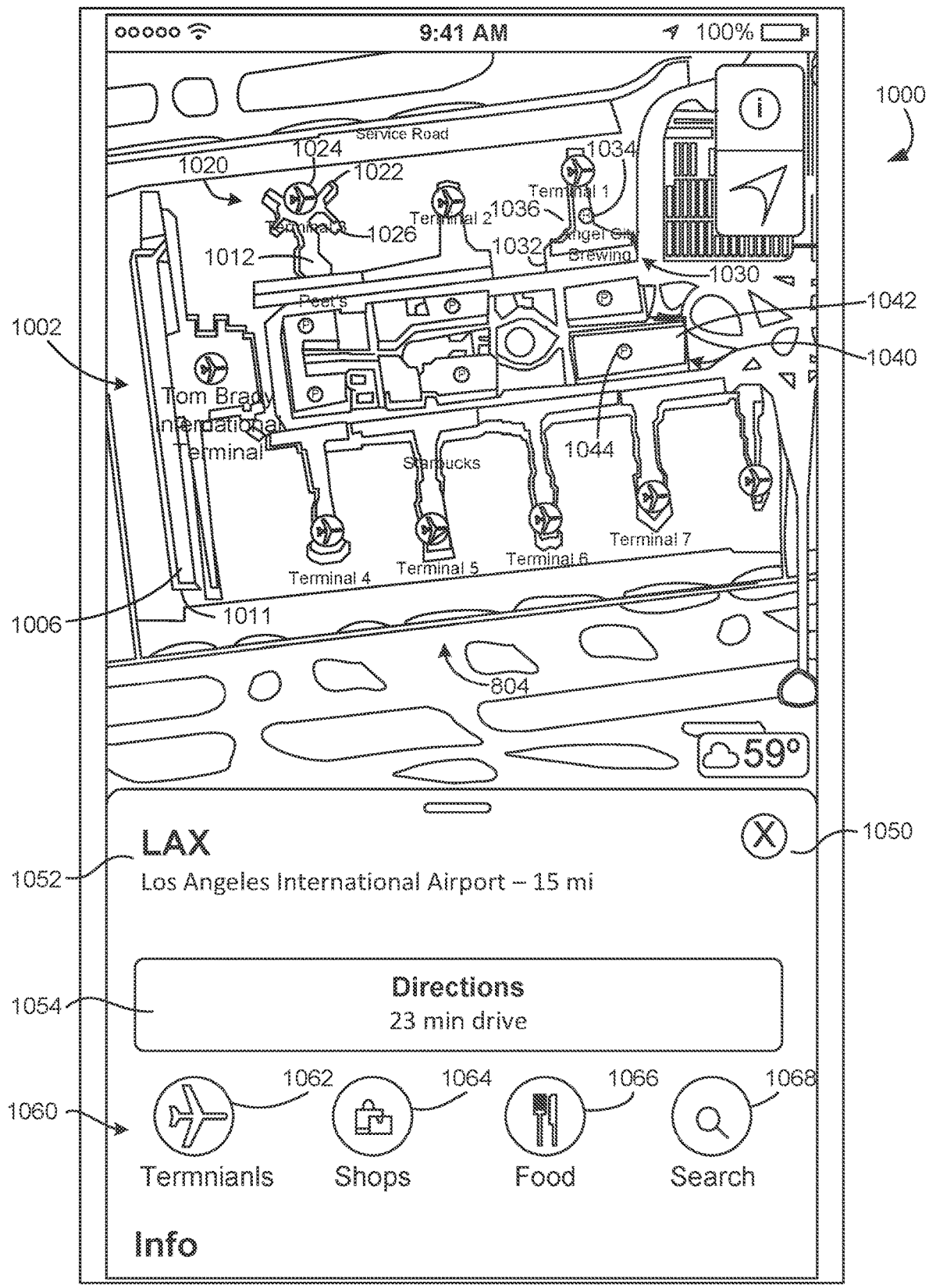
FIG. 10 is an example graphical user interface containing a first indoor map of a second type of venue.

FIG. 10 illustrates an example graphical user interface 1000 containing a first indoor map 1002 for venue 804 after user selected selector 912 in GUI 900. Venue 804 is now represented by a cut-away 3D structure 1006 having walls 1011, but whose virtual roof has been removed to reveal a partial inside view of venue 804 including points of interest 1020, 1030 and 1040 (e.g., terminals, shops, restaurants, restrooms, security check points) arranged according to the floor plan of venue 804. Details of 3D structure 1006 and points of interest 1020, 1030 and 1040 are contained in the map data provided from map server 102 over network 120 to user device 130 and processed by map application 132. As with each update of map data described herein, map data can be sent when the user selected selector 912 or it can be pre-sent to user device 130 and stored on device 130 while a prior GUI (e.g., GUI 900) is presented on the display.

In some implementations, as discussed below in more detail, points of interest may be displayed differently based on e.g., their relative size in comparison to other POIs in the venue 804, whether they will occlude other POIs, or by the type of category of POI. POI 1020, for example, is illustrated by a representation of its physical structure 1022, POI category indicator 1024 and textual label 1026 describing POI 1020 as "Terminal 3," by way of example. Because POI 1020 is a terminal, its category indicator 1024 is positioned at a far end of structure 1022 away from walkway 1012. POI 1030, for example, is illustrated by a representation of its physical structure 1032, POI category indicator 1034 and textual label 1036 describing POI 1030 as "Angel City Brewing," by way of example. Since POI 1030 is a restaurant within a terminal of venue 804, its POI category indicator 1034 placed at an approximate location within terminal 1 on map 1002. POI 1040, for example, is illustrated by a representation of its physical structure 1042 and POI category indicator 1044. POI 1040 is a parking structure between the terminals in venue 804. Other POIs shown on map 1002 would be identified in one of the manners described above for POIs 1020, 1030 and 1040.

GUI 1000 also includes placecard 1050 for venue 804. In some implementations, placecard 1050 includes information 1052 (e.g., name, type of venue) about venue 804. If the user device 130 is not within venue 804 at the time, field 1054 for retrieving driving directions is also presented in placecard 1050.

In some implementations, placecard 1050 also includes venue directory 1060 containing one or more POI category selectors 1062, 1064 and 1066 and search selector 1068. Each POI category selector 1062, 1064 and 1066 is associated with a category (e.g., terminals, shops, food, restroom, etc.) that the various POIs of venue 804 have been grouped into. The type of venue dictates the number of and type of categories to be used in directory 1060 and that the disclosed embodiments should not be limited to any number of or type of category for directory 1060 or any directory illustrated herein.

By way of example only, category selector 1062 can be used to select a category of POIs associated with terminals, category selector 1064 can be used to select a category of POIs associated with shops and category selector 1066 can be used to select a category of POIs associated with places to buy food. Search selector 1068 can be used by a user to initiate a manual search for a category or specific POI within venue 804 (as will be discussed below in more detail). In some implementations, POI category selectors 1062, 1064 and 1066 of venue directory 1060 are color coded (i.e., each one has its own color). In addition, the colors of the POI category indicators 1024, 1034 and 1044 are selected to match the colors of POI category selectors 1062, 1064 and 1066 used in venue directory 1060. As will be explained below in more detail, venue directory 1060 can be used by a user to a specific category of POIs to search for, browse and/or obtain more information about the POIs present in venue 804.

Figure 11:
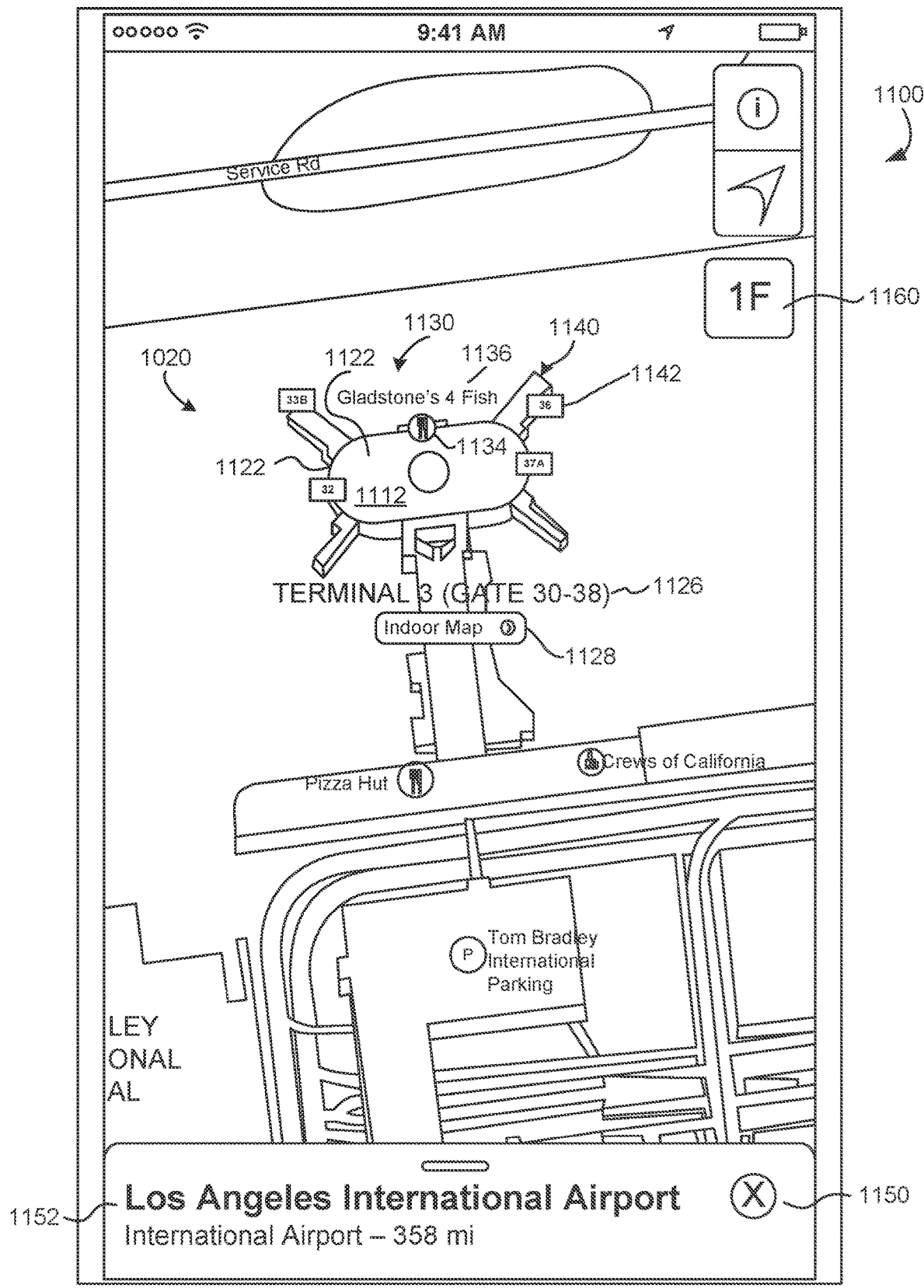
FIG. 11 is an example graphical user interface containing a zoomed-in view of a point of interest of the second type of venue.

In the illustrated example, Venue 804 includes POIs 1020, 1030 and 1040 illustrated in map 1002 that may each have their own indoor map (i.e., a venue sub-map or POI specific indoor map). For example, FIG. 11 illustrates an example graphical user interface 1100 containing a zoomed-in view of POI 1020 after the user selected POI 1020 from a prior GUI or after the user performed a zoom-in operation. In some implementations, more details of the POI are presented including a 3D physical structure 1122 of POI 1020 and internal geometry such as e.g., walkways 1112 and POIs 1130 and 1140 within POI 1020. Non-public spaces are not shown as a user would not be able to access them. As with other implementations, the introduction of the additional details may be accompanied by an animation providing a presentation the structures are e.g., arising from the ground, being dropped from above, passing through a roof, etc. In addition, in some implementations, security checkpoints will be exaggerated for easy identification among POIs. In addition to, or alternatively, the structure on map 1002 (or other maps) will be arranged or use de-emphasized sections to define the barriers of walkways and other structures in the airport.

In the illustrated example, POI 1130 includes POI category indicator 1134 and textual label 1136 describing POI 1130 as "Gladstone's 4 Fish," by way of example. POI 1140 is a terminal gate, for example, and is merely represented by gate indicator 1142 at an appropriate position within POI 1020 (i.e., terminal 3).

POI 1020 is also shown with selector 1128 for allowing the user to look inside and see an even more detailed inside view of POI 1020 (discussed in more detail with respect to GUI 1200).

GUI 1100 also includes placecard 1150 for POI 1020 (i.e., terminal 3). In some implementations, placecard 1150 includes information 1152 (e.g., name, type of POI, etc.) about POI 1020 or venue 804. Placecard 1150 is shown in its pulled-down state, but could include other information or links similar to other placecards discussed herein. In addition, GUI 1100 includes floor indicator 1160 alerting the user that the structures and POIs illustrated on GUI 1100 are from a particular floor of POI 1020.

Figure 12:
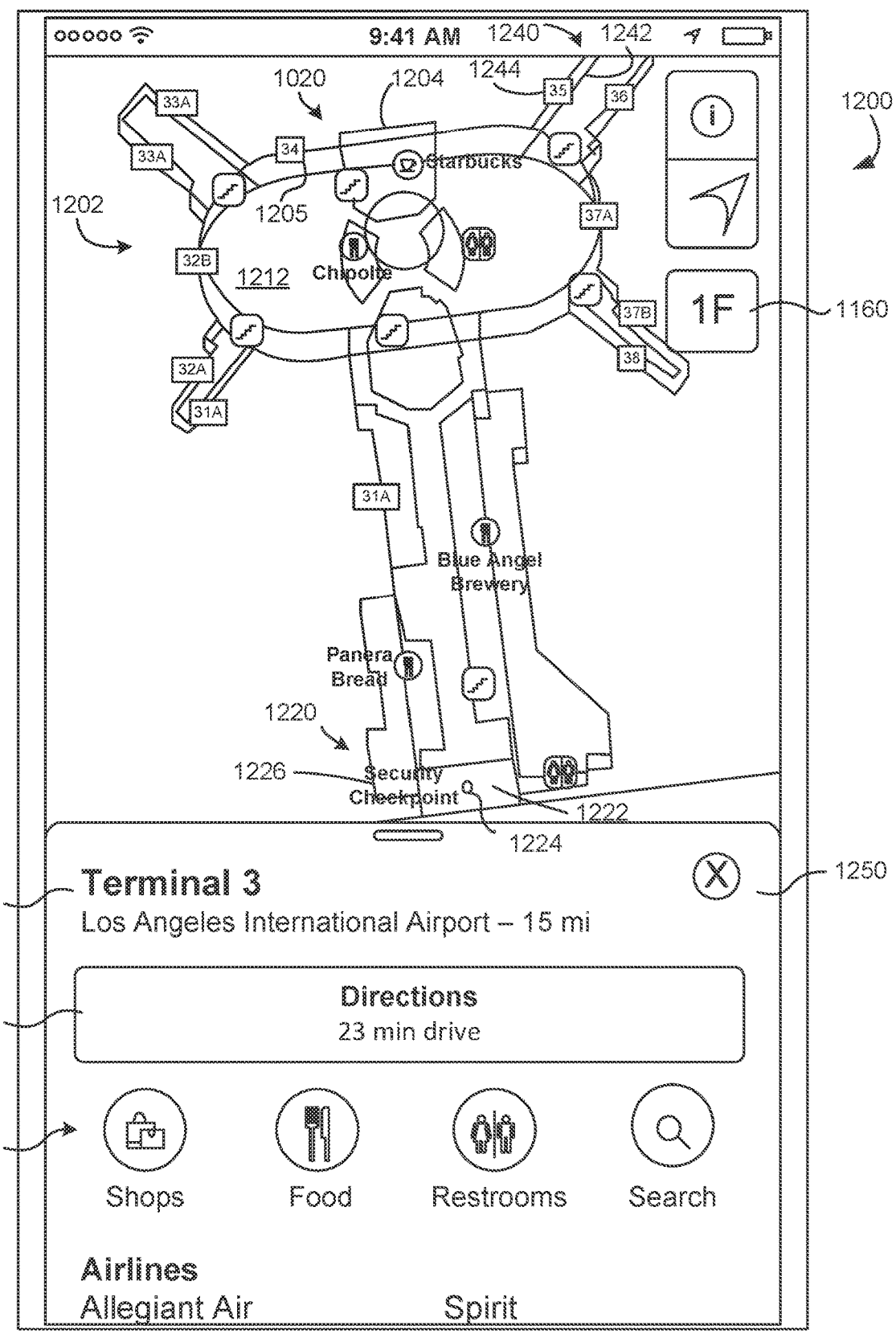
FIG. 12 is an example graphical user interface containing an indoor map of a selected point of interest.

FIG. 12 illustrates an example graphical user interface 1200 containing indoor map 1202 for POI 1020 (i.e., a sub-map for venue 804) after the user selected selector 1128 in GUI 1100. POI 1020 is now represented by a completely cut-away 3D structure 1204 having 3D walls 1205, but whose virtual roof has been removed to reveal a partial inside view of POI 1020 including additional points of interest 1220 and 1240 (e.g., gates, shops, restaurants, restrooms, security check points) arranged according to the floor plan of POI 1020. Details of 3D structure 1204 and points of interest 1220 and 1240 are contained in the map data provided from map server 102 over network 120 to user device 130 and processed by map application 132. As with each update of map data described herein, map data can be sent when the user selected selector 1128 or it can be pre-sent to user device 130 and stored on device 130 while a prior GUI (e.g., GUI 1100) is presented on the display.

POI 1220, for example, is illustrated by a representation of its physical structure 1222, POI dot 1224 and textual label 1226 describing POI 1220 as "Security Checkpoint," by way of example. Because POI 1020 is a checkpoint, its POI dot is at a front portion of structure 1222 next to walkway 1212. POI 1240, for example, is illustrated by a representation of its physical structure 1242 and gate indicator 1244. Other POIs shown on map 1202 would be identified in one of the manners described herein.

GUI 1200 also includes placecard 1250 for POI 1020. In some implementations, placecard 1250 includes information 1252 (e.g., name, type of POI) about POI 1020. If user device 130 is not within POI 1020, field 1254 for retrieving driving directions is also presented in placecard 1250. In some implementations, placecard 1250 also includes POI directory 1260 containing one or more POI category selectors and a search selector, similar to the directories discussed above. As with other directories described herein, POI category selectors of directory 1260 are color coded (i.e., each one has its own color) and the colors of POI category dots 1224 and indicators 1244 are selected to match the colors of POI category selectors used in directory 1260.

Example Venue Directory—Shopping Center

Figure 13:
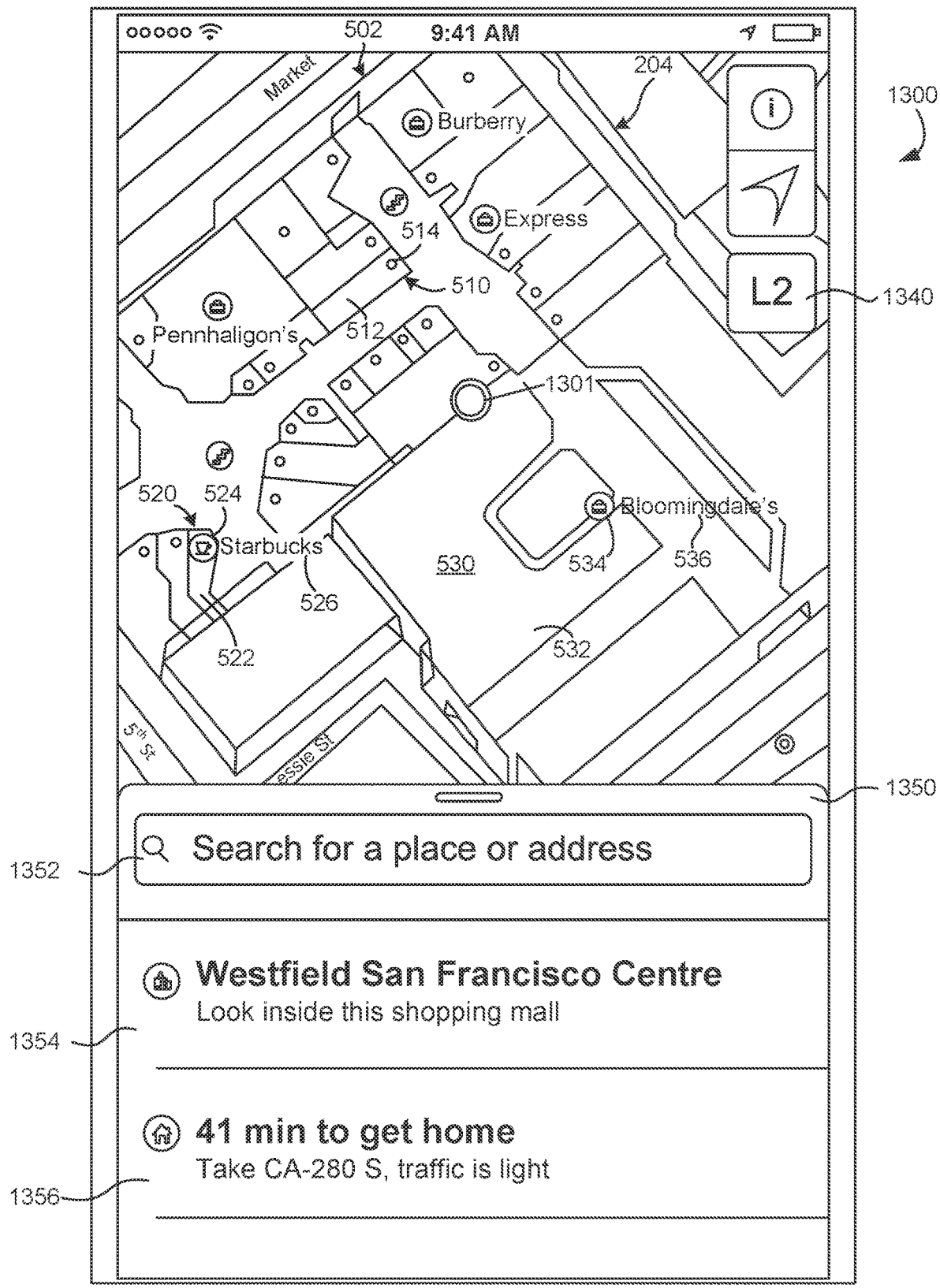
FIG. 13 is an example graphical user interface containing an indoor map of the first type of venue.

FIG. 13 illustrates an example graphical user interface 1300 containing indoor map 502 of venue 204 similar to GUI 500 illustrated in FIG. 5. As such, unless otherwise noted below, the description of features shown on map 502 are the same as those described above for FIG. 5. GUI 1300 is presented in the situation where the user is inside of venue 204. As noted above, a similar GUI can be presented based on a zoom-in operation performed on the GUI.

Map 502 shown on GUI 1300 includes current location puck 1301 showing the user's current location (i.e., location is user device 130) on map 502. GUI 1300 also illustrates POIs 510, 520 and 530 that are on level/floor 2 of venue 204 as reflected by floor indicator 1340. Puck 1301, as well as any current location puck discussed herein, can be updated and or moved at a rate suitable for an indoor application to avoid jitter or other display issues. Accordingly, in some implementations, puck 1301 is updated at a slower rate than a rate used to update a location puck for an outdoor map or navigation application.

GUI 1300 also includes tray 1350. In some implementations, tray 1350 includes graphical element 1352 for searching for a place or address. For example, graphical element 1352 can be a text input control. When the user selects graphical element 1352, user device 130 can present a virtual keyboard that the user can use to enter textual search parameters. After receiving the search parameters, map application 132 can send the search parameters to map service 104 on map server 102. Map service 104 can return locations matching the search parameters as search results. Map application 132 can present the search results on the display of user device 130 (discussed below in more detail).

In some implementations, when a user is outside the venue 204, tray 1350 also includes a selectable link 1354 to the venue's placecard (shown in FIG. 14 discussed below) providing further information and options available for venue 204. Tray 1350 also contains link 1356 to driving directions to e.g., the user's home. For example purposes only, and to aid the following discussion, it is presumed that the user has selected selectable link 1354.

Figure 14:
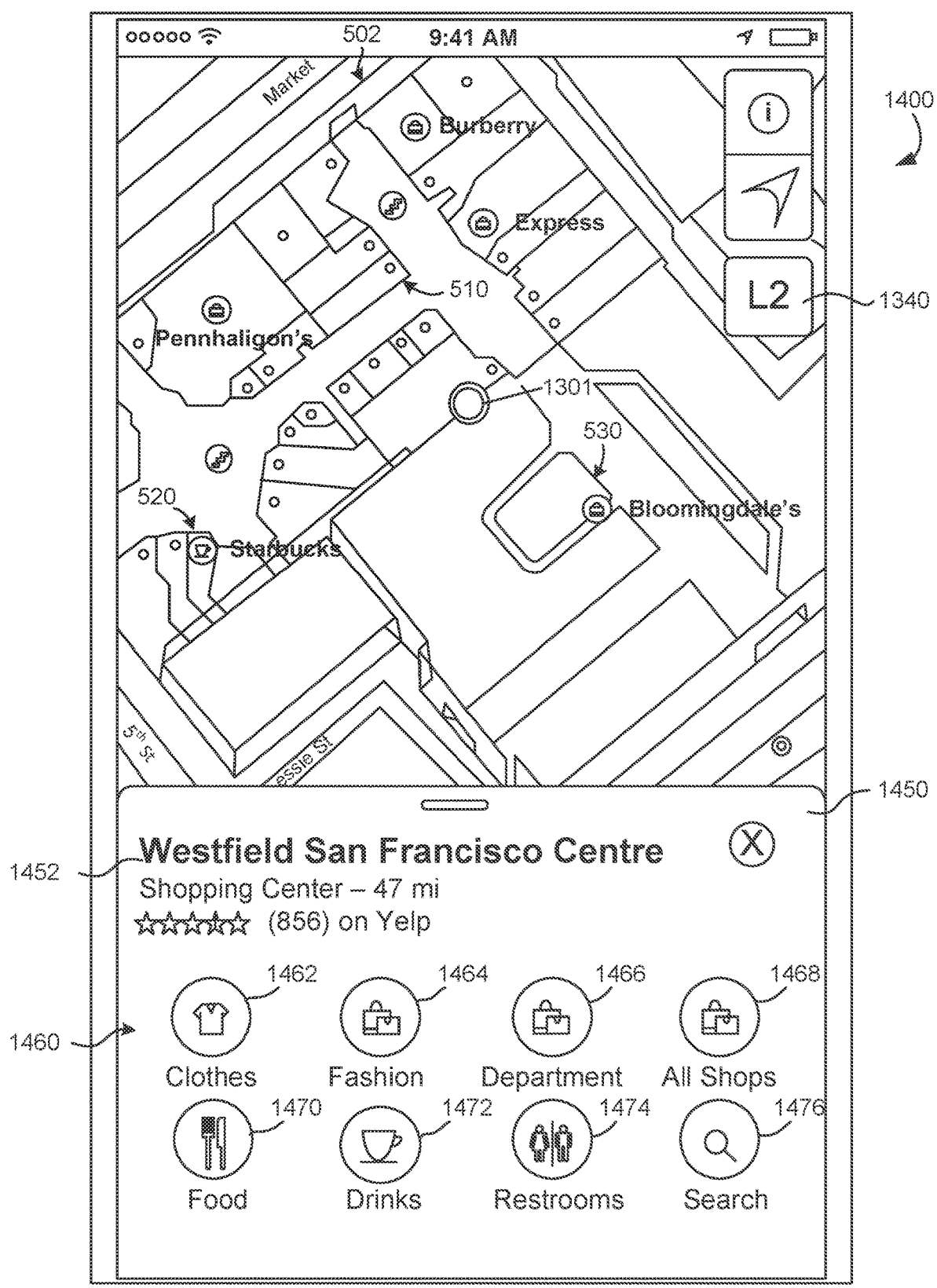
FIG. 14 is an example graphical user interface containing an indoor map along with a venue directory.

FIG. 14 illustrates an example graphical user interface 1400 containing indoor map 502 of venue 204 along with venue directory 1450. GUI 1400 is presented on user device 130 upon the user's selection of selectable link 1354 of GUI 1300. As with other implementations discussed above, regions outside of map 502 are de-emphasized (e.g., greyed-out), drawing the user's attention to map 502 and structure within venue 204. Map 502 shown on GUI 1400 includes current location puck 1301 showing the user's current location (i.e., location is user device 130) on map 502. GUI 1400 also illustrates POIs 510, 520 and 530 that are on level/floor 2 of venue 204 as reflected by floor indicator 1340.

GUI 1400 also includes placecard 1450 having venue directory 1460 containing one or more POI category selectors 1462, 1464, 1466, 1468, 1470, 1472 and 1474. Each POI category selector 1462, 1464, 1466, 1468, 1470, 1472 and 1474 is associated with a category (e.g., clothes, fashion, department stores, food, drinks, restrooms, etc.) that the various POIs of venue 204 have been grouped into. The type of venue dictates the number of and type of categories to be used in directory 1460 and that the disclosed embodiments should not be limited to any number of or type of category for directory 1460 or any directory illustrated herein. In addition, the type of categories can be chosen based on the types of POIs within the venue. Venue directory 1460 also comprises search selector 1476. Search selector 1476 can be used by a user to initiate a manual search for a category or specific POI within venue 204.

By way of example only, category selector 1462 can be used to select a category of POIs associated with clothing, category selector 1464 can be used to select a category of POIs associated with fashion, category selector 1466 can be used to select a category of POIs associated with department stores, category selector 1468 can be used to select a category of POIs associated with "all shops" at venue 204, category selector 1470 can be used to select a category of POIs associated with places to eat/purchase food, category selector 1472 can be used to select a category of POIs associated with places to drink/purchase drinks, and category selector 1474 can be used to select a category of POIs associated with restrooms. Although not shown, other categories could include e.g., gates, security checkpoints and baggage claims.

In some implementations, POI category selectors 1462, 1464, 1466, 1468, 1470, 1472 and 1474 of venue directory 1460 are color coded (i.e., each one has its own color). In addition, the colors of the POI dots 514 and POI category indicators 524 and 534 are selected to match the colors of POI category selectors 1462, 1464, 1466, 1468, 1470, 1472 and 1474 used in venue directory 1460. In some implementations, POI dots 514 and POI category indicators 524 and 534 will have colors based on their respective categories regardless of whether venue directory 1460 is displayed or not.

As can be appreciated, venue directory 1460 can be used by a user to a specific category of POIs to search for, browse and/or obtain more information about the POIs present in venue 204. In the following example, the user has selected POI selector 1462, initiating a search for clothing stores within venue 204.

Figure 15:
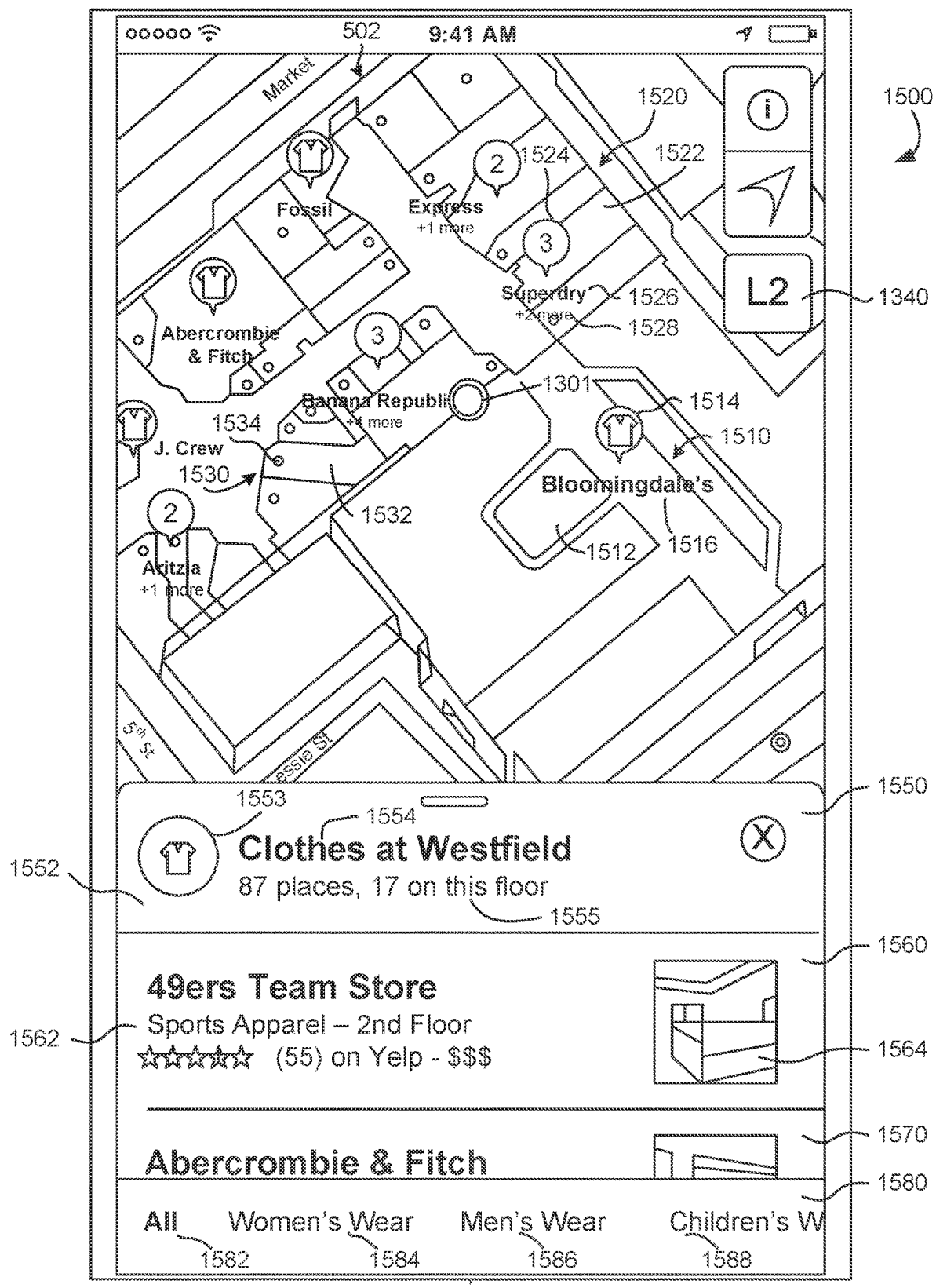
FIG. 15 is an example graphical user interface after the selection of point of interest category selector from the venue directory.

FIG. 15 illustrates an example graphical user interface 1500 presented on user device 130 upon the user's selection of POI selector 1462 of GUI 1400 (i.e., the selector associated with clothing stores within venue 204). Map 502 shown on GUI 1400 includes current location puck 1301 showing the user's current location (i.e., location is user device 130) on map 502.

Map 502 includes the structure and layout for the current floor as identified by floor indicator 1340, as previously described, but with the difference that only POIs 1510, 1520 and 1530 and other unlabeled POIs corresponding to the selected POI category (e.g., clothes) for the current floor are displayed. POIs not associated with the selected POI category (e.g., clothes) are not identified on map 502 (e.g., the POI dots/indicators are not visible) although their physical structure and layout remain. Likewise, POIs not on the indicated floor, whether corresponding to the selected category or not, are not displayed on map 502.

Points of interest matching the selected category and found on the current floor can be identified in many ways on map 502. For example, POI 1510 is represented by physical structure 1512, POI category indicator 1514 and textual label 1516 describing POI 1510 as "Bloomingdales," by way of example.

POI 1520, on the other hand, is represented by physical structure 1522, POI result indicator 1524, textual label 1526 describing POI 1520 as "Superdry," by way of example, and textual label 1528 containing the phrase "+2 more." As can be appreciated POI result indicator 1524 provides information that more than one POI matching the selected category is found at or within structure 1522. In the illustrated example, POI result indictor 1524 is a graphic with the number 3 in it, meaning that 3 POIs matching the selected category are found at or within structure 1522. To prevent cluttering of map 502, only one POI associated with POI 1520 has textual label 1526 describing the POI's name. Textual label 1528 alerts the user that "2 more" POIs are also present, in addition to "Superdry." In some implementations, a user can zoom-in on this region to make the other POIs visible.

POI 1530, for example, is merely represented by physical structure 1532 and POI dot 1534. As discussed previously, in some implementations POI category indicator 1514, POI result indicator 1524 and POI dot 1534 are shown in a color that matches the color of the selected POI category (i.e., shown in the same color as POI selector 1462). POI indicator 1514, POI result indicator 1524 and POI dot 1534 could be animated (e.g., flashing, spinning, bouncing up and down) to draw the user's attention to the POIs matching the selected category. Other POIs matching the selected POI category shown on map 502 can be identified in one of the manners described above for POIs 1510, 1520, or 1530.

GUI 1500 also includes placecard 1550 of all search results matching the selected POI even if the POI is on a different floor of venue 204. Placecard 1550 includes field 1552 containing information describing the search results. In the present example, field 1552 includes graphic 1553 representing the selected category (e.g., using the same graphic as POI category indicators and selectors discussed above), textual label 1554 describing the search results as "Clothes at Westfield." With this information, the user is reminded of what category search was performed. Although not shown, a second textual label could be presented to describe the total number of search results and the number of results found for the current floor. With this additional information, the user is informed of how many POIs matching the searched category were found and what matching POIs are on the current floor.

Placecard 1550 also contains a listing of POI search results 1560 and 1570 in e.g., alphabetical order. In some implementations, the listing of POI search results 1560 and 1570 can be in a different order such as e.g., organized by floor, or personalized based on prior user activity at venue 204, information included on the user's device (e.g., loyalty card information in emails, text messages, contacts), calendar information identifying the venue, a particular POI, etc., or a store credit card enrolled in Apple pay or another electronic wallet application. POI search result 1560, for example, includes field 1562 comprising information (e.g., name, type of venue, floor indication, link to an online review) about POI and graphic 1564 illustrating or being associated with the POI. POI search result 1570, as well as other search results in placecard 1550 can contain the same type of information.

In some implementations, placecard information concerning some, but not all, of POI search results 1560 and 1570 are transmitted to user device 130 and stored by map application 132 in response to the user's selection of a POI selector (e.g., POI selector 1462 of GUI 1400). For example, map data received from map server 130 may contain placecard information about the first 25 POI search results, which will speed up the transmission between server 102 and user device 130. In addition, transferring less than all of the information will lighten the load on user device 130 and preserve memory resources and battery power of device 130. Placecard information for other POIs may be retrieved when a specific POI is selected from the placecard 1560 or the list is scrolled past the first 25 POI search results. Information about more or less than 25 POI search results can be received from map server 102 in response to the user's selection of a POI selector (e.g., POI selector 1462 of GUI 1400) and the embodiments disclosed herein are not to be so limited.

In some implementations, placecard 1550 also includes filters 1580 for limiting the amount of results presented to the user. For example, filter 1582 is identified as "All", meaning that all search results are presented to the user when selected. In some implementations, this is the default setting for placecard 1550. In the illustrated example, filter 1584 is identified as "Women's Wear", meaning that only search results associated with women's clothing are presented to the user when selected. In the illustrated example, filter 1586 is identified as "Men's Wear", meaning that only search results associated with men's clothing are presented to the user when selected. In the illustrated example, filter 1588 is identified as "Children's Wear", meaning that only search results associated with children's clothing are presented to the user when selected. Placecard 1550 can include any type of filters suitable for the selected category, or no filters at all. In some implementations, the filters may be provided by the venue owner and can match the categories used for the traditional in-venue directory.

Figure 16:
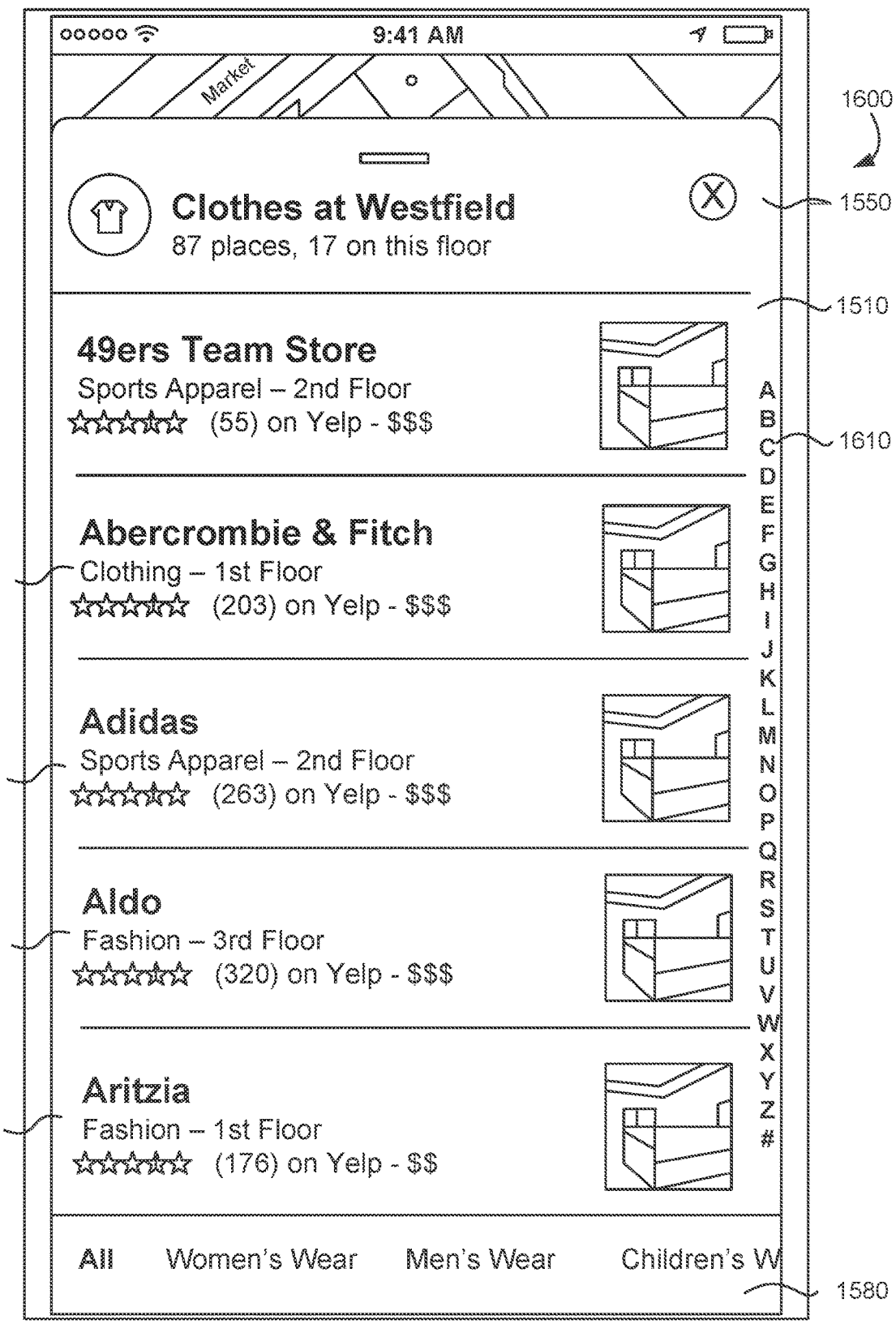
FIG. 16 is an example graphical user interface with an extended placecard of the placecard illustrated in FIG. 15.

As can be appreciated, placecard 1550 can be pulled up (i.e., extended) to reveal more POI search results. FIG. 16 illustrates an example graphical user interface 1600 presented on user device 130 after the user pulls placecard 1550 up towards the top of GUI 1500. As can be seen in the illustrated example, placecard 1550 now displays POI search results 1560, 1570, 1572, 1574 and 1576 as well as filters 1580. Pulling up placecard 1560 also reveals alphabetical index bar 1610. Alphabetical index bar 1610 allows the user to jump to any portion of the POI search results based on a first letter of the results.

Figure 17:
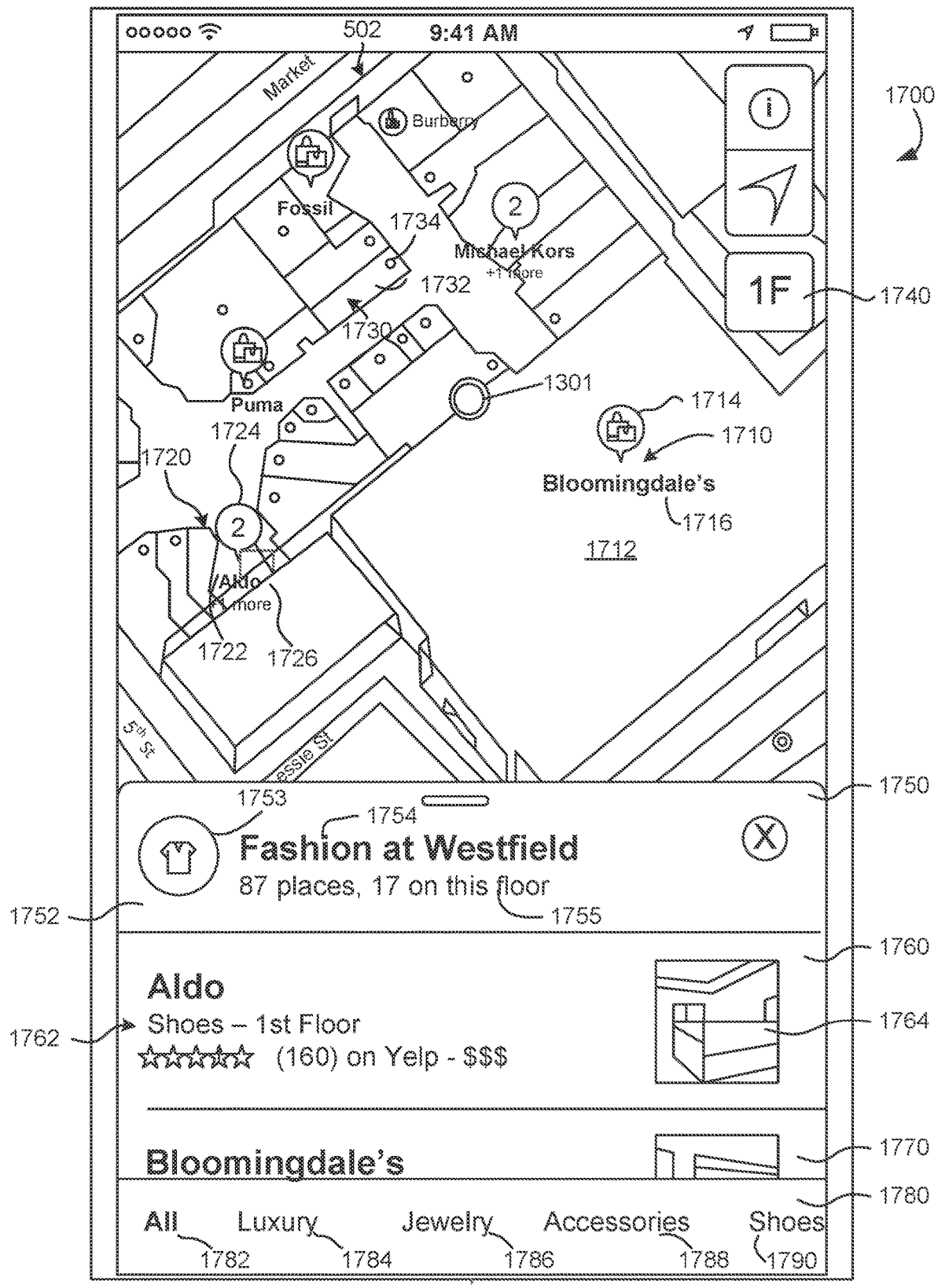
FIG. 17 is an example graphical user interface after the selection of another point of interest category selector from the venue directory.

FIG. 17 illustrates an example graphical user interface 1700 presented on user device 130 upon the user's selection of POI selector 1464 of GUI 1400 (i.e., the selector associated with fashion stores within venue 204). Map 502 shown on GUI 1700 includes current location puck 1301 showing the user's current location (i.e., location is user device 130) on map 502.

Map 502 includes the structure and layout for the current floor as identified by floor indicator 1740, as previously described, but with the difference that only POIs 1710, 1720 and 1730 and other POIs corresponding to the selected POI category (e.g., fashion) for the current floor are displayed. POIs not associated with the selected POI category (e.g., fashion) are not identified on map 502 (although their physical structure and layout remain). Likewise, POIs not on the indicated floor, whether corresponding to the selected category or not, are not displayed on map 502.

Points of interest matching the selected category and found on the current floor can be identified in many ways on map 502. For example, POI 1710 is represented by physical structure 1712, POI category indicator 1714 and textual label 1716 describing POI 1710 as "Bloomingdales," by way of example.

POI 1720, on the other hand, is represented by physical structure 1722, POI result indicator 1724, textual label 1726 describing POI 1720 as "Aldo," by way of example, and textual label 1728 containing the phrase "+1 more." As can be appreciated POI result indicator 1724 provides information that more than one POI matching the selected category is found at or within structure 1722. In the illustrated example, POI result indictor 1724 is a graphic with the number 2 in it, meaning that 2 POIs matching the selected category are found at or within structure 1722. To prevent cluttering of map 502, only one POI associated with POI 1720 has textual label 1726 describing the POI's name. Textual label 1728 alerts the user that "1 more" POI is also present, in addition to "Aldo." In some implementations, a user can zoom-in on this region to make the other POI visible.

POI 1730, for example, is merely represented by physical structure 1732 and POI dot 1734. As discussed previously, in some implementations POI category indicator 1714, POI result indicator 1724 and POI dot 1734 are shown in a color that matches the color of the selected POI category (i.e., shown in the same color as POI selector 1464). POI indicator 1714, POI result indicator 1724 and POI dot 1734 could be animated (e.g., flashing, spinning, bouncing up and down) to draw the user's attention to the POIs matching the selected category. Other POIs matching the selected POI category shown on map 502 would be identified in one of the manners described above for POIs 1710, 1720, or 1730.

GUI 1700 also includes placecard 1750 of all search results matching the selected POI even if the POI is on a different floor of venue 204. Placecard 1750 includes field 1752 containing information describing the search results. In the present example, field 1752 includes graphic 1753 representing the selected category (e.g., using the same graphic as POI category indicators and selectors discussed above) and textual label 1754 describing the search results as "Fashion at Westfield." With this information, the user is reminded of what category search was performed. Although not shown, a second textual label could be presented to describe the total number of search results and the number of results found for the current floor. With this additional information, the user is informed of how many POIs matching the searched category were found and what matching POIs are on the current floor.

Placecard 1750 also contains a listing of POI search results 1760 and 1770 in e.g., alphabetical order. In some implementations, the listing of POI search results 1760 and 1770 can be in a different order such as e.g., organized by floor, or personalized based on prior user activity at venue 204, information included on the user's device (e.g., loyalty card information in emails, text messages, contacts), calendar information identifying the venue, a particular POI, etc., or a store credit card enrolled in Apple pay or another electronic wallet application. POI search result 1760, for example, includes field 1762 comprising information (e.g., name, type of venue, floor indication, link to an online review) about the POI and graphic 1764 illustrating or being associated with the POI. POI search result 1770, as well as other search results in placecard 1750 would contain the same type of information.

As discussed above, in some implementations, placecard information concerning some, but not all, of POI search results 1760 and 1770 are transmitted to user device 130 and stored by map application 132 in response to the user's selection of a POI selector (e.g., POI selector 1464 of GUI 1400). In some implementations, placecard 1750 also includes filters 1780 for limiting the amount of results presented to the user. For example, filter 1782 is identified as "All", meaning that all search results are presented to the user when selected. In some implementations, this is the default setting for placecard 1750. In the illustrated example, filter 1784 is identified as "Luxury", meaning that only search results associated with luxurious fashion items are presented to the user when selected. In the illustrated example, filter 1786 is identified as "Jewelry", meaning that only search results associated with jewelry are presented to the user when selected. In the illustrated example, filter 1788 is identified as "Accessories", meaning that only search results associated with accessories are presented to the user when selected. In the illustrated example, filter 1790 is identified as "Shoes", meaning that only search results associated with shoes are presented to the user when selected. Placecard 1750 can include any type of filters suitable for the selected category, or no filters at all.

Figure 18:
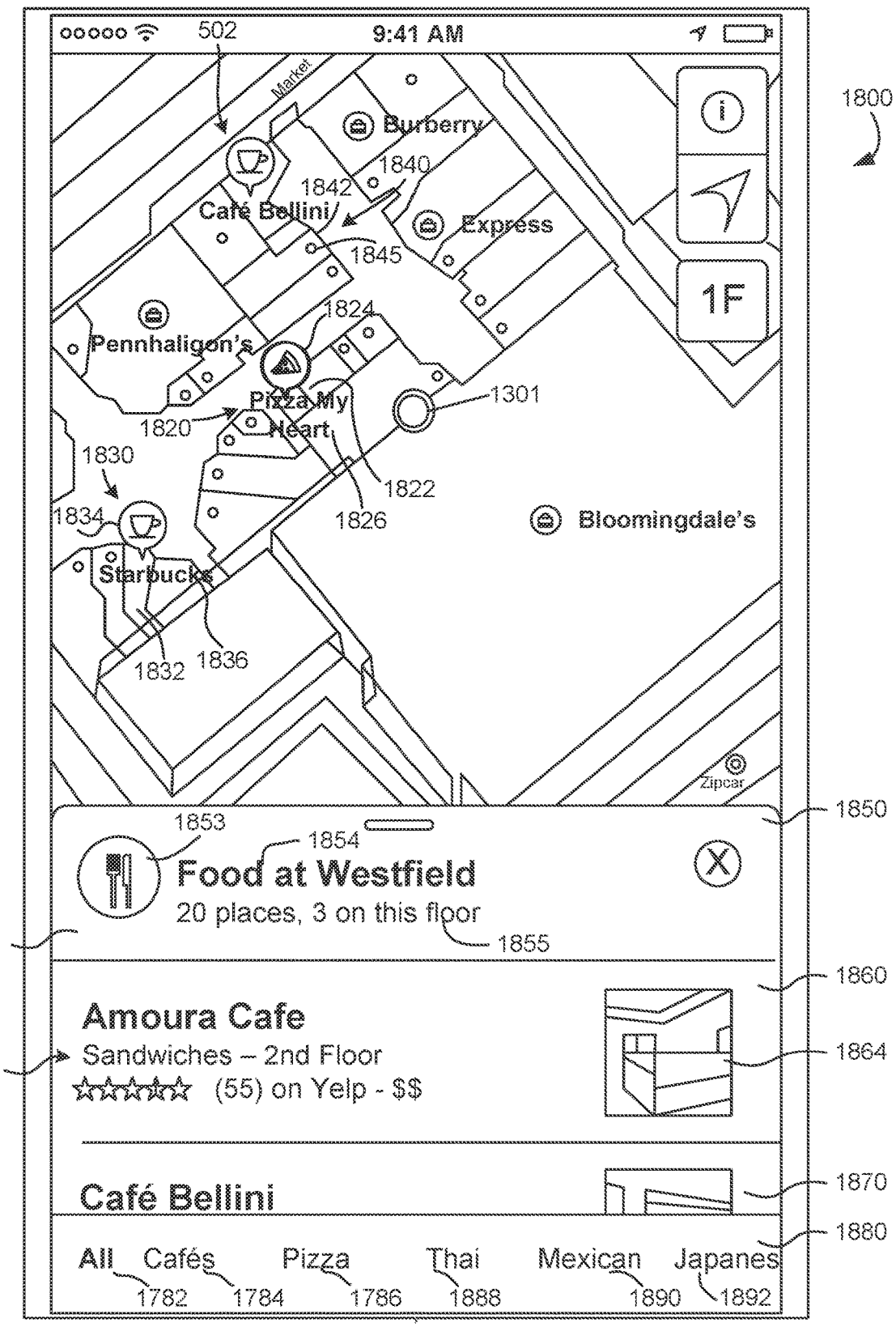
FIG. 18 is an example graphical user interface after the selection of another point of interest category selector from the venue directory.

FIG. 18 illustrates an example graphical user interface 1800 presented on user device 130 upon the user's selection of POI selector 1470 of GUI 1400 (i.e., the selector associated with food within venue 204). Map 502 shown on GUI 1800 includes current location puck 1301 showing the user's current location (i.e., location is user device 130) on map 502.

Map 502 includes the structure and layout for the current floor as identified by floor indicator 1840, as previously described, but with the difference that only POIs 1820, 1830 and 1840 and other POIs corresponding to the selected POI category (e.g., food) for the current floor are displayed. POIs not associated with the selected POI category (e.g., food) are not identified on map 502 (although their physical structure and layout remain). Likewise, POIs not on the indicated floor, whether corresponding to the selected category or not, are not displayed on map 502.

Points of interest matching the selected category and found on the current floor can be identified in many ways on map 502. For example, POI 1820 is represented by physical structure 1822, POI food category indicator 1824 and textual label 1826 describing POI 1820 as "Pizza My Heart," by way of example. POI food category indicator 1824 is a graphic representing pizza, serving as a sub-category of the selected POI food category. Thus, with indicator 1824, the user is presented with additional clarification that the matching POI result is not only food, but a pizza parlor. The symbol/graphic associated with food POI selector 1470 could have been used instead or in addition to POI food category indicator 1824.

POI 1830 is represented by physical structure 1832, POI food category indicator 1834 and textual label 1836 describing POI 1830 as "Starbucks," by way of example. POI food category indicator 1834 is a graphic representing coffee, serving as a sub-category of the selected POI food category. Thus, with indicator 1834, the user is presented with additional clarification that the matching POI result is not only food, but a coffee shop. The symbol/graphic associated with food POI selector 1470 could have been used instead or in addition to POI food category indicator 1834.

POI 1840, for example, is merely represented by physical structure 1842 and POI dot 1844. As discussed previously, in some implementations POI food category indicators 1824 and 1834 and POI dot 1844 are shown in a color that matches the color of the selected POI category (i.e., shown in the same color as POI selector 1470). POI food category indicators 1824 and 1834 and POI dot 1844 could be animated (e.g., flashing, spinning, bouncing up and down) to draw the user's attention to the POIs matching the selected category. Other POIs matching the selected POI category shown on map 502 can be identified in one of the manners described above for POIs 1820, 1830, or 1840.

GUI 1800 also includes placecard 1850 of all search results matching the selected POI even if the POI is on a different floor of venue 204. Placecard 1850 includes field 1852 containing information describing the search results. In the present example, field 1852 includes graphic 1853 representing the selected category (e.g., using the same graphic as POI category indicators and selectors discussed above) and textual label 1854 describing the search results as "Food at Westfield." With this information, the user is reminded of what category search was performed. Although not shown, a second textual label could be presented to describe the total number of search results and the number of results found for the current floor. With this additional information, the user is informed of how many POIs matching the searched category were found and what matching POIs are on the current floor.

Placecard 1850 also contains a listing of POI search results 1860 and 1870 in e.g., alphabetical order. In some implementations, the listing of POI search results 1860 and 1870 can be in a different order such as e.g., organized by floor, or personalized based on prior user activity at venue 204, information included on the user's device (e.g., loyalty card information in emails, text messages, contacts), calendar information identifying the venue, a particular POI, etc., or a store credit card enrolled in Apple pay or another electronic wallet application. POI search result 1860, for example, includes field 1862 comprising information (e.g., name, type of venue, floor indication, link to an online review) about the POI and graphic 1864 illustrating or associated with the POI. POI search result 1870, as well as other search results in placecard 1850, can contain the same type of information.

As discussed above, in some implementations, placecard information concerning some, but not all, of POI search results 1860 and 1870 is transmitted to user device 130 and stored by map application 132 in response to the user's selection of a POI selector (e.g., POI selector 1470 of GUI 1400). In some implementations, placecard 1850 also includes filters 1880 for limiting the amount of results presented to the user. For example, filter 1882 is identified as "All", meaning that all search results are presented to the user when selected. In some implementations, this is the default setting for placecard 1850. In the illustrated example, filter 1884 is identified as "Cafes", meaning that only search results associated with cafes are presented to the user when selected. In the illustrated example, filter 1886 is identified as "Pizza", meaning that only search results associated with pizza parlors are presented to the user when selected. In the illustrated example, filter 1888 is identified as "Thai", meaning that only search results associated with Thai food are presented to the user when selected. In the illustrated example, filter 1889 is identified as "Japanese", meaning that only search results associated with Japanese food are presented to the user when selected. In the illustrated example, filter 1890 is identified as "Mexican", meaning that only search results associated with Mexican food are presented to the user when selected. Placecard 1850 can include any type of filters suitable for the selected category, or no filters at all. In some implementations, the filters may be provided by the venue owner and can match the categories used for the traditional in-venue directory.

Figure 19:
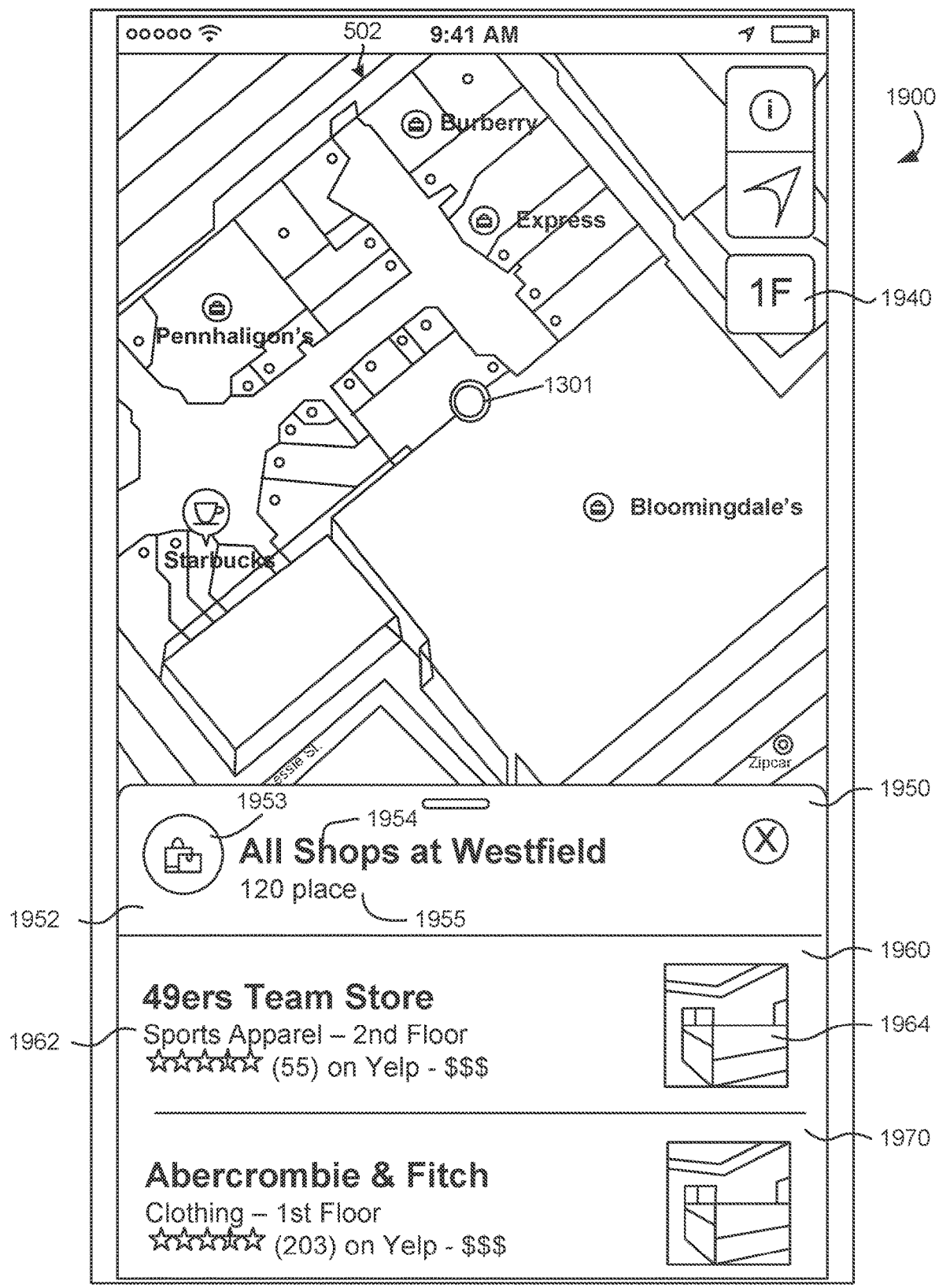
FIG. 19 is an example graphical user interface after the selection of another point of interest category selector from the venue directory.

FIG. 19 illustrates an example graphical user interface 1900 presented on user device 130 upon the user's selection of POI selector 1468 of GUI 1400 (i.e., the selector associated with all shops within venue 204). Map 502 shown on GUI 1900 includes current location puck 1301 showing the user's current location (i.e., location is user device 130) on map 502. Map 502 includes the structure and layout for the current floor as identified by floor indicator 1940, as previously described, with POIs for all shops on the current floor.

GUI 1900 also includes placecard 1950 of all search results matching the selected POI even if the POI is on a different floor of venue 204. Placecard 1950 includes field 1952 containing information describing the search results. In the present example, field 1952 includes graphic 1953 representing the selected category (e.g., using the same graphic as POI category indicators and selectors discussed above) and textual label 1954 describing the search results as "All Shops at Westfield." With this information, the user is reminded of what category search was performed. Although not shown, a second textual label could be presented to describe the total number of search results and the number of results found for the current floor. With this additional information, the user is informed of how many POIs matching the searched category were found and what matching POIs are on the current floor.

Placecard 1950 also contains a listing of POI search results 1960 and 1970 in e.g., alphabetical order. In some implementations, the listing of POI search results 1960 and 1970 can be in a different order such as e.g., organized by floor, or personalized based on prior user activity at venue 204, information included on the user's device (e.g., loyalty card information in emails, text messages, contacts), calendar information identifying the venue, a particular POI, etc., or a store credit card enrolled in Apple pay or another electronic wallet application. POI search result 1960, for example, includes field 1962 comprising information (e.g., name, type of venue, floor indication, link to an online review) about the POI. POI search result 1970, as well as other search results in placecard 1950 would contain the same type of information.

As discussed above, in some implementations, placecard information concerning some, but not all, of POI search results 1960 and 1970 are transmitted to user device 130 and stored by map application 132 in response to the user's selection of a POI selector (e.g., POI selector 1468 of GUI 1400).

Figure 20:
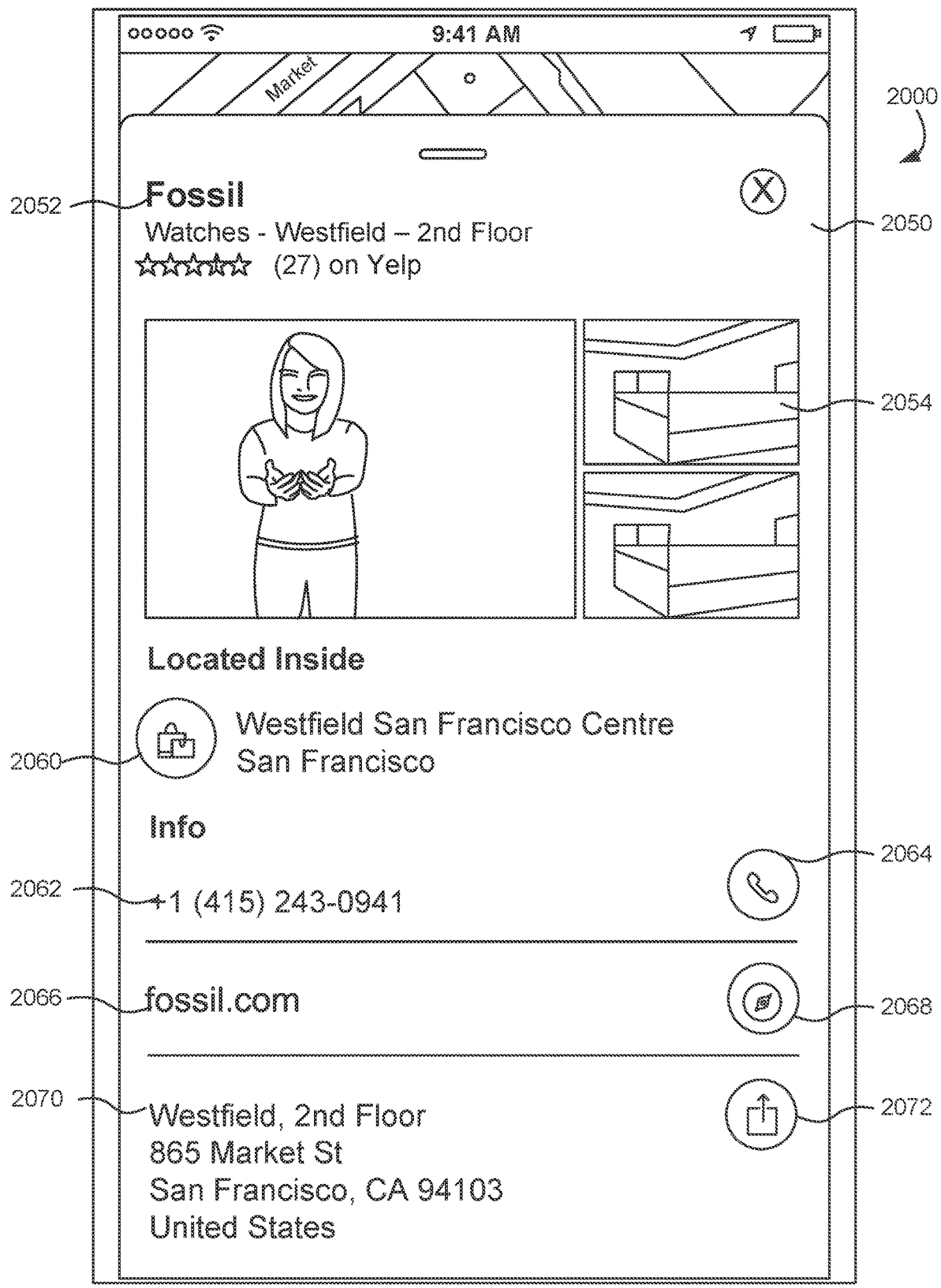
FIG. 20 is an example graphical user interface providing rich information concerning a selected point of interest.

In some implementations, any of the POIs matching the selected category can be selected by selecting its entry in placecards 1550, 1750, 1850 and 1950 or directly from map 502. Selection of a specific POI will cause rich information about the POI to be presented to the user on user device 130. FIG. 20 illustrates an example graphical user interface 2000 presented on user device 130 upon the user's selection of a POI identified as "Fossil," by way of example. GUI 2000 includes placecard 2050 for the selected POI. Placecard 2050 includes rich information about the selected POI (described below).

Placecard 2050 includes field 2052 containing information describing the POI. In the present example, field 2052 includes information (e.g., name, type of POI, location within venue, link to an online review). Placecard 2050 also include field 2060 comprising information (e.g., a graphic used by map application 132 to represent this type of venue, name of venue, location, etc.) about the venue the selected POI is contained in. In some implementations, placecard 2050 can include field 2062 with contact information of the POI and selector 2064 for initiating a phone call to the POI.

In some implementations, placecard 2050 also contains field 2066 identifying a website of the POI and link 2068 for linking to the POI's website. In some implementations, placecard 2050 also contains field 2070 identifying an address of the POI and selector 2072 for sharing the address or other contact information concerning the POI.

In some implementations, the rich placecard information of some, but not all, of POI search results are transmitted to user device 130 and stored by map application 132 in response to the user's selection of a POI selector. For example, map data received from map server 130 may contain rich placecard information about the first 25 POI search results, which will speed up the transmission between server 102 and user device 130. In addition, transferring less than all of the information will lighten the load on user device 130 and preserve memory resources and battery power of device 130. Rich placecard information for other POIs will need to be retrieved when the POI is selected and its placecard 2050 needs to be displayed. Rich information about more or less than 25 POI search results can be received from map server 102 in response to the user's selection of a POI selector and the embodiments disclosed herein are not to be so limited.

It may be desirable for a user to view the physical structure, layout and location of POIs that match the selected category, but are not shown on map 502 because they are not located on the current floor. For example, map 502 illustrated in GUI 1500 (FIG. 15) only shows the physical structure, layout and location of POIs 1510, 1520 and 1530 (and other matching POIs) found on floor 2. The remaining matching POIs (i.e., matching POIs on different floors) are found in placecard 1550. The user should be provided with a mechanism for viewing the physical structure, layout and location of POIs that match the selected category, but are on a different floor.

Figure 21:
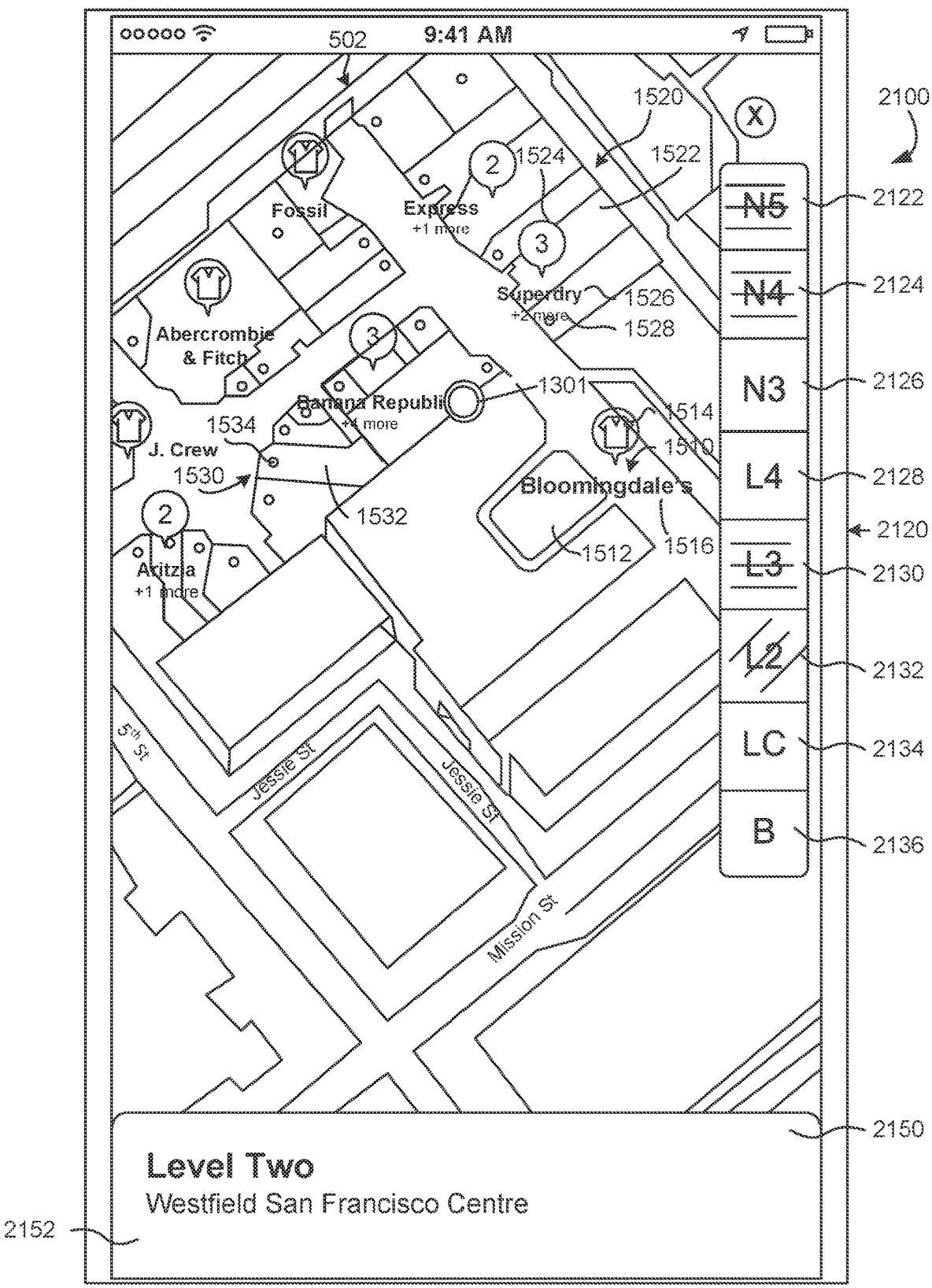
FIG. 21 is an example graphical user interface that includes a floor switcher identifying a current floor.

FIG. 21 illustrates an example graphical user interface 2100 presented on user device 130 that includes floor switcher 2120 allowing the user to switch from the current floor (as indicted by shaded identifier 2132) to a different floor, including floors that also contains POIs matching the selected POI category.

GUI 2100 contains map 502 containing POIs 1510, 1520 and 1530 and other POIs corresponding to the selected POI category (e.g., clothes). These are the same POIs 1510, 1520 and 1530 discussed above with respect to GUI 1500. POIs not associated with the selected POI category (e.g., clothes) are not identified on map 502 (although their physical structure and layout remain on map 502). Likewise, POIs not on the indicated floor, whether corresponding to the selected category or not, are not displayed on map 502. In some implementations, floor switch 2120 will be presented and can become active when, e.g., a user selects floor indicator 1340 on GUI 1500. The selection also causes field 2150 to be presented on GUI 2100. Field 2150 includes text 2152 identifying the current floor as "Level Two."

In some implementations, floor switcher 2120 includes floor indicator 2122, 2124, 2126, 2128, 2130, 2132, 2134 and 2136 for each publically accessible floor within venue 204. As can be seen, each indicator 2122, 2124, 2126, 2128, 2130, 2132, 2134 and 2136 includes text (i.e., letter, number, or letter/number combination) identifying the floor within venue 204. In some implementations, the text within floor indicators 2122, 2124, 2126, 2128, 2130, 2132, 2134 and 2136 resemble or match the text used to identify buttons on an elevator within venue 204.

In the present example, indicator 2132 is emphasized to represent that this is the current floor shown on map 502. In the illustrated example, diagonal lines are used to show indicator 2132 as emphasized. Other visual treatments (e.g., different color text or background, shading, flashing or animated text and or background) could be used to emphasize indicator 2132. Indicators for floors without POI search results will be inactive and will have their text or background de-emphasized (e.g., greyed-out, removed, have a different background than the background used for active floors) so that the user does attempt to select them. In the illustrated example, floors N5, N4 and L3 do not have any POIs that satisfy the POI search. For example, the text within indicators 2122, 2124 and 2130 are de-emphasized on selector 2120. In the illustrated example, horizontal lines are used to shown that floors N5, N4 and L3 do not have any POIs that satisfy the POI search. This is merely an example and other visual treatments could be used to show floors that are not selectable. In the illustrated example, floors N3, L4, L2, LC and B have POI search results. As such, the text within indicators 2126, 2128, 2132, 2134 and 2136 will not be de-emphasized on selector 2120, meaning that these indicators are active.

Figure 22:
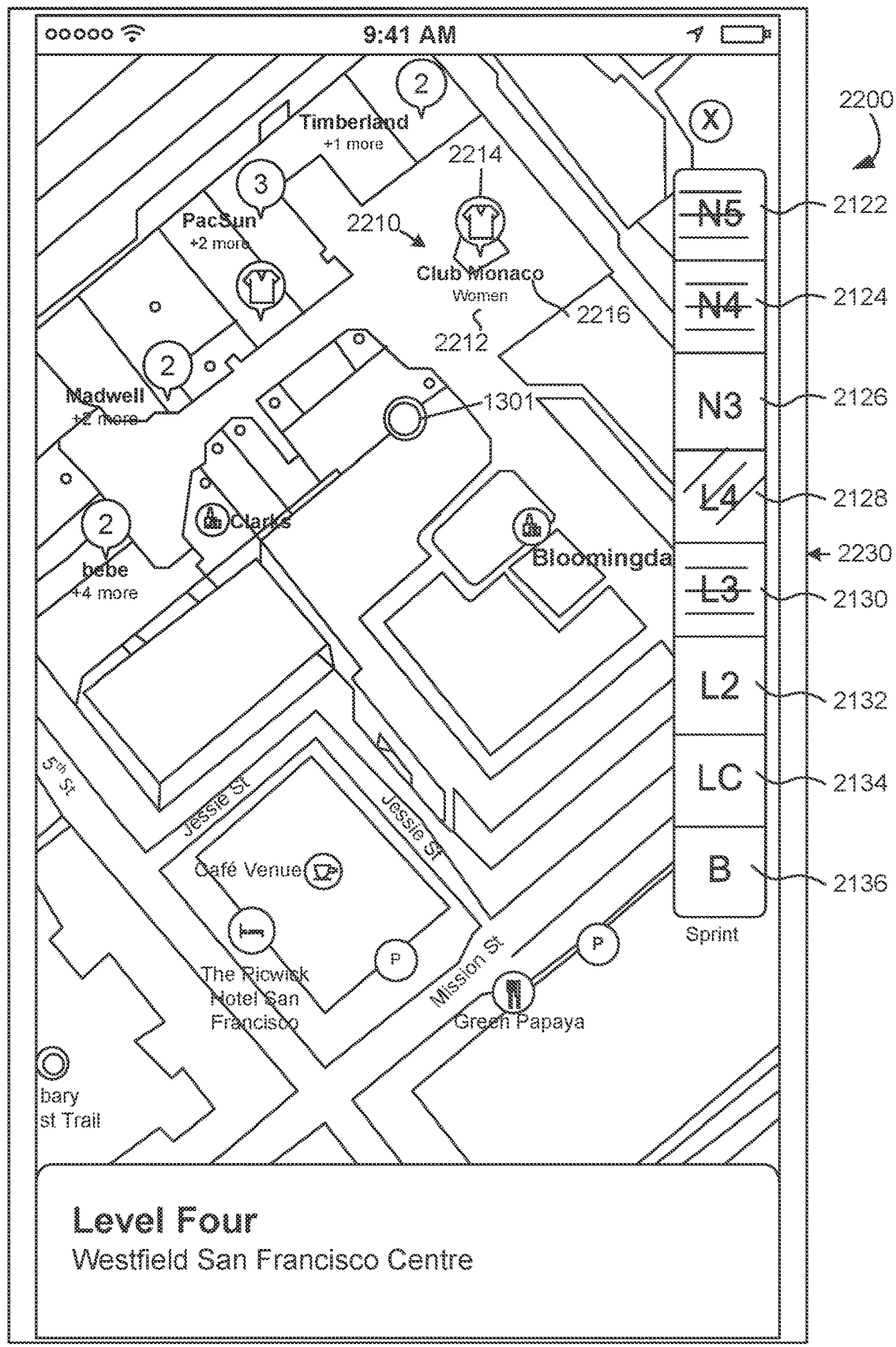
FIG. 22 is an example graphical user interface that includes the floor switcher identifying a new floor.

FIG. 22 illustrates an example graphical user interface 2200 presented on user device 130 that includes a floor switcher 2120 that has been used to switch the view to a different floor within venue 204. In the present example, the user has selected indictor 2128 to view the physical structure, layout and location of POIs that match the selected category on floor L4. In the present example, indicator 2128 is emphasized to represent that this is the current floor shown on map 502. As discussed above, indicator 2128 may be emphasized by any visual treatment and the embodiment is not to be limited to the illustrated example. The selection also causes field 2150 to change its contents. For example, field 2150 now includes text 2252 identifying the current floor as "Level Four."

Figure 22A:
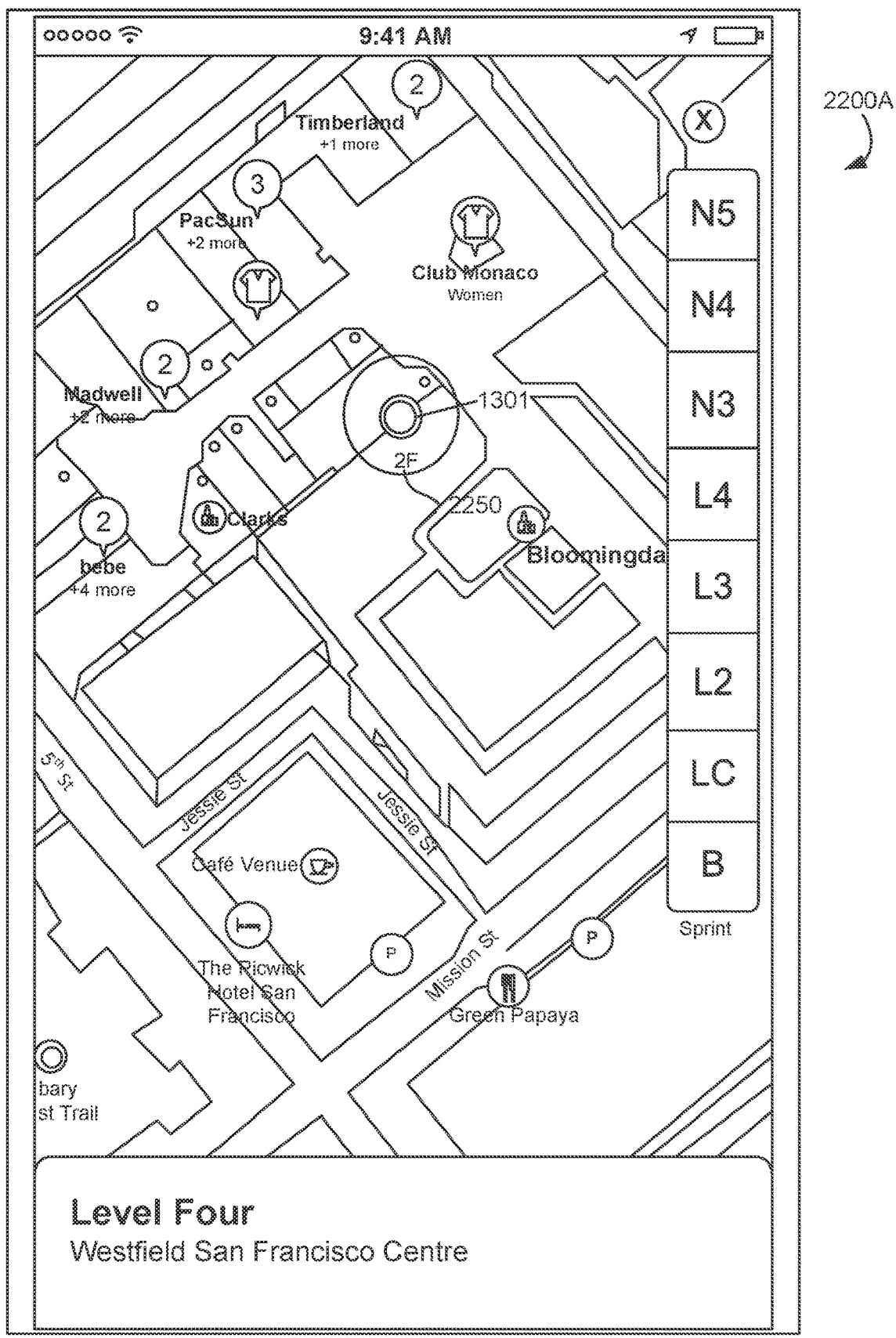
FIG. 22A is an example graphical user interface that includes the floor switcher identifying a new floor and an example of a more prominent user location identifier.
Figure 22B:
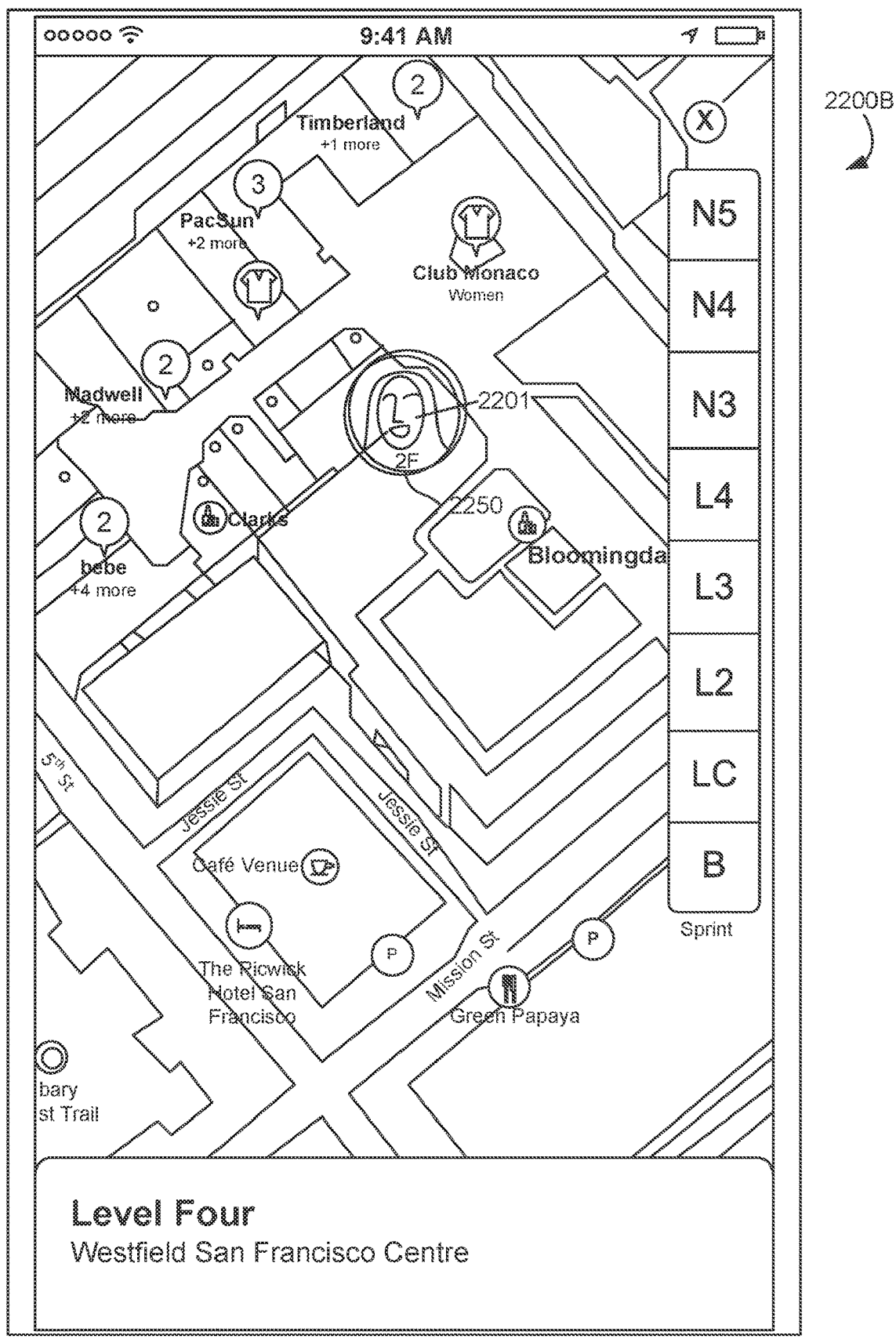
FIG. 22B is an example graphical user interface that includes the floor switcher identifying a new floor and another example of a more prominent user location identifier.

In some implementations, switching floors causes a quick animation that conveys vertical movement to be presented on the display. The animation simulates ascending/descending floor such as the movement in an elevator. In some implementations, current location puck 1301 showing the user's current location (i.e., location is user device 130) is always visible regardless of the floor the user is currently viewing. In some implementations, when the user is on a different floor than the one displayed in map 502, a more prominent identifier will be used along with or instead of user location puck 1301. For example, FIG. 22A illustrates an example graphical user interface 2200A, which is similar to GUI 2000 of FIG. 22. GUI 2200A, however, includes textual indicator 2250 next to current location puck 1301. In the illustrated example textual indicator 2250 is "2F" indicates that the user is on the second floor. FIG. 22B illustrates an example graphical user interface 2200B, which is similar to GUI 2000 of FIG. 22. GUI 2200B, however, replaces the current location puck with a more prominent graphic 2250. Graphic 2250 can be an image of the user or some other visual indicator (e.g., cartoon graphic) to draw the user's attention that he or she is on a different floor than what is shown in map 502. GUI 2200B also includes textual indicator 2250 next to graphic 2250 to indicate that the user is on the second floor.

Example Venue Directory—Airports

Figure 23:
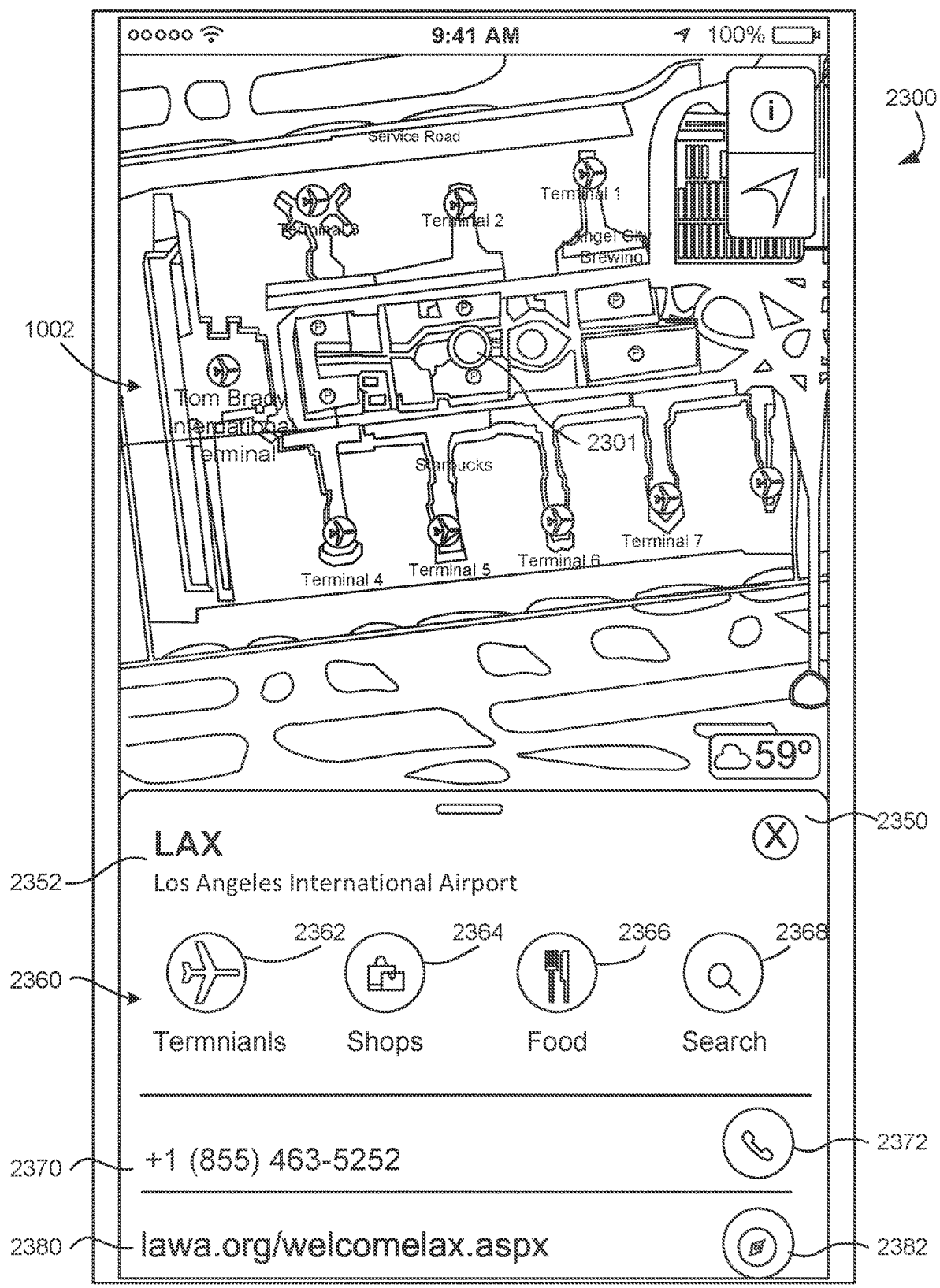
FIG. 23 is an example graphical user interface containing an indoor map of along with a venue directory for the second type of venue.

FIG. 23 illustrates an example graphical user interface 2300 containing indoor map 1002 of venue 804 along with venue directory 2350. As with other implementations discussed above, regions outside of map 1002 are de-emphasized (e.g., greyed-out), drawing the user's attention to the map 1002 and structure within venue 804. Map 1002 shown on GUI 2300 includes current location puck 2301 showing the user's current location (i.e., location is user device 130) on map 1002.

GUI 2300 also includes placecard 2350 having venue directory 2360 containing one or more POI category selectors 2362, 2364 and 2366 and search selector 2368. Each POI category selector 2362, 2364 and 2366 is associated with a category (e.g., terminals, shops, food, restrooms, etc.) that the various POIs of venue 804 have been grouped into. The type of venue dictates the number of and type of categories to be used in directory 2360 and that the disclosed embodiments should not be limited to any number of or type of category for directory 2360 or any directory illustrated herein. Venue directory 1460 also comprises search selector 2368. Search selector 2368 can be used by a user to initiate a manual search for a category or specific POI within venue 804.

By way of example only, category selector 2362 can be used to select a category of POIs associated with terminals, category selector 2364 can be used to select a category of POIs associated with shops, and category selector 2366 can be used to select a category of POIs associated with places to eat/purchase food within venue 804.

In some implementations, POI category selectors 2362, 2364 and 2366 of venue directory 2360 are color coded (i.e., each one has its own color). In addition, the colors of the POI dots and POI category indicators on map 1002 or other maps are selected to match the colors of POI category selectors 2362, 2364 and 2366 used in venue directory 2360. In some implementations, the POI dots and POI category indicators on map 1002 or other maps will have colors based on their respective categories regardless of whether venue directory 2360 is displayed or not.

In some implementations, placecard 2350 can include field 2370 with contact information of venue 804 and selector 2372 for initiating a phone call to venue 804. In some implementations, placecard 2350 also contains field 2380 identifying a website of venue 804 and link 2382 for linking to venue 804's website.

As can be appreciated, venue directory 2360 can be used by a user to a specific category of POIs to search for, browse and/or obtain more information about the POIs present in venue 804. In the following example, the user has selected POI selector 2362, initiating a search for terminals within venue 804.

Figure 24:
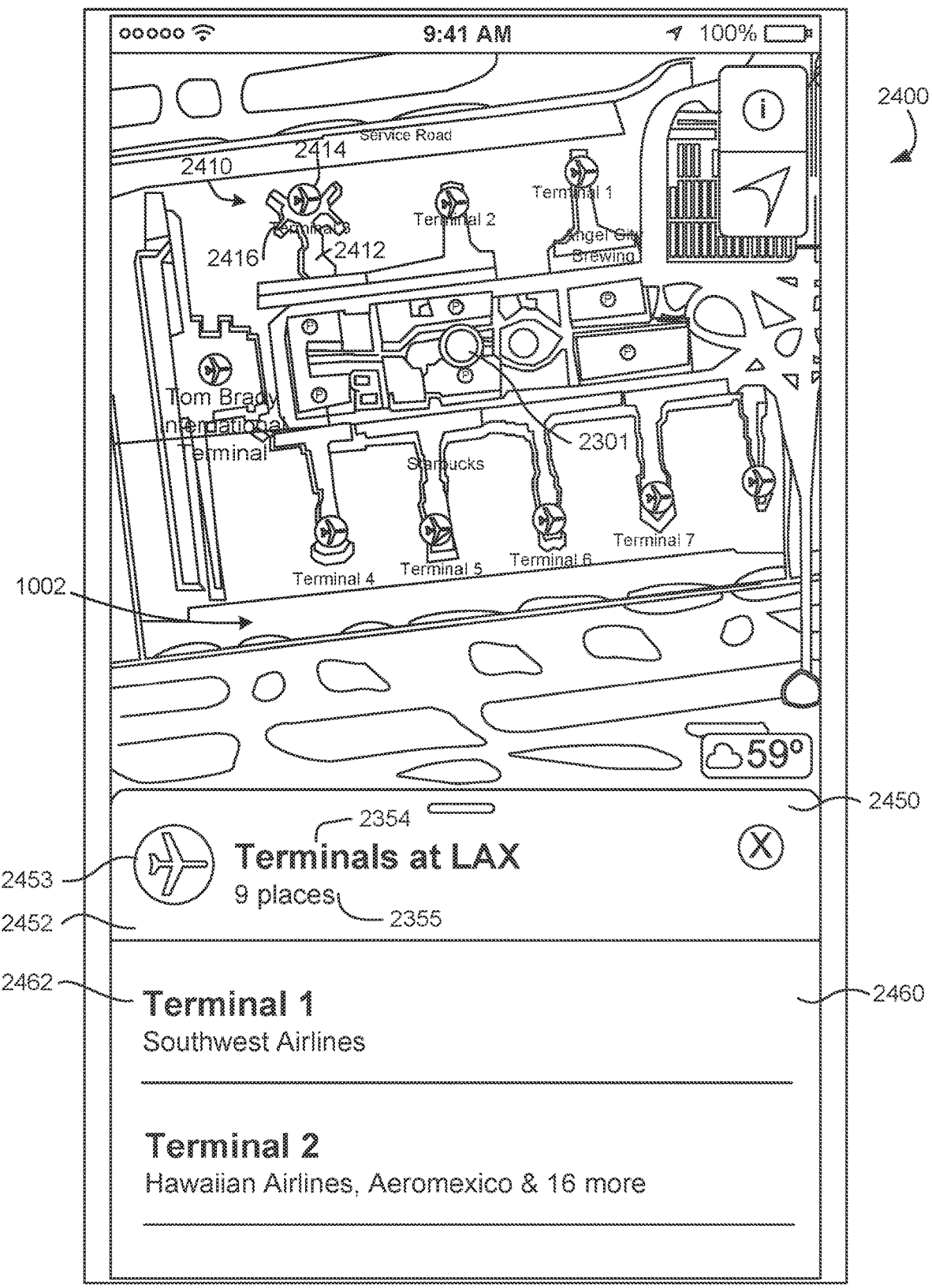
FIG. 24 is an example graphical user interface after the selection of a point of interest category selector from the venue directory.

FIG. 24 illustrates an example graphical user interface 2400 presented on user device 130 upon the user's selection of POI category selector 2362 of GUI 2300 (i.e., the selector associated with terminals within venue 804). Map 1002 shown on GUI 2400 includes current location puck 2301 showing the user's current location (i.e., location is user device 130) on map 1002.

Map 1002 includes the structure, location and layout for POI 2410 and other POIs corresponding to the selected POI category (e.g., terminals). POI 2410 is represented by physical structure 2412, POI category indicator 2414 and textual label 2416 describing POI 2410 as "Terminal 3," by way of example. Other POIs matching the selected POI category (e.g., terminals) can be identified in the same manner.

GUI 2400 also includes placecard 2450 of all search results matching the selected POI category. Placecard 2550 includes field 2452 containing information describing the search results. In the present example, field 2452 includes graphic 2453 representing the selected category (e.g., using the same graphic as POI category indicators and selectors discussed above) and textual label 2454 describing the search results as "Terminals at LAX." With this information, the user is reminded of what category search was performed. Although not shown, a second textual label could be presented to describe the number of search results. In some implementations, if it is detected that the user is within a terminal when POI category selector 2362 of GUI 2300 was selected, a GUI presenting that terminal or its placecard will be presented instead of all terminals as shown in GUI 2400 (see e.g., GUI 2600 of FIG. 26).

Placecard 2450 also contains a listing of POI search results 2460 and 2470 in e.g., alphabetical order. In some implementations, the listing of POI search results 2460 and 2470 can be in a different order such as e.g., organized by prior user activity at venue 804. POI search result 2460, for example, includes field 2462 comprising information (e.g., name, airline) about the POI. POI search result 2470, as well as other search results in placecard 2450 would contain the same type of information.

Figure 25:
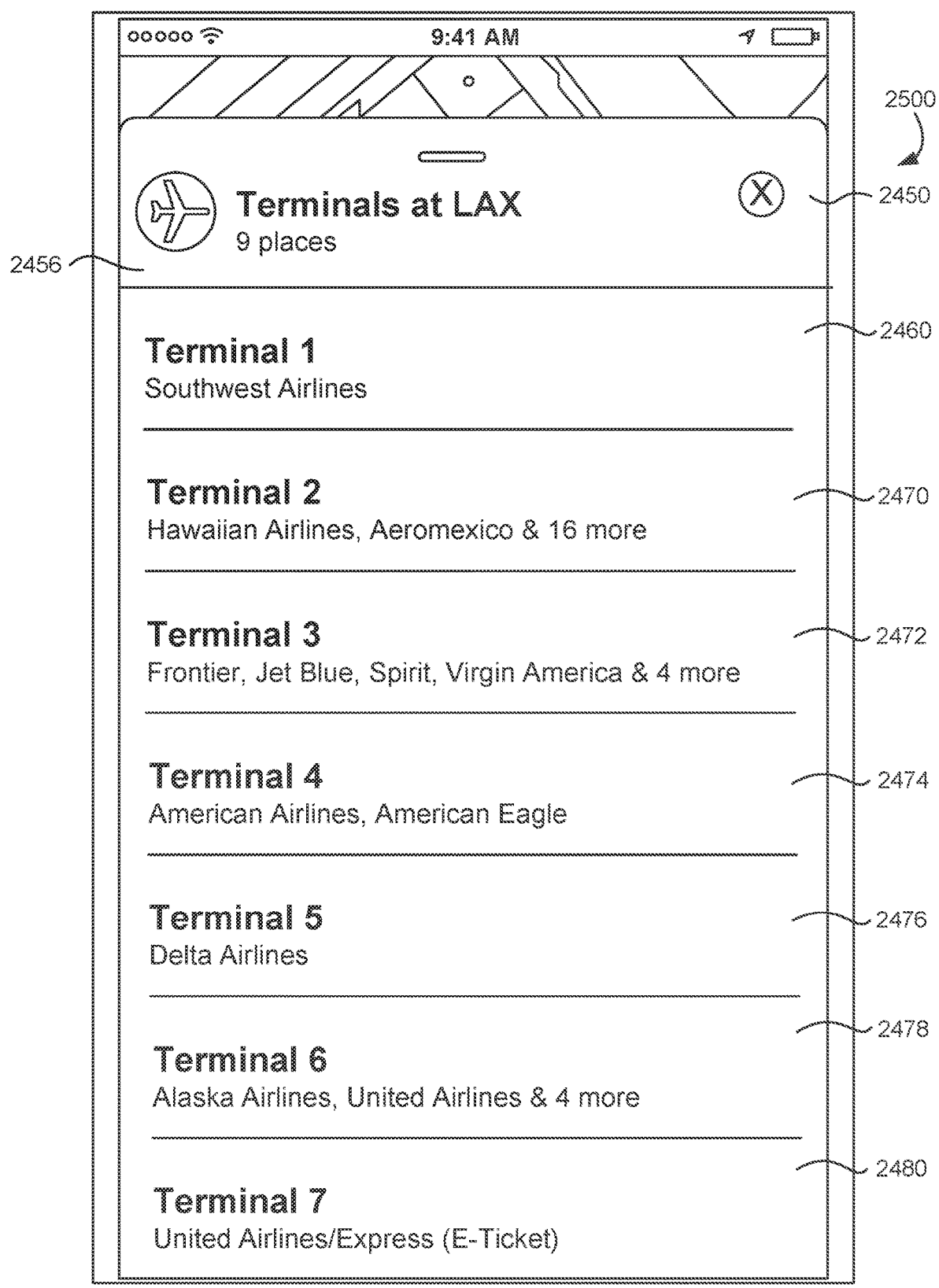
FIG. 25 is an example graphical user interface with an extended placecard of the placecard illustrated in FIG. 24.

As can be appreciated, placecard 2450 can be pulled up to reveal more POI search results. FIG. 25 illustrates an example graphical user interface 2500 presented on user device 130 when the user pulls placecard 2450 up towards the top of GUI 2500. As can be seen in the illustrated example, placecard 2450 now displays POI search results 2460, 2470, 2472, 2474, 2476, 2478 and 2480.

In the following example, the user has selected terminal 3 from the POIs matching the selected category. As discussed above, selecting a terminal POI will cause another indoor map 1202 to be presented (i.e., a sub-map for venue 804) for the terminal POI (e.g., POI 2410 illustrated in GUI 2400). This can occur after the user selected the terminal from either placecard 2450 or by clicking on the POI of the terminal on map 1002.

Figure 26:
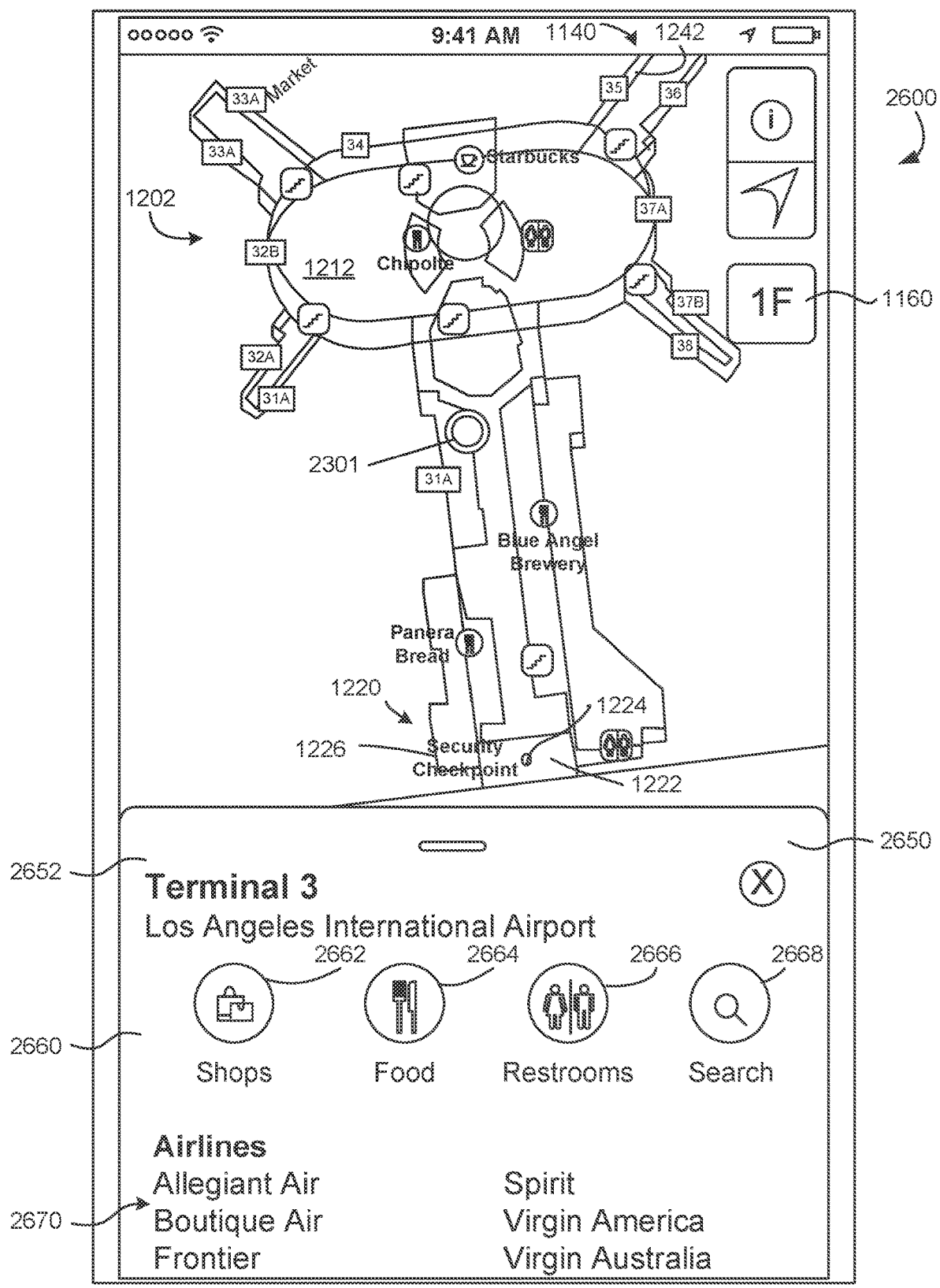
FIG. 26 is an example graphical user interface containing an indoor map of a point of interest along with a venue directory for the point of interest.

FIG. 26 illustrates an example graphical user interface 2600 containing indoor map 1202 of POI 2410 along with placecard 2650 and directory 2660. As with other implementations discussed above, regions outside of map 1202 are de-emphasized, drawing the user's attention to the map 1202 and structure within POI 2410. Map 1202 shown on GUI 2600 includes current location puck 2301 showing the user's current location (i.e., location is user device 130) on map 1202. Map 1202 also includes a security checkpoint POI 1220, as well as other POIs discussed above with respect to FIG. 12 and GUI 1200.

Directory 2660 can contain one or more POI category selectors 2662, 2664 and 2666 and a search selector 2668. Each POI category selector 2662, 2664 and 2666 is associated with a category (e.g., shops, food, restrooms, etc.) that the various POIs of POI 2410 have been grouped into. The type of venue dictates the number of and type of categories to be used in directory 2660 and that the disclosed embodiments should not be limited to any number of or type of category for directory 2660 or any directory illustrated herein. Directory 2660 also comprises a search selector 2668. Search selector 2668 can be used by a user to initiate a manual search for a category or specific POI within POI 2410 or venue 804.

By way of example only, category selector 2662 can be used to select a category of POIs associated with shops, category selector 2664 can be used to select a category of POIs associated with places to eat/purchase food within venue 804, and category selector 2666 can be used to select a category of POIs associated with restrooms.

In some implementations, POI category selectors 2662, 2664 and 2666 of directory 2660 are color coded (i.e., each one has its own color). In addition, the colors of the POI dots and POI category indicators on map 1202 or other maps are selected to match the colors of POI category selectors 2662, 2664 and 2666 used in directory 2460.

Figure 27:
FIG. 27 is an example graphical user interface with an extended placecard of the placecard illustrated in FIG. 26.

In some implementations, placecard 2650 can include field 2670 identifying airlines or other companies, etc.

within POI 2410. As can be appreciated, placecard 2650 can be pulled up to reveal more information. FIG. 27 illustrates an example graphical user interface 2700 presented on user device 130 when the user pulls placecard 2650 up towards the top of GUI 2700. As can be seen in the illustrated example, placecard 2650 now includes field 2672 containing information describing where the POI is located (i.e., venue 804). In some implementations, placecard 2650 can include field 2674 with contact information of the POI and selector 2676 for initiating a phone call to the POI. In some implementations, placecard 2650 also contains field 2678 identifying a website of the POI or venue 804 and a link 2680 for linking to the website. In some implementations, placecard 2650 also contains field 2682 identifying an address of the POI or venue 804 and selector 2684 for sharing the address or other contact information concerning the POI or venue 804.

Figure 28:
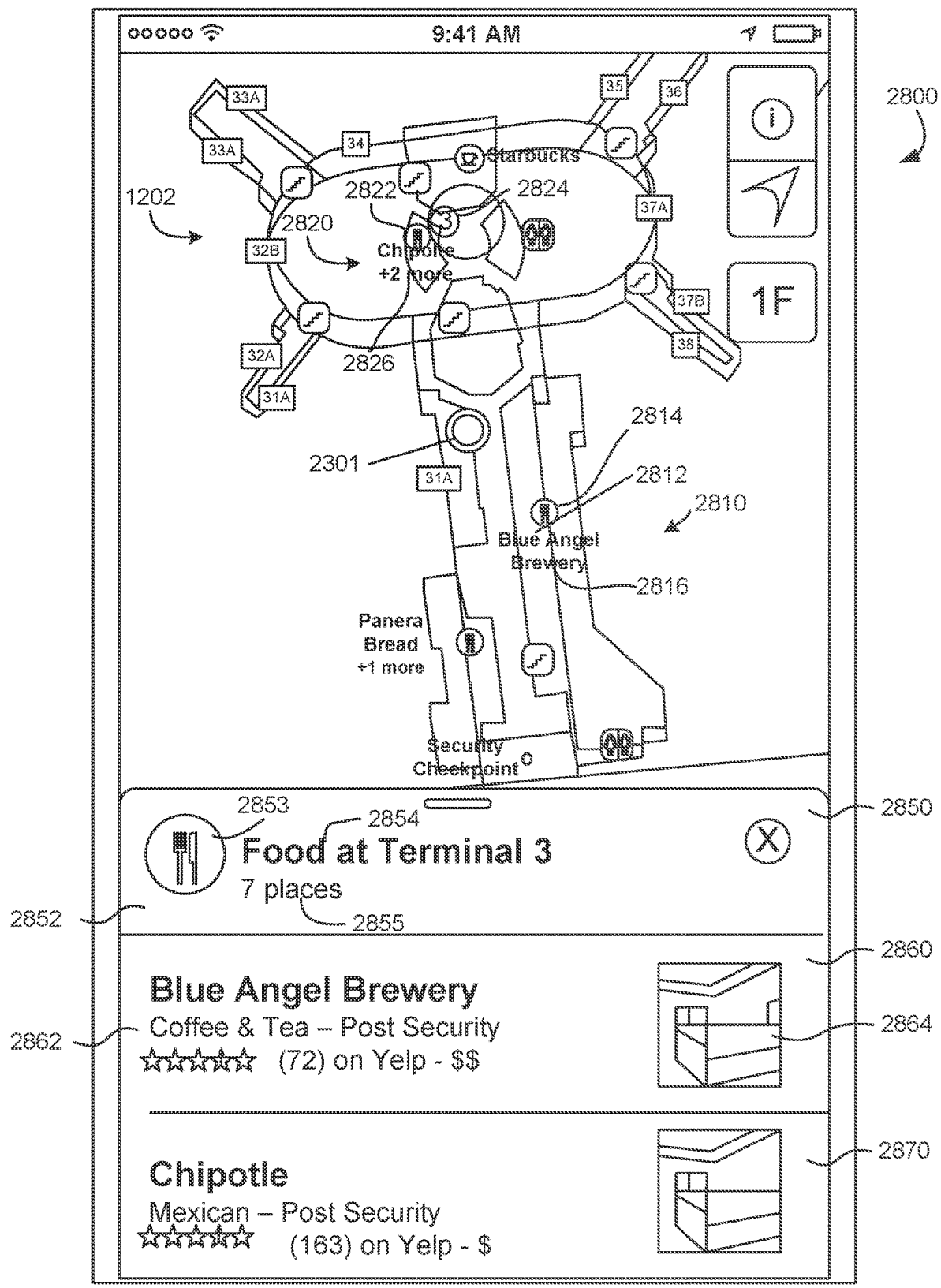
FIG. 28 is an example graphical user interface after the selection of a first point of interest selector from the point of interest's directory.

FIG. 28 illustrates an example graphical user interface 2800 presented on user device 130 upon the user's selection of POI selector 2664 of GUI 2700 (i.e., the selector associated with food within POI 2410). Map 1202 shown on GUI 2800 includes current location puck 2301 showing the user's current location (i.e., location is user device 130) on map 1202.

Map 1202 includes the structure and layout for the current floor as identified by floor indicator 2840. For example, POIs 2810 and 2820 and other POIs corresponding to the selected POI category (e.g., food) for the current floor are displayed. POIs not associated with the selected POI category (e.g., food) are not identified on map 1202 (although their physical structure and layout remain). Likewise, POIs not on the indicated floor, whether corresponding to the selected category or not, are not displayed on map 1202.

Points of interest matching the selected category and found on the current floor can be identified in many ways on map 1202. For example, POI 2810 is represented by physical structure 2812, POI food category indicator 2814 and textual label 2816 describing POI 2810 as "Blue Angel Brewery," by way of example. POI food category indicator 2814 is a graphic representing a beer mug, serving as a sub-category of the selected POI food category. Thus, with indicator 2814, the user is presented with additional clarification that the matching POI result is not only food, but is most likely a bar or place to get a drink. The symbol/graphic associated with food POI selector 2664 could have been used instead or in addition to POI food category indicator 2814.

POI 2820 is represented by structure 2822, POI result indicator 2824, textual label 2826 describing POI 2820 as "Chipotle," by way of example, and textual label 2828 containing the phrase "+2 more." As can be appreciated POI result indicator 2824 provides information that more than one POI matching the selected category is found at or within structure 2822. In the illustrated example, POI result indictor 2824 is a graphic with the number 3 in it, meaning that 3 POIs matching the selected category are found at or within structure 2822. To prevent cluttering of map 1202, only one POI associated with POI 2820 has textual label 2826 describing the POI's name. Textual label 2828 alerts the user that "2 more" POIs are also present, in addition to "Chipotle."

GUI 2800 also includes placecard 2850 of all search results matching the selected POI even if the POI is on a different floor of POI 2410. Placecard 2850 includes field 2852 containing information describing the search results. In the present example, field 2852 includes graphic 2853 representing the selected category (e.g., using the same graphic as POI category indicators and selectors discussed above), first textual label 2854 describing the search results as "Food at Terminal 3" and second textual label 2855 describing the search results as "7 places." With this information, the user is reminded of what category search was performed, how many POIs matching the searched category were found, and what matching POIs are on the current floor.

Placecard 2850 also contains a listing of POI search results 2860 and 2870 in e.g., alphabetical order. In some implementations, the listing of POI search results 2860 and 2870 can be in a different order such as e.g., organized by floor, or personalized based on prior user activity at venue 204, information included on the user's device (e.g., loyalty card information in emails, text messages, contacts), calendar information identifying the venue, a particular POI, etc., or a store credit card enrolled in Apple pay or another electronic wallet application. POI search result 2860, for example, includes field 2862 comprising information (e.g., name, type of venue, floor indication, link to an online review) about the POI and graphic 2864 illustrating or associated with the POI. Field 2862 further comprises indication 2865 as to whether search result 2860 is pre or post security. This is very beneficial information as once a user has gone through security, pre-security check points would not be desirable. POI search result 2870, as well as other search results in placecard 2850 would contain the same type of information.

Figure 29:
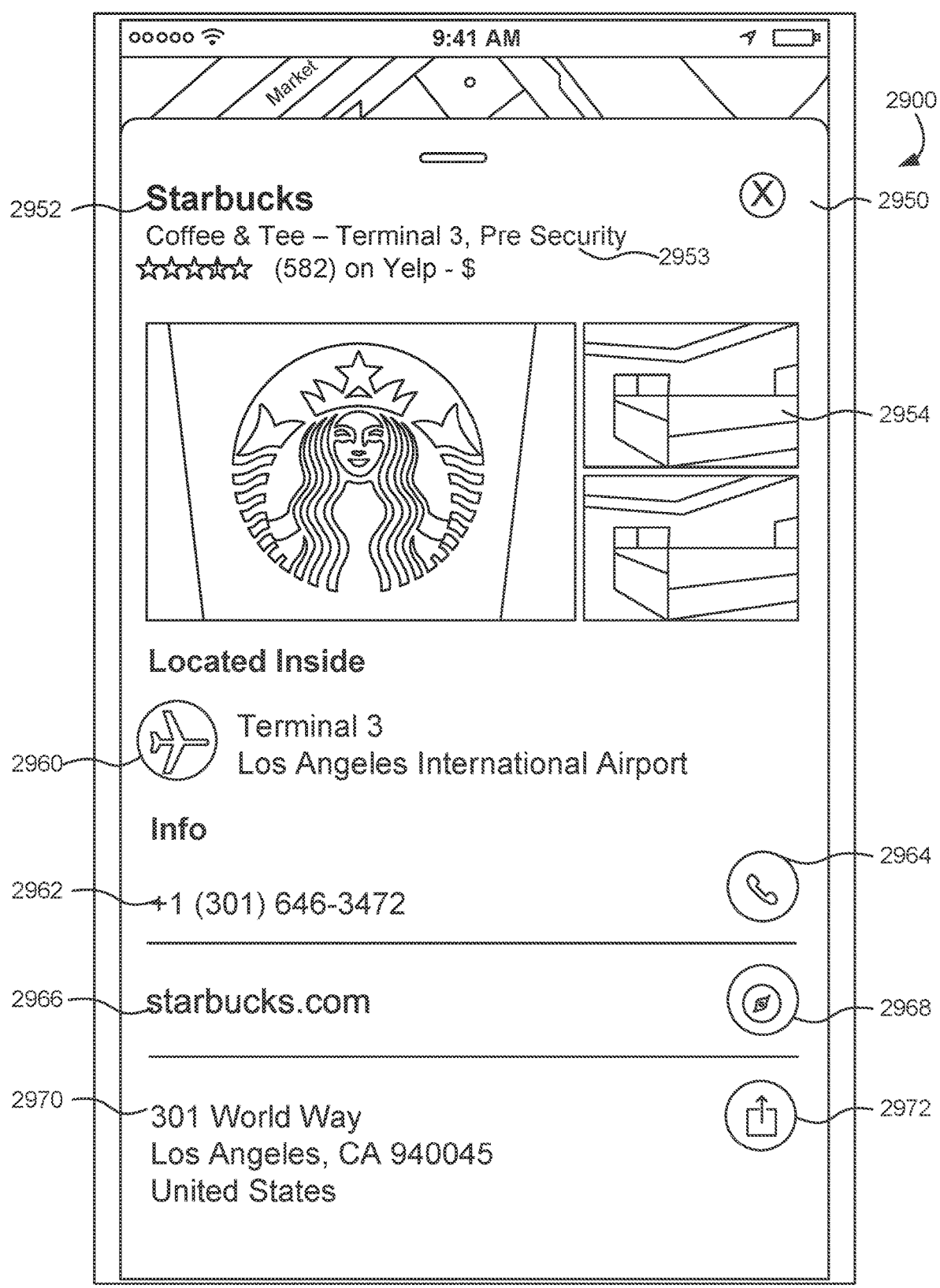
FIG. 29 is an example graphical user interface providing rich information for a selected point of interest.

FIG. 29 illustrates an example graphical user interface 2900 presented on user device 130 upon the user's selection of a POI identified as "Starbucks," by way of example. GUI 2900 includes placecard 2950 for the selected POI. Placecard 2950 includes rich information about the selected POI.

Placecard 2950 includes field 2952 containing information describing the POI. In the present example, field 2952 includes information (e.g., name, type of POI, location within venue, link to an online review). Beneficially, field 2952 includes indication 2953 as to whether the selected POI is pre or post security. Placecard 2950 also includes field 2960 comprising information (e.g., a graphic used by map application 132 to represent this type of venue, name of venue, location, etc.) about the venue the selected POI is contained in. In some implementations, placecard 2950 can include field 2962 with contact information of the POI and selector 2964 for initiating a phone call to the POI.

In some implementations, placecard 2950 also contains field 2966 identifying a website of the POI and link 2968 for linking to the POI's website. In some implementations, placecard 2950 also contains field 2970 identifying an address of the POI and selector 2972 for sharing the address or other contact information concerning the POI.

In some implementations, the rich placecard information of some, but not all, of POI search results are transmitted to user device 130 and stored by map application 132 in response to the user's selection of a POI selector. For example, map data received from map server 130 may contain rich placecard information about the first 25 POI search results, which will speed up the transmission between server 102 and user device 130. In addition, transferring less than all of the information will lighten the load on user device 130 and preserve memory resources and battery power of device 130. Rich placecard information for other POIs will need to be retrieved when the POI is selected and its placecard 2950 needs to be displayed. Rich information about more or less than 25 POI search results can be received from map server 102 in response to the user's selection of a POI selector and the embodiments disclosed herein are not to be so limited.

Figure 30:
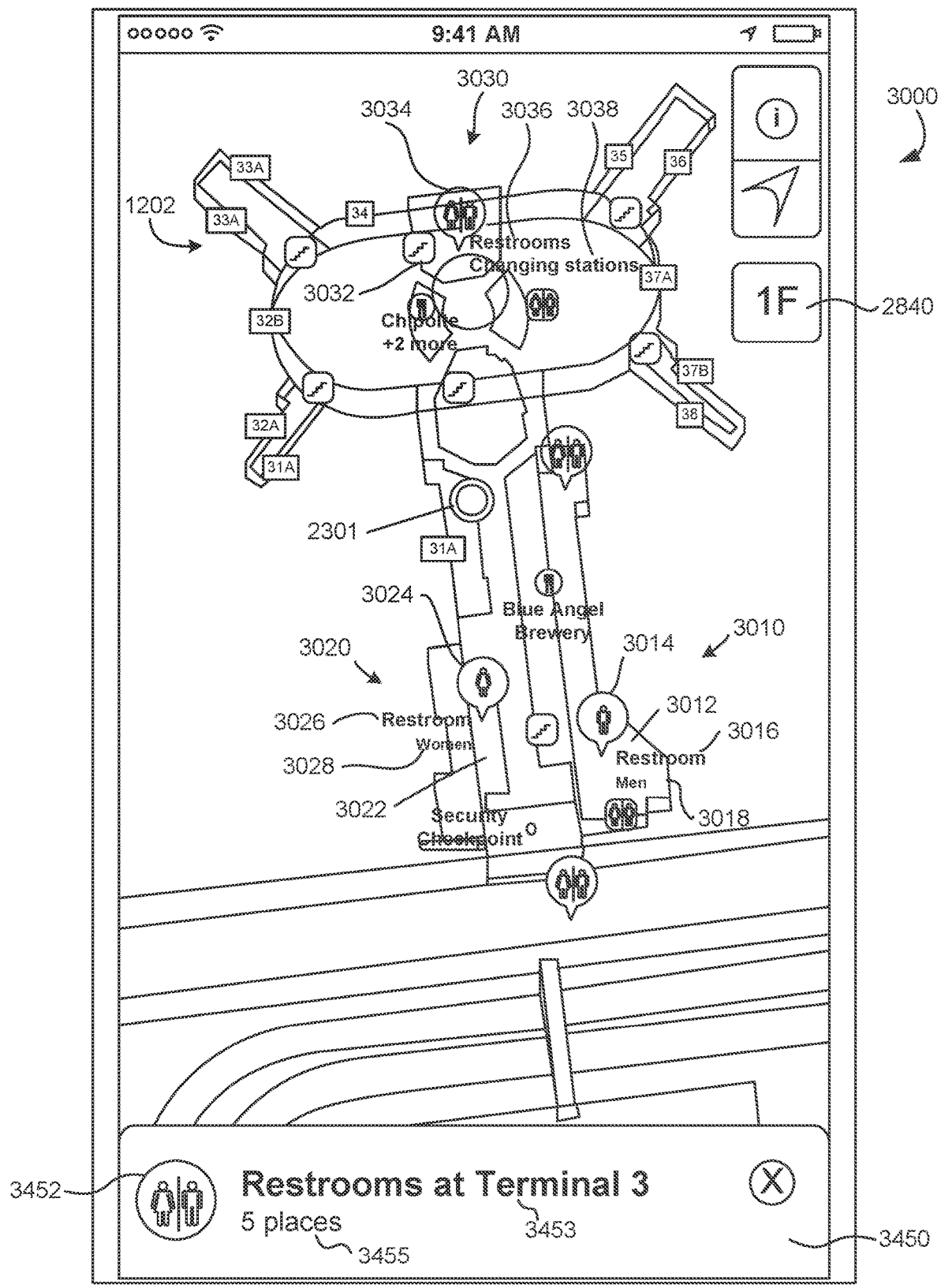
FIG. 30 is an example graphical user interface after the selection of a second point of interest selector from the point of interest's directory.

FIG. 30 illustrates an example graphical user interface 3000 presented on user device 130 upon the user's selection of POI selector 2666 of GUI 2600 (i.e., the selector associated with restrooms within POI 1410). Map 1202 shown on GUI 2600 includes current location puck 2301 showing the user's current location (i.e., location is user device 130) on map 1202 along with the structure and layout for the current floor as identified by floor indicator 2840. POIs 3010, 3020 and 3030 and other POIs corresponding to the selected POI category (e.g., restrooms) for the current floor are displayed. Points of interest matching the selected category and found on the current floor can be identified in many ways on map 1202. For example, POI 3010 is represented by physical structure 3012, POI restroom indicator 3014, textual label 3016 describing POI 3010 as "Restroom," by way of example, and textual label 3018 further describing POI 3010 as a restroom for "men," by way of example. In this example POI restroom indicator 3014 is a graphic typically used to represent a men's bathroom. As noted above with respect to FIGS. 22A and 22B, when the user is on a different floor than the one displayed in map 1202, a more prominent identifier can be used along with or instead of user location puck 2301.

POI 3020 is represented by physical structure 3022, POI restroom indicator 3024, textual label 3026 describing POI 3020 as "Restroom," by way of example, and textual label 3028 further describing POI 3020 as a restroom for "women," by way of example. In this example POI restroom indicator 3024 is a graphic typically used to represent a women's bathroom.

POI 3030 is represented by physical structure 3032, POI restroom indicator 3034, textual label 3036 describing POI 3030 as "Restroom," by way of example, and textual label 3038 further describing POI 3030 as a restroom with a "changing station," by way of example. In this example POI restroom indicator 3034 is a graphic typically used to represent a family bathroom.

POI restroom indicators 3014, 3024 and 3034 could be animated (e.g., flashing, spinning, bouncing up and down) to draw the user's attention to the POIs matching the selected category. Other POIs matching the selected POI category shown on map 1202 can be identified in one of the manners described above for POIs 3010, 3020 or 3030.

GUI 3000 also includes field 3450 used to identify the search results shown on GUI 3000. In the present example, field 3450 includes graphic 3452 representing the selected category (e.g., using the same graphic as POI category indicators and selectors discussed above), first textual label 3453 describing the search results as "Restrooms at Terminal 3" and second textual label 3455 describing the search results as "5 places." With this information, the user is reminded of what category search was performed, how many POIs matching the searched category were found, and what matching POIs are on the current floor.

Searching

Figure 31:
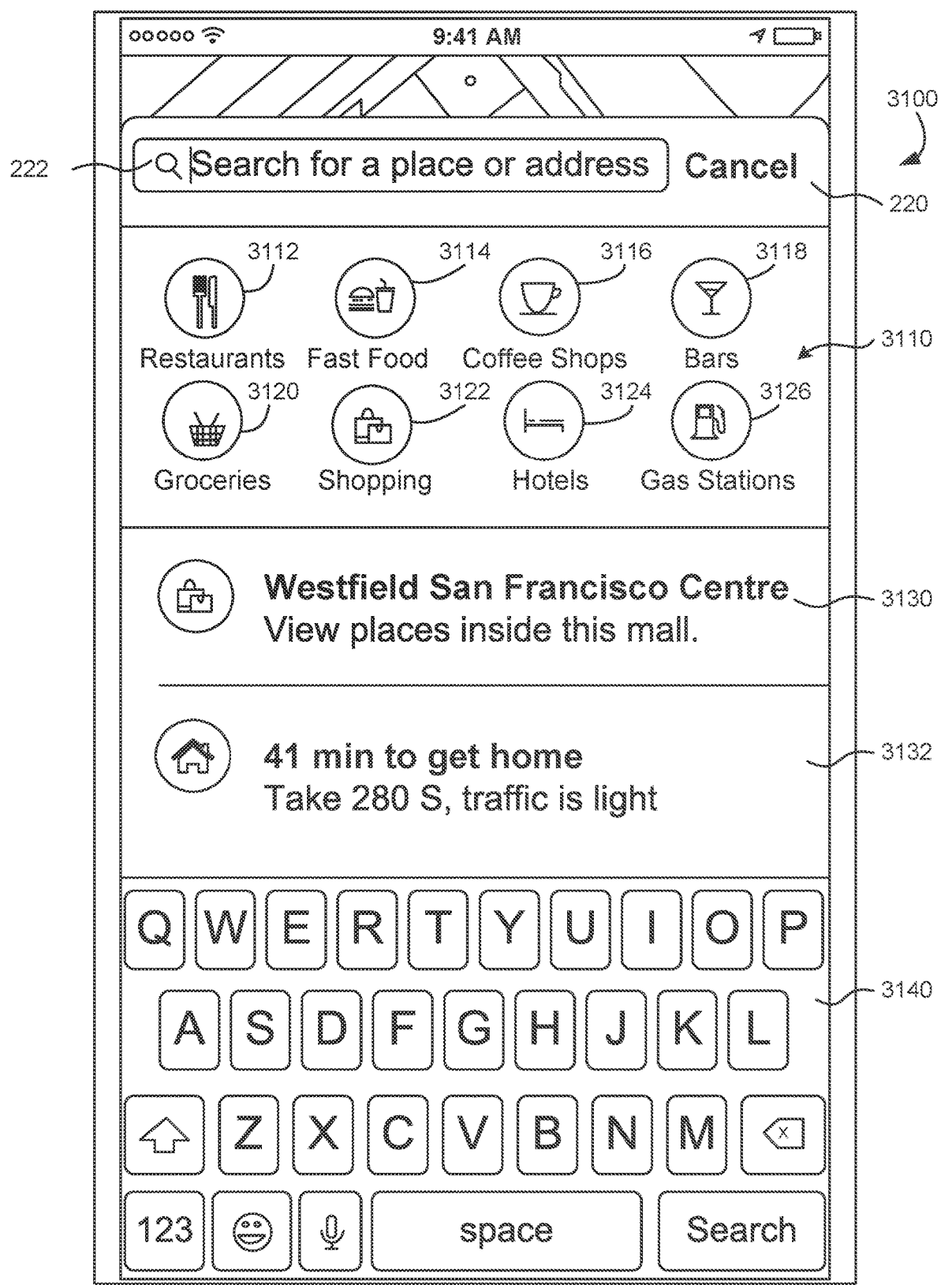
FIG. 31 is an example graphical user interface to initiate a search using the map application of FIG. 1.

It is also desirable for a user to search for and see the inside of venues prior to visiting a particular venue on a map. That is, it is desirable for a user to be presented with a venue and an inside view of a venue from e.g., a general searching function of map application 132. FIG. 31 illustrates an example graphical user interface 3100 of map application 132 that can be presented to a display of user device 130 to initiate a search using application 132. GUI 3100 illustrates tray 220 (FIG. 2) in a pulled-up state revealing field 212 for performing a manual search for a place or address, search directory 3110, link 3130 to a placecard associated with a particular venue (e.g., Westfield San Francisco Centre), link 3132 to driving directions to the user's home, and virtual keyboard 3140. As discussed in more detail below, a manual search in field 212 utilizes keyboard 3140.

In some implementations, search directory 3110 contains one or more search category selectors 3112, 3114, 3116, 3118, 3120, 3122, 3124 and 3126. Each search category selector 3112, 3114, 3116, 3118, 3120, 3122, 3124 and 3126 is associated with a category (e.g., restaurants, shops, bars, gas stations, etc.) that the various types of venues have been grouped into. It should be appreciated other types of venues could be included and the disclosed embodiments should not be limited to any number of or type of category for directory 3110.

By way of example only, category selector 3112 can be used to select a category of venues associated with restaurants, category selector 3114 can be used to select a category of venues associated with places to get fast food, category selector 3116 can be used to select a category of venues associated with coffee shops, category selector 3118 can be used to select a category of venues associated with bars, category selector 3120 can be used to select a category of venues associated with places to buy groceries, category selector 3122 can be used to select a category of places to shop, category selector 3124 can be used to select a category of venues associated with hotels, category selector 3126 can be used to select a category of venues associated with gas stations.

In some implementations, venue category selectors 3112, 3114, 3116, 3118, 3120, 3122, 3124 and 3126 of search directory 3110 are color coded (i.e., each one has its own color). In addition, venues presented on map 202 at any time would have colors matching category selectors 3112, 3114, 3116, 3118, 3120, 3122, 3124 and 3126 used in search directory 3110. Searching using search directory 3110 is performed by selecting one of the venue category selectors 3112, 3114, 3116, 3118, 3120, 3122, 3124 and 3126. After the selection, a list of venues matching the selected category will be presented on user device 130 (described below in more detail).

Figure 32:
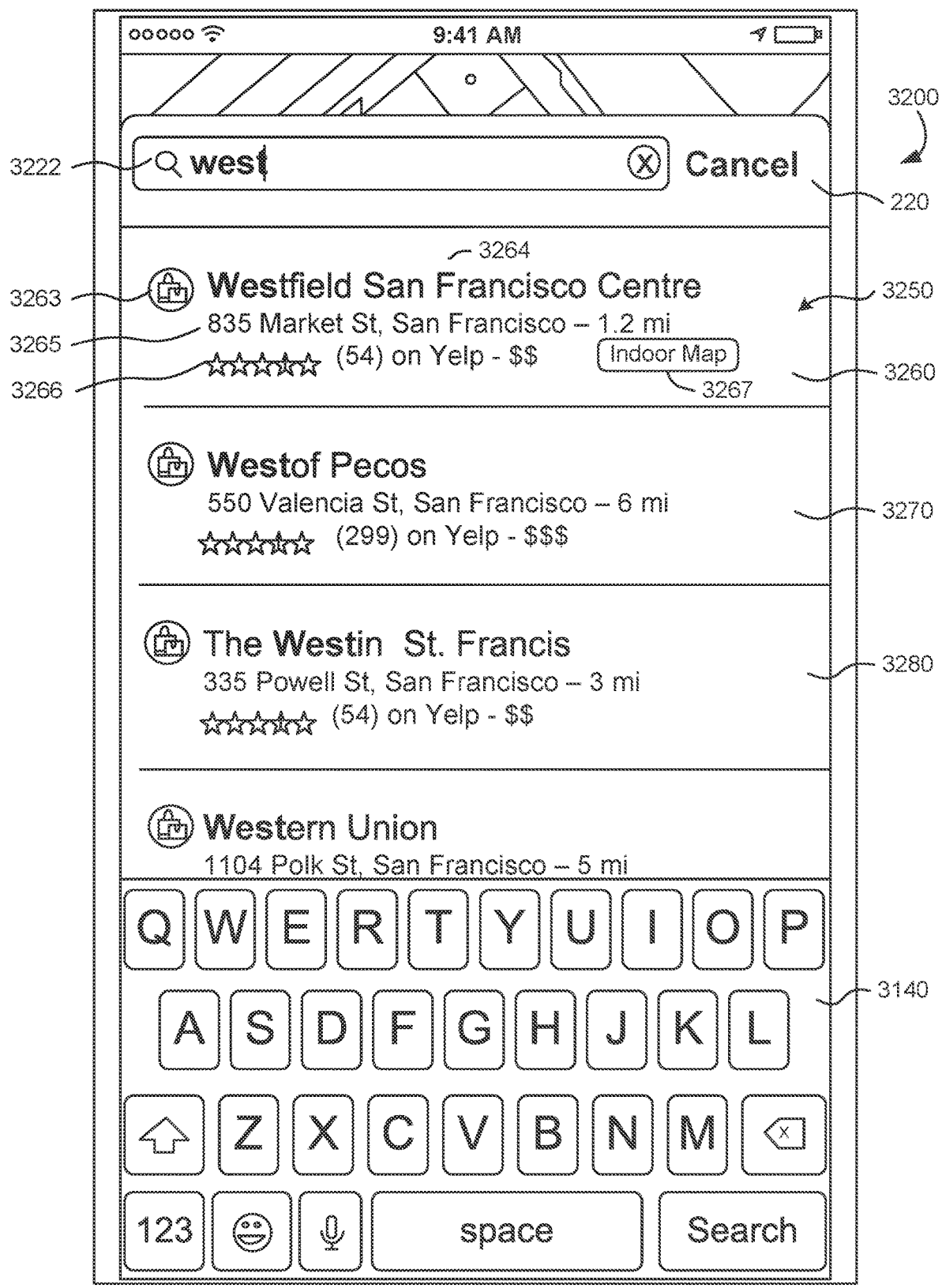
FIG. 32 is an example graphical user interface to initiate a manual search for a venue using the map application of FIG. 1.

FIG. 32 illustrates an example graphical user interface 3200 of map application 132 that can be presented to a display of user device 130 to initiate a manual search for a venue using application 132. GUI 3200 illustrates text being entered into field 3222 to initiate a manual search. In some implementations, map application 132 uses an auto-complete feature to suggest venues names, places, search directories, etc. In the illustrated example, the user has not finished typing the search query, but map application 132 has automatically completed the query and displays listing 3250 of search results 3260, 3270 and 3280 that is populated as the user enters text into field 3222.

Search result 3260 includes graphic 3263 representing one of venue category selectors 3112, 3114, 3116, 3118, 3120, 3122, 3124 and 3126 of search directory 3110 (GUI 3100), first textual label 3264 describing the search result by its venue name as "Westfield San Francisco Centre," by way of example, second textual label 3265 providing an address and distance to the venue, and link 3266 to an online review of the venue. In the illustrated example, the venue identified in search result 3260 includes an indoor map as discussed herein. Accordingly, search result 3260 includes selector 3267 for allowing the user to select and look inside the venue (i.e., view the indoor map of the venue). Search results 3270 and 3280 list venues that do not have a viewable indoor map. Otherwise, search results 3270 and 3280 can contain similar information (i.e., corresponding graphic, venue name, location, links to online reviews) about their respective venues.

The user can select any search result 3260, 3270 and 3280 from list 3250 to have its location shown on a map (e.g., map 202) as is typically done in mapping applications. In addition, because search result 3260 includes selector 3267 for allowing the user to select and look inside the venue (i.e., view the indoor map of the venue), the user can choose to take an indoor view of the venue associated with result 3260 by selecting selector 3267. The indoor view could be a view similar to indoor map 502 discussed above.

Figure 33:
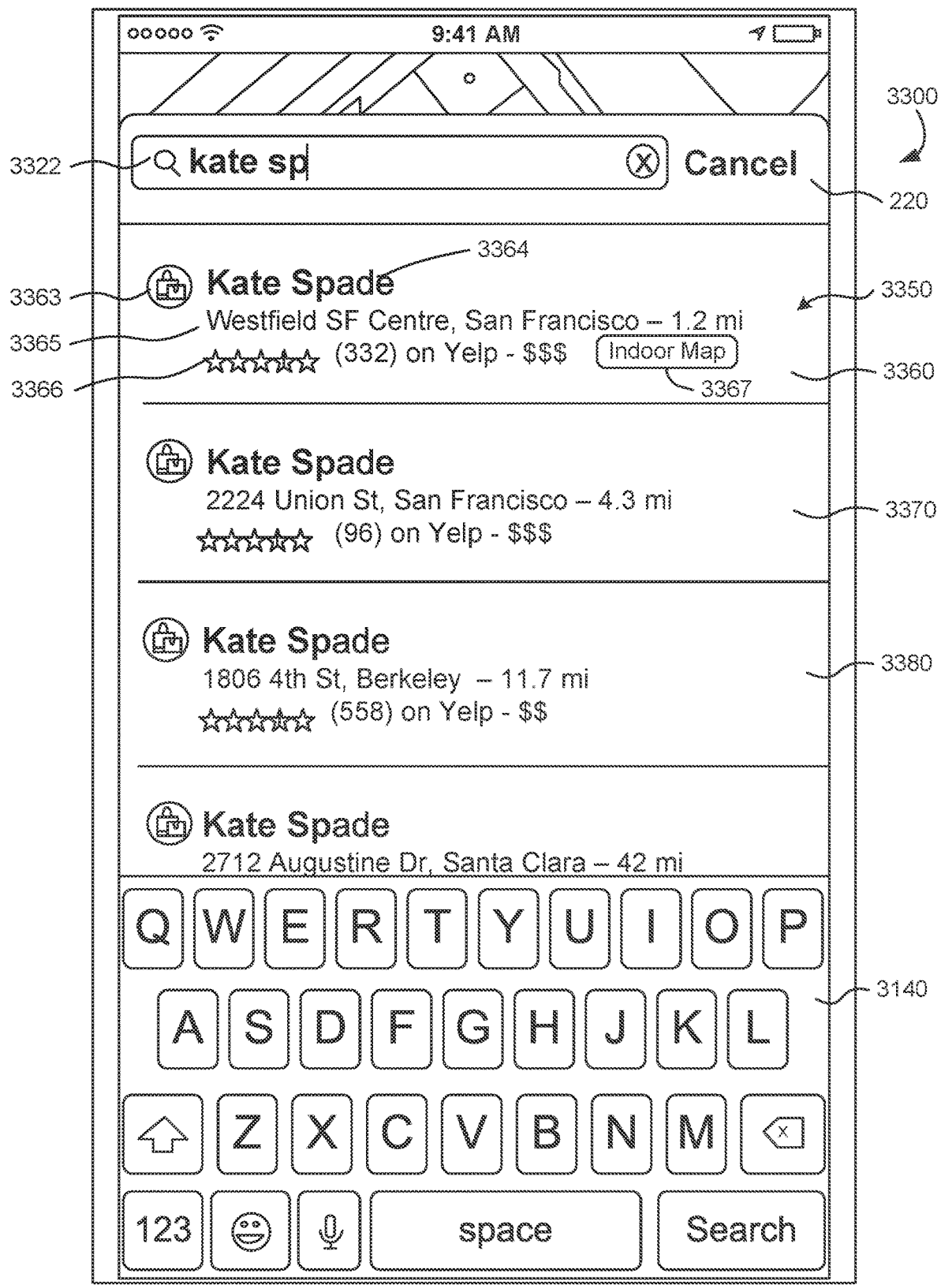
FIG. 33 is an example graphical user interface to initiate a manual search using a name of a specific venue in the map application of FIG. 1.

FIG. 33 illustrates an example graphical user interface 3300 of map application 132 that can be presented to a display of user device 130 to initiate a manual search using a name of a specific venue using application 132. GUI 3300 illustrates text being entered into field 3322 to initiate a manual search for a name of a specific venue "Kate Spade," by way of example. In some implementations, map application 132 uses an auto-complete feature to suggest the venue name. In the illustrated example, the user has not finished typing the search query, but map application 132 has automatically completed the query and displays listing 3350 of search results 3360, 3370 and 3380 for "Kate Spade" that is populated as the user enters text into field 3322.

Search result 3360 includes graphic 3363 representing one of venue category selectors 3112, 3114, 3116, 3118, 3120, 3122, 3124 and 3126 of search directory 3110 (GUI 3100), first textual label 3364 describing the search result by its venue name as "Kate Spade," by way of example, second textual label 3365 providing an address and distance to the venue, and link 3366 to an online review of the venue. In the illustrated example, the venue identified in search result 3360 is found within a venue that includes an indoor map as discussed herein. Accordingly, search result 3360 includes selector 3367 for allowing the user to select and look inside the venue (i.e., view the indoor map of the venue) associated with the search result. Search results 3370 and 3380 list venues that do not have a viewable indoor map. Otherwise, search results 3370 and 3380 can contain similar information (i.e., corresponding graphic, venue name, location, links to online reviews) about their respective venues.

As with other listings of search results discussed herein, the user can select any search result 3360, 3370 and 3380 from list 3350 to have its location shown on a map (e.g., map 202) as is typically done in mapping applications. In addition, because search result 3360 includes selector 3367 for allowing the user to select and look inside the venue (i.e., view the indoor map of the venue) associated with the search result, the user can choose to take an indoor view of the venue associated with result 3360 by selecting selector 3367. The indoor view could be a view similar to indoor map 502 discussed above. In some implementations, the indoor view will be zoom-in such that the initial POI density is visible (see "POI Density" section). In addition, the indoor view may be zoomed-in even further for a smaller venue. In some implementations, application 132 will not zoom-out to the point where the outside venue structure is presented on the display even when all POIs cannot be displayed in the GUI. This way, the user's view is not taken outside the venue.

Figure 34:
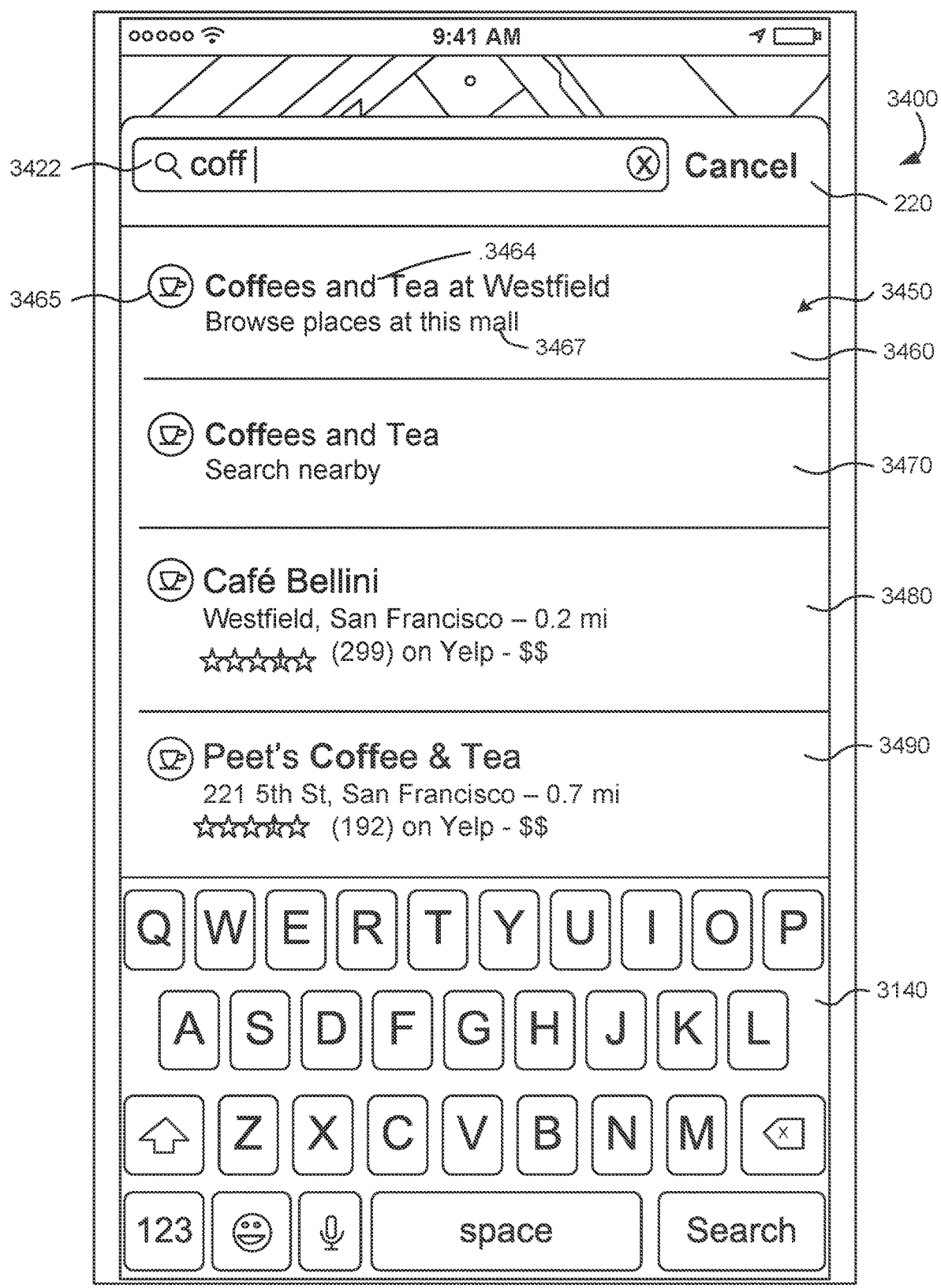
FIG. 34 is an example graphical user interface to initiate a manual search for a category of venues using the map application of FIG. 1.

FIG. 34 illustrates an example graphical user interface 3400 of map application 132 that can be presented to a display of user device 130 to initiate a manual search for a category of venues using application 132. GUI 3400 illustrates text being entered into field 3422 to initiate a manual search for a category of venues such as venues that provide "Coffee," by way of example. In some implementations, map application 132 uses an auto-complete feature to suggest the venue name. In the illustrated example, the user has not finished typing the search query, but map application 132 has automatically completed the query and displays listing 3450 of search results 3460, 3470, 3480 and 3490 for venues that provide "Coffee" that is populated as the user enters text into field 3422.

Search result 3460 comprises graphic 3463 representing one of venue category selectors 3112, 3114, 3116, 3118, 3120, 3122, 3124 and 3126 of search directory 3110 (GUI 3100), first textual label 3464 describing the search result as "Coffee & Tea at Westfield," by way of example. Thus, search result 3460 provides a venue having one or more coffee shops near the user's location. In some implementations, a predetermined distance can be used as threshold for presenting results near the user. In some implementations, search results can be presented differently based on whether the user is inside or outside of a venue. An example of a search and results presented when a user is inside a venue is described below (see "In-Venue Search" section). In some implementations, search results are prioritized differently based on whether a user is inside or outside a venue. For example, when inside a venue, the search results can be prioritized based on prior user activity, information included on the user's device (e.g., loyalty card information in emails, text messages, contacts), calendar information, a particular POI, etc., or a store credit card enrolled in Apple pay or another electronic wallet application. When outside a venue, the search results can be prioritized such that a venue with an inside view is listed first. Alternatively, when outside a venue, the search results can be prioritized such that a venue with an inside view is listed normally among other search results with no preference over the other search results. Other information such as an address, distance to the venue, and/or link to an online review of the venue may also be provided. In the illustrated example, the venue identified in search result 3460 includes an indoor map as discussed herein. Accordingly, search result 3460 includes selector 3467 for allowing the user to select and view the indoor map of the venue associated with the search result. In some implementations, selecting the selector 3467 can cause search results from within the venue to be displayed. In some implementations, selecting the selector 3467 can cause a floor of the venue with the most matching search results to be displayed. In some implementations, selecting the selector 3467 can cause a floor of the venue with the most popular of the search results to be displayed.

Search results 3470, 3480 and 3490 list venues that do not have a viewable indoor map. Otherwise, search results 3470, 3480 and 3490 can contain similar information (i.e., corresponding graphic, venue name, location, links to online reviews) about their respective venues.

As noted above, search result 3460 provides a venue having one or more coffee shops therein. In some implementations, the returned search results could identify a specific coffee shop by its name (e.g., "Café Bellini" as shown in result 3480). In addition, the returned search results could identify coffee shops nearby, i.e., within a certain proximity of user device 130, (e.g., "Coffee & Tea—Search Nearby" as shown in result 3470).

As with other listings of search results discussed herein, the user can select any search result 3460, 3470, 3480 and 3490 from list 3450 to have its location or locations shown on a map (e.g., map 202) as is typically done in mapping applications. In addition, because search result 3460 includes selector 3467 for allowing the user to select and view the indoor map of the venue associated with the search result, the user can choose to take an indoor view of the venue associated with result 3460 by selecting selector 3467. The indoor view could be a view similar to indoor map 502 discussed above.

It is also desirable to access the venue features of map application 132 from other applications and features of user device 130. For example, most computers, smart phones and tablets include a web browser such as e.g., the Safari web browser from Apple, Inc. These web browsers allow a user to search for all types of information, including information about venues, where they are located and driving directions to the venue, to name a few. It is desirable to access the features of map application 132 discussed herein from the web browser such that the user may access an indoor map, search for points of interest using a particular venue directory, and view points of interests in the manners discussed herein.

Figure 35:
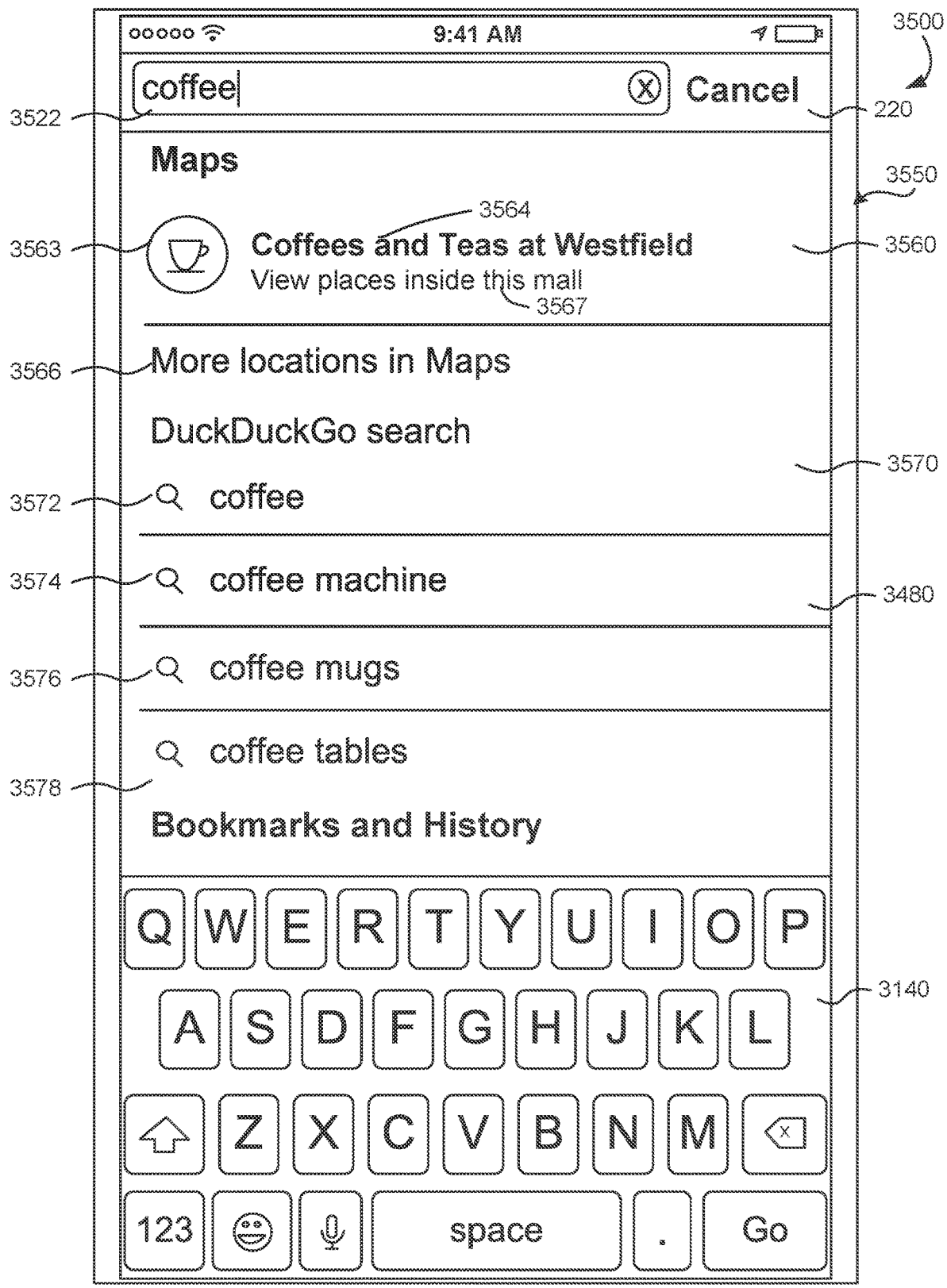
FIG. 35 is an example graphical user interface which provides access to features of the map application of FIG. 1 through a search using a web browser.

FIG. 35 illustrates an example graphical user interface 3500 that can be presented to a display of user device 130 which provides access to features of map application 132 through a search using a web browser. GUI 3500 illustrates text being entered into field 3522 of the web browser to initiate a manual search for items associated with "Coffee," by way of example. In the illustrated example, the web browser uses an auto-complete feature to suggest the venue name. In the illustrated example, the user has not finished typing the search query, but the browser has automatically completed the query and displays listing 3550 of search results 3560, 3566, 3570, 3572, 3574, 3576 and 3578 corresponding to the query of "Coffee."

Search result 3560 is a result returned from map application 132 and has the appearance of search results discussed herein for map application 132. For example, search result 3560 comprises graphic 3563 representing one of venue category selectors used in the venue and search directories of application 132 discussed herein (e.g., category selectors 3112, 3114, 3116, 3118, 3120, 3122, 3124 and 3126 of search directory 3110 found on example GUI 3100). Search result 3560 also includes first textual label 3564 describing the search result as "Coffee & Tea at Westfield," by way of example. Other information such as an address, distance to the venue, and/or link to an online review of the venue may also be provided. In the illustrated example, the venue identified in search result 3560 includes an indoor map as discussed herein. Accordingly, search result 3560 includes selector 3567 for allowing the user to select and view the indoor map of the venue associated with the search result. Thus, the user's browser experience has been enhanced by providing access to the venue viewing, searching and other features of map application 132.

Search result 3566 indicates that there are more locations within map application 133 that can be accessed by selecting this result. Search results 3570, 3572 3574, 3576 and 3580 are the types of search results typically found when searching using a web browser. For example, search result 3570 is a link to do a specific search such as a search for "Duck-DuckGo." Search result 3572 is a link to do a search for "coffee." Search result 3574 is a link to do a search for "coffee machine." Search result 3576 is a link to do a search for "coffee mugs." Search result 3578 is a link to do a search for "coffee tables."

There are other applications or programs for accessing information on user device 130 that would also enhance the user's experience if the application or program could access the features of map application 132. For example, there are applications and programs used to search for and organize files and other information on a computer, smart phone or tablet such as e.g., the Spotlight application by Apple, Inc. It is desirable to access the features of map application 132 discussed herein from an external application providing searching capability such as e.g., Spotlight.

Figure 36:
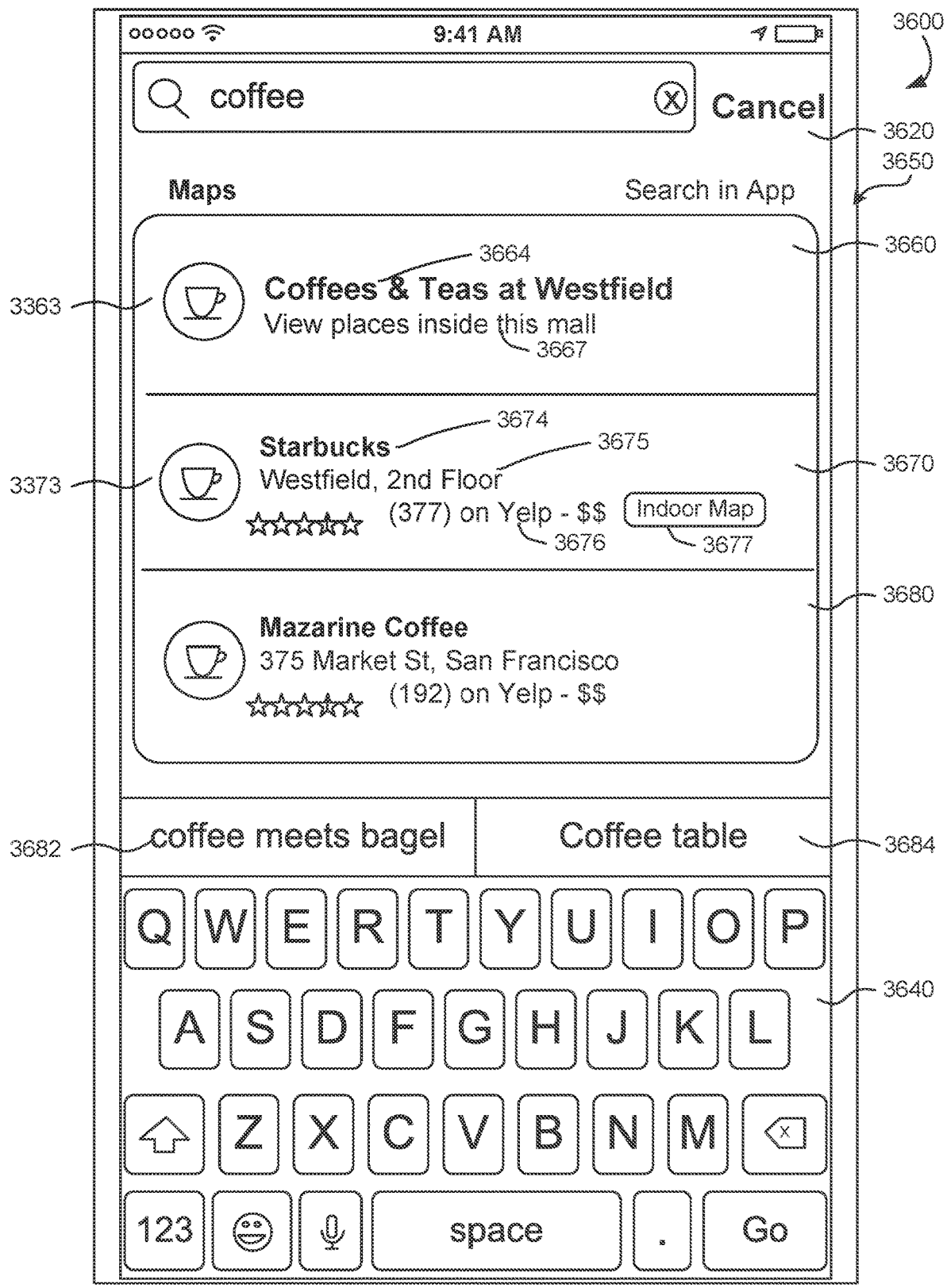
FIG. 36 is an example graphical user interface which provides access to features of the map application of FIG. 1 through a search application or program.

FIG. 36 illustrates an example graphical user interface 3600 that can be presented to a display of user device 130 which provides access to features of map application 132 through a search application such as e.g., the Spotlight application. GUI 3600 illustrates text being entered into field 3622 of the search application to initiate a manual search for items associated with "Coffee," by way of example. In the illustrated example, the search application displays listing 3650 of search results 3660, 3670, 3680, 3682 and 3684 corresponding to the query of "Coffee."

Search result 3660 is a result returned from map application 132 and has the appearance of search results discussed herein for map application 132. For example, search result 3660 comprises graphic 3663 representing one of venue category selectors used in the venue and search directories of application 132 discussed herein (e.g., category selectors 3112, 3114, 3116, 3118, 3120, 3122, 3124 and 3126 of search directory 3110 found on example GUI 3100). Search result 3660 also includes first textual label 3664 describing the search result as "Coffee & Tea at Westfield," by way of example. Other information such as an address, distance to the venue, and/or link to an online review of the venue may also be provided. In the illustrated example, the venue identified in search result 3660 includes an indoor map as discussed herein. Accordingly, search result 3660 includes selector 3667 for allowing the user to select and look inside the venue (i.e., view the indoor map of the venue) associated with the search result. Thus, the user's searching experience has been enhanced by providing access to the venue viewing, searching and other features of map application 132.

Search result 3670 is another search result returned from map application 132 and has the appearance of search results discussed herein for map application 132. For example, search result 3670 includes graphic 3673 representing one of venue category selectors used in the venue and search directories of application 132 discussed herein. Search result 3670 also includes first textual label 3674 describing the search result as "Starbucks," by way of example. Search result 3670 includes textual label 3675 proving an address and location of the identified venue, and link 3676 to an online review of the venue. In the illustrated example, the venue identified in search result 3670 includes an indoor map as discussed herein. Accordingly, search result 3670 includes selector 3677 for allowing the user to select and look inside the venue (i.e., view the indoor map of the venue) associated with the search result. Thus, the user's searching experience has been enhanced by providing access to the venue viewing, searching and other features of map application 132.

Search results 3680, 3682 and 3684 are the types of search results typically found when searching using the searching application. For example, search result 3680 is a link to a specific venue "Mazarine Coffee." Search result 3682 is a link to do a search for "coffee meets bagel." Search result 3684 is a link to do a search for a "coffee table."

There are voice command applications and programs that allow a user to do searches via voice commands such as e.g., the Siri application and program by Apple, Inc. It is desirable to access the features of map application 132 discussed herein from an external command applications and programs that allow a user to do searches via voice commands such as e.g., the Siri application and program by Apple, Inc.

Figure 37:
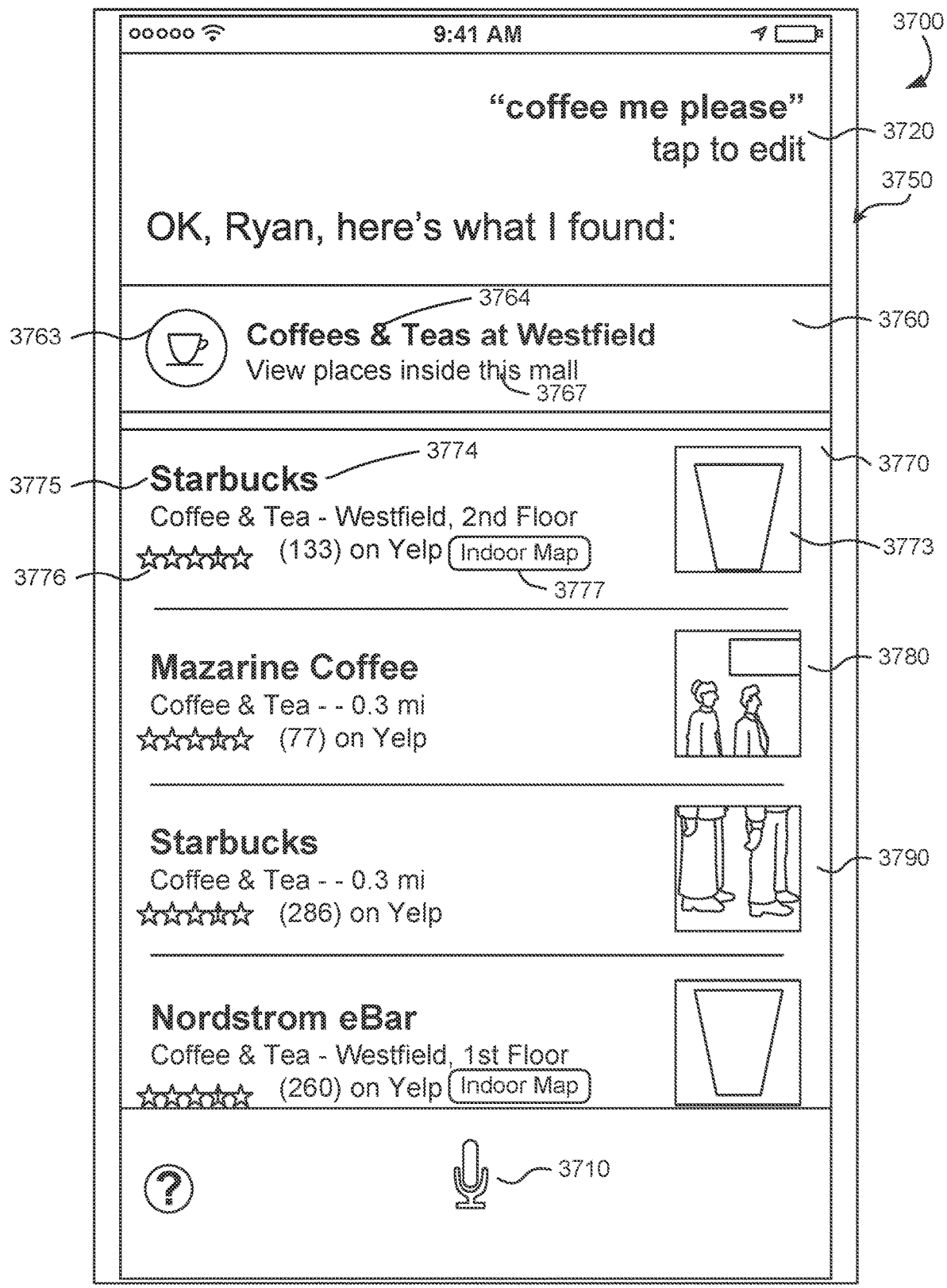
FIG. 37 is an example graphical user interface which provides access to features of the map application of FIG. 1 through voice commands through an intelligent personal assistant.

FIG. 37 illustrates an example graphical user interface 3700 that can be presented to a display of user device 130 which provides access to features of map application 132 using voice commands through an intelligent personal assistant such as e.g., the Siri application. GUI 3700 illustrates a voice command 3720 that was entered and accepted by the voice command application to initiate a search for items associated with "Coffee," by way of example. In the illustrated example, the search application displays listing 3750 of search results 3760, 3770, 3780 and 3790 corresponding to the query of "Coffee."

Search result 3760 is a result returned from map application 132 and has the appearance of search results discussed herein for map application 132. For example, search result 3760 includes graphic 3763 representing one of venue category selectors used in the venue and search directories of application 132 discussed herein (e.g., category selectors 3112, 3114, 3116, 3118, 3120, 3122, 3124 and 3126 of search directory 3110 found on example GUI 3100). Search result 3760 also includes first textual label 3764 describing the search result as "Coffee & Tea at Westfield," by way of example. Other information such as an address, distance to the venue, and/or link to an online review of the venue may also be provided. In the illustrated example, the venue identified in search result 3760 includes an indoor map as discussed herein. Accordingly, search result 3760 includes selector 3767 for allowing the user to select and look inside the venue (i.e., view the indoor map of the venue) associated with the search result. Thus, the user's voice commanded searching experience has been enhanced by providing access to the venue viewing, searching and other features of map application 132.

Search result 3770 is another search result returned from map application 132 and has the appearance of search results discussed herein for map application 132. For example, search result 3770 comprises image 3773 representing the venue, first textual label 3774 describing the search result as "Starbucks," by way of example, second textual label 3775 proving an address and location of the identified venue, and link 3776 to an online review of the venue. In the illustrated example, the venue identified in search result 3770 includes an indoor map as discussed herein. Accordingly, search result 3770 includes selector 3777 for allowing the user to select and look inside the venue (i.e., view the indoor map of the venue) associated with the search result. Thus, the user's voice commanded searching experience has been enhanced by providing access to the venue viewing, searching and other features of map application 132.

Search result 3790 is the types of search results typically found when searching using voice commanded searching. For example, search result 3780 is a link to a specific venue "Mazarine Coffee." As discussed above and below, search results can be presented differently based on whether the user is located within or outside of a venue.

Announcements and Alerts

It is also desirable for a user to be alerted that information about a particular venue is available even if user device 130 is in a locked mode. That is, it is desirable to present a GUI while user device 130 is locked whereby the GUI alerts the user that information about a particular venue within a proximity of the user is available.

Figure 38:
FIG. 38 is an example graphical user interface comprising a venue proximity alert that can be presented to a display of a user device when the user device is in a locked mode.

FIG. 38 illustrates an example graphical user interface 3800 that can be presented to a display of user device 130 when user device 130 is in a locked mode. In the illustrated example, GUI 3800 appears on the lock screen display 3820 of user device 130, serving as a venue proximity alert. GUI 3800 includes graphic 3812 identifying the alert as being from or associated with map application 132. GUI 3800 also includes time indicator 3814, which in the illustrated example is "now." GUI 3800 also includes textual label 3816 describing the venue alert as "Westfield San Francisco Centre," by way of example. In the illustrated example, the venue of the alert includes an indoor map as discussed herein. Accordingly, GUI 3800 includes textual label 3818 stating "Open Maps to view Places inside this mall."

Figure 39:
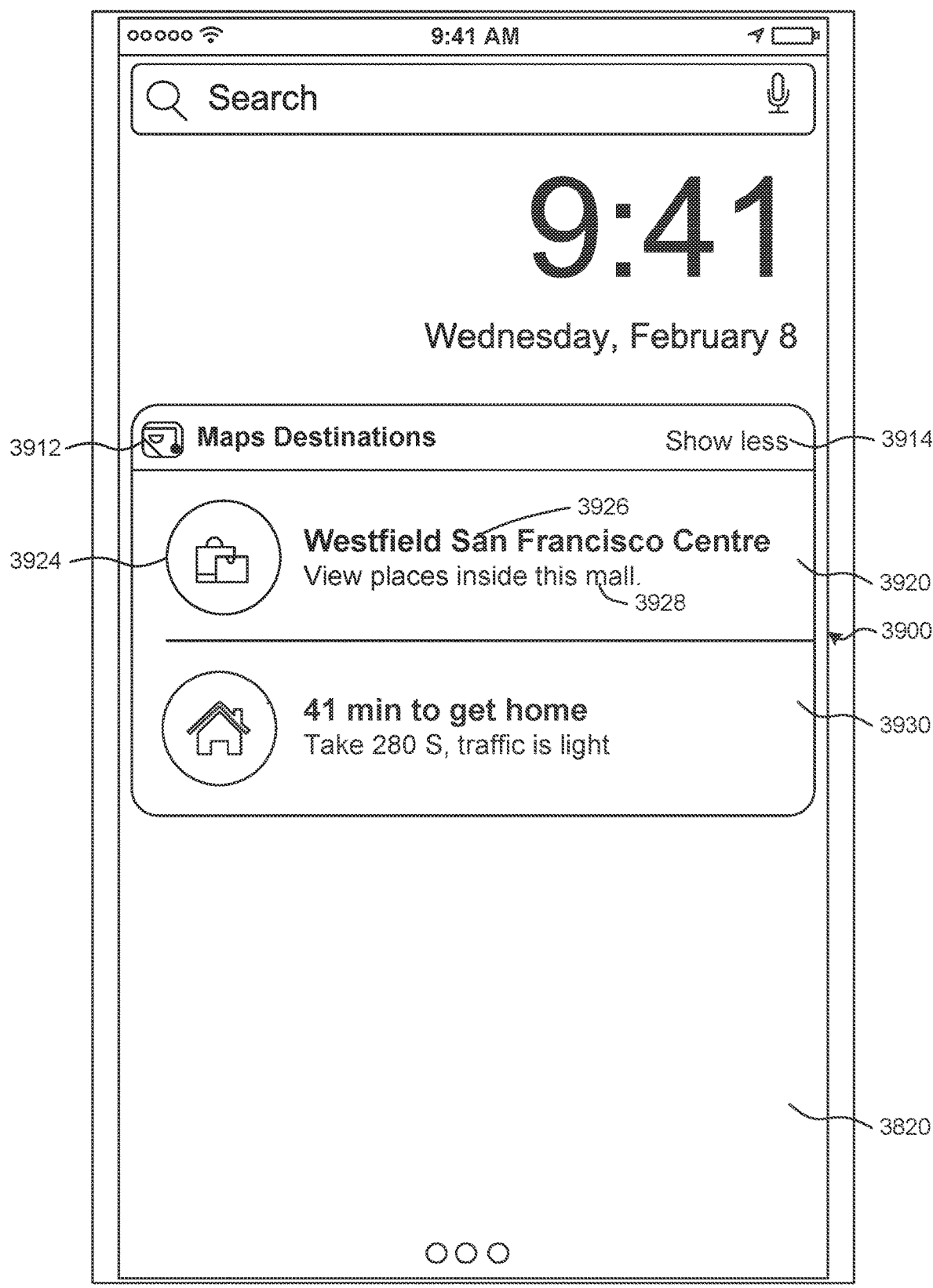
FIG. 39 is an example graphical user interface comprising a widget that can be presented to a display of a user device after a user swiped or otherwise interacted with the graphical user interface of FIG. 38.

As is known in the art, swiping GUI 3800 will cause a widget to appear on the display of user device 130. Accordingly, FIG. 39 is an example graphical user interface 3900 comprising a widget that can be presented to a display of user device 130 after a user swiped or otherwise interacted with GUI 3800. In the illustrated example, GUI 3900 appears on the lock screen display 3820 of user device 130, serving as a widget for the venue proximity alert of GUI 3800. GUI 3900 includes graphic 3912 identifying the widget as being from or associated with map application 132. GUI 3900 also includes selector 3914 to "show less" or minimize what is shown on GUI 3900.

GUI 3900 includes two selectable fields 3920 and 3930. In the illustrated implementation, selectable field 3920 includes graphic 3924 representing one of venue category selectors used in the venue and search directories of application 132 discussed herein (e.g., category selectors 3112, 3114, 3116, 3118, 3120, 3122, 3124 and 3126 of search directory 3110 found on example GUI 3100). Selectable field 3920 also includes first textual label 3926 describing field 3920 as "Westfield San Francisco Centre" keeping with the current example. In the illustrated example, the venue identified in field 3920 includes an indoor map as discussed herein. Accordingly, field 3920 includes selector 3928 for allowing the user to select and view the indoor map of the venue associated with the search result. In the illustrated example, selectable field 3930 is field for allowing the user to get directions to his or her home.

Figure 40:
FIG. 40 illustrates an example graphical user interface comprising a venue proximity alert and event alert that can be presented to a display of a user device when the user device is in a locked mode.

FIG. 40 illustrates an example graphical user interface 4000 that can be presented to a display of user device 130 when user device 130 is in a locked mode. In the illustrated example, GUI 4000 appears on the lock screen display 3820 of user device 130 and includes venue proximity alert 4010 and event alert 4020. Alert 4010 includes graphic 4012 identifying the alert as being from or associated with map application 132. Alert 4010 also includes time indicator 4014, which in the illustrated example is "now." Alert 4010 also includes textual label 4016 describing the venue alert as "Los Angeles International Airport," by way of example. In the illustrated example, the venue of the alert includes an indoor map as discussed herein. Accordingly, alert 4010 includes textual label 4018 stating "Open Maps to view Places inside this airport."

Event 4020 includes graphic 4022 identifying the event as being from or associated with an airline, which in the illustrated example is Virgin America. Event 4020 also includes time indicator 4024, which in the illustrated example is "now." Event 4020 also includes textual label 4026 describing the event as "Flight VX77," by way of example. In the illustrated example, the event includes textual label 4028 stating "Boards in 2 hours at Terminal 3, Gate 34A."

Figure 41:
FIG. 41 is an example graphical user interface comprising a widget that can be presented to a display of a user device after a user swiped or otherwise interacted with the venue proximity alert of FIG. 40.

As is known in the art, swiping alert 4010 will cause a widget to appear on the display of user device 130. Accordingly, FIG. 41 is an example graphical user interface 4100 comprising a widget that can be presented to a display of user device 130 after a user swiped or otherwise interacted with alert 4010 of GUI 4000. In the illustrated example, GUI 4100 appears on the lock screen display 3820 of user device 130, serving as a widget for the venue proximity alert of GUI 4000. GUI 4100 includes a graphic 4112 identifying the widget as being from or associated with map application 132. GUI 4100 also includes selector 4114 to "show less" or minimize what is shown on GUI 4100.

GUI 3410 includes two selectable fields 4120 and 4130. In the illustrated implementation, selectable field 4120 includes graphic 4124 representing an airport. Selectable field 4120 also includes first textual label 4126 describing field 4120 as "LAX" keeping with the current example. In the illustrated example, the venue identified in field 4120 includes an indoor map as discussed herein. Accordingly, field 4120 includes selector 4128 for allowing the user to select and view the indoor map of the venue associated with the search result. In the illustrated example, selectable field 4130 is field for allowing the user to get directions to his or her home.

Figure 42:
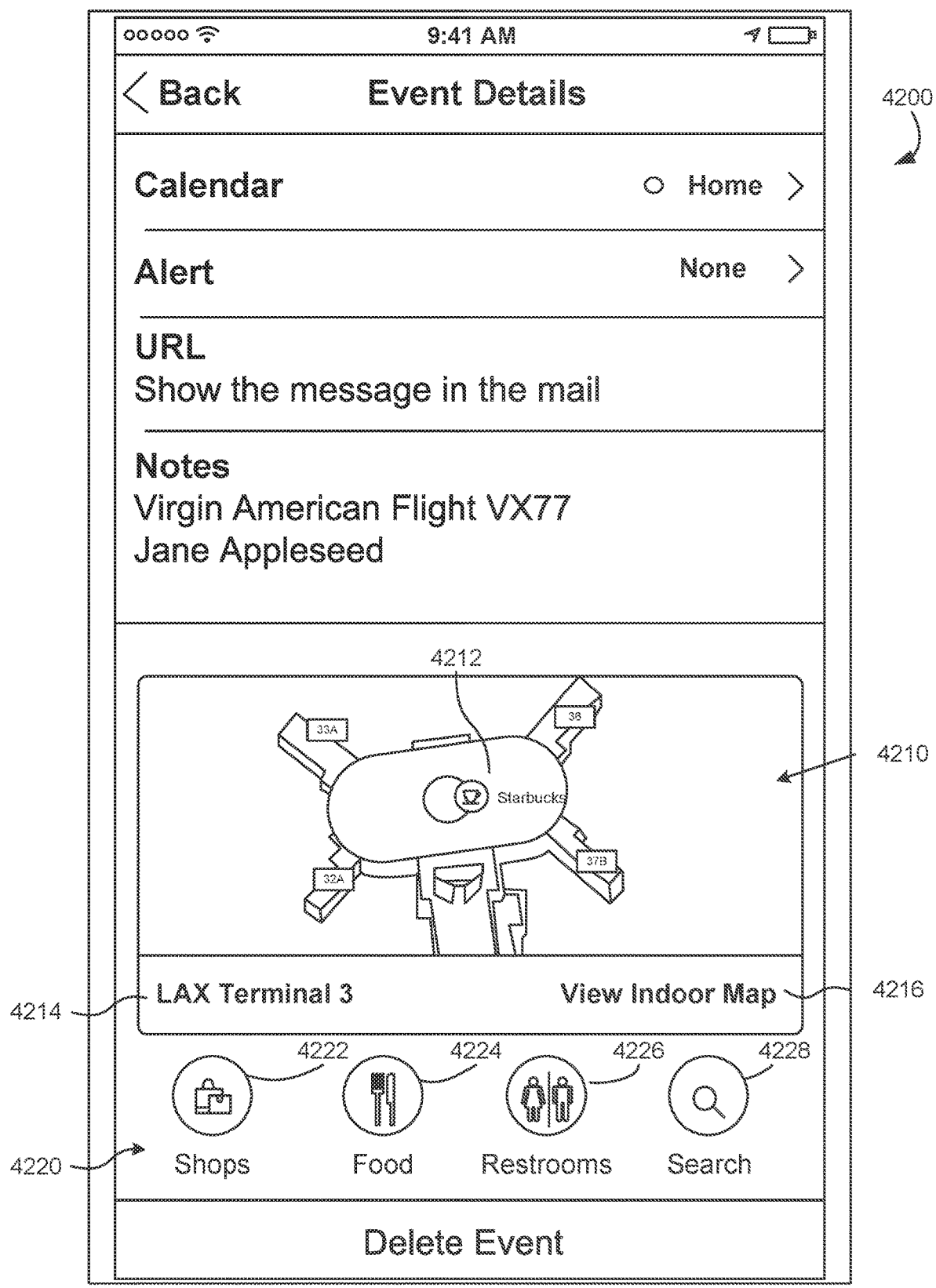
FIG. 42 is an example graphical user interface comprising a widget that can be presented to a display of a user device after a user swiped or otherwise interacted with the event alert of FIG. 40

As is known in the art, swiping event 4020 will cause event details from e.g., a calendar application to appear on the display of user device 130. Accordingly, FIG. 42 is an example graphical user interface 4200 comprising event details that can be presented to a display of user device 130 after a user swiped or otherwise interacted with event 4020 of GUI 4000. The event details come from the calendar or similar application or program, with the exception of venue details 4210, which are imported from map application 132.

Venue details 4210 include graphic 4212 representing LAX's terminal 3 as described in event 4020. In addition to graphic 4112, venue details 4120 include first textual label 4214 identifying details 4210 as "LAX Terminal 3" keeping with the current example. Venue details 4210 also include selector 4216 for allowing the user to select and view the indoor map of the venue (i.e., LAX Terminal 3). Venue details 4210 also includes indoor directory 4220 identifying POI category selectors 4222, 4224 and 4226 that a user may select to search for and view inside the venue in accordance with the principles discussed herein. Directory 4220 also includes selector 4228 for initiating a manual search of the venue as described herein.

POI Density

As shown and described above, the disclosed venue features for map application 132 includes a unique technique for displaying and labeling points of interest within a venue. In accordance with the disclosed principles, POI dots may be used at a low zoom level to create visual interest in the inside view of a venue and to encourage a user to zoom in further to see more. The POI dots are used to show a density of POIs available within the venue. This is different than a typical map application that presents an outdoor map and only places dots sporadically, providing no indication of density of POIs on the map. Moreover, displaying every POI maybe confusing or lacking visual appeal by providing too much information at one time. As shown and described above, in map application 132, additional useful category information (e.g., category indicators) can be associated with displayed POIs when more zooming is performed (i.e., at lower zoom levels).

A POI can be associated with one of three states dictating how the POI and its structure are identified on an indoor map (e.g., by a dot, dot with label, or a category indicator with a label) and a fourth state whereby the POI is not identified on the indoor map (i.e., only the structure is shown, but the identification of the POI is hidden from view).

Figure 43:
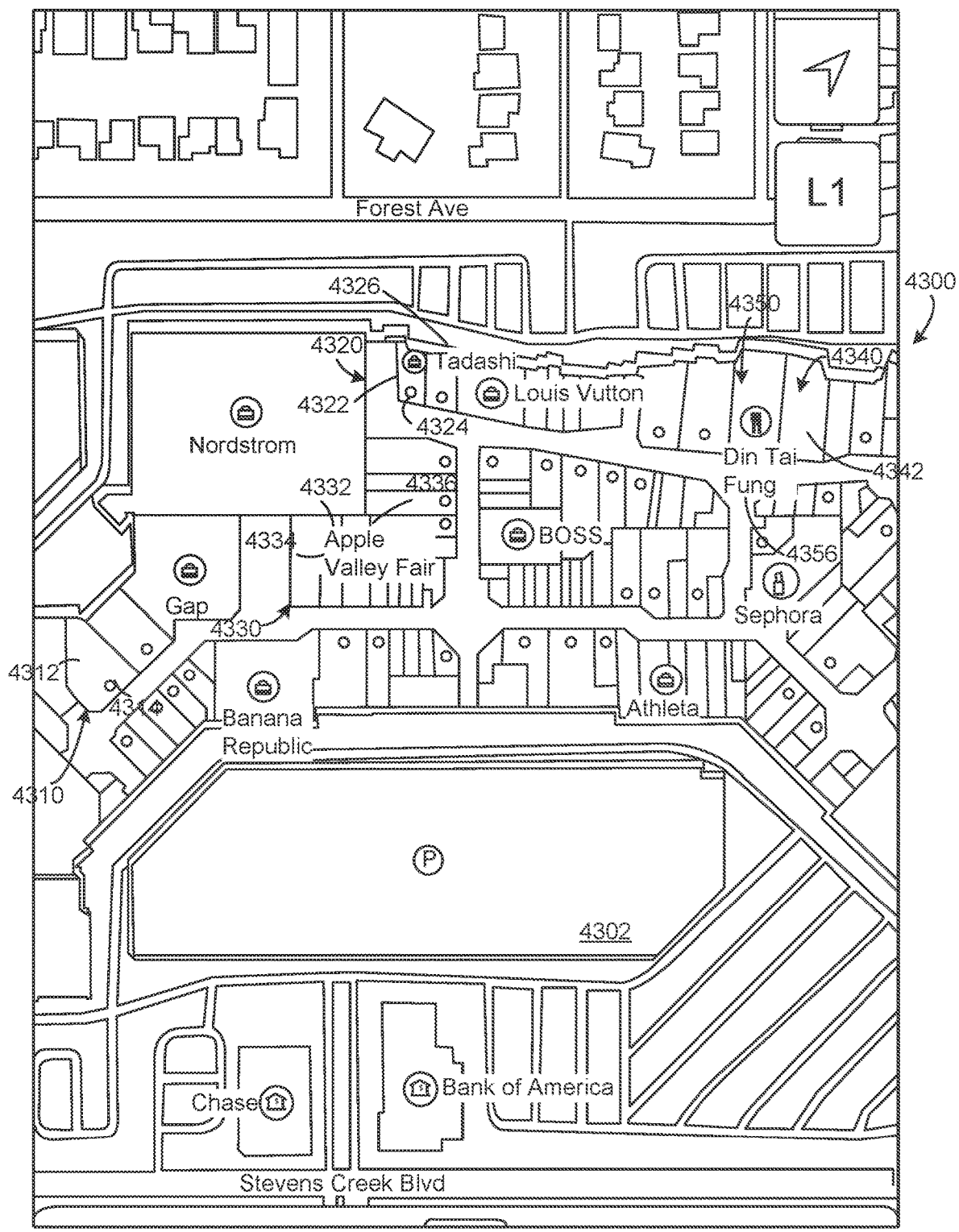
FIG. 43 is an example graphical user interface presenting an indoor map comprising points of interest in one of four display states.

FIG. 43 is an example graphical user interface 4300 presenting an indoor map 4302 comprising points of interest in one of four display states. For example, POI 4310 is shown in a first state whereby it is represented by its physical structure 4312 and identified by POI dot 4314. POI 4320, for example, is shown in a second state whereby it is represented by its physical structure 4322 and identified by POI dot 4324 and textual label 4326 describing POI 4320 as "Tadashi," by way of example. POI 4330, for example, is shown in a third state whereby it is represented by its physical structure 4332, POI indicator 4334 and textual label 4336 describing POI 4330 as "Apple Valley Fair," by way of example. In the illustrated implementation, POI indicator 4334 is a graphic associated with Apple, Inc., but as shown and described herein, POI indicator 4334 could indicate a category (e.g., a category indicator associated with a venue directory), sub-category (e.g., a food category indicator such as pizza indicator) or other type of indicator (e.g., airport gate indicator) associated with POI 1430.

POI 4340 is different from POIs 4310, 4320 and 4330. For example, POI 4340 shown in a fourth state whereby it is only represented by its physical structure 4342. In some implementations, POI 4340 has no label because its label would collide with or be occluded by another POI's labeling (e.g., label 4356 of POI 4350) discussed in more detail below.

In some implementations, POIs will transition from the first state, to the second state and to the third state as the indoor map or POI is zoomed-in further. For example, a POI represented by its structure and POI dot (i.e., state 1) will transition to a POI represented by its structure, POI dot and textual label (i.e., state 2) after a first zoom-in operation. Similarly, a POI represented by its structure, POI dot and textual label (i.e., state 2) will transition to a POI represented by its structure, POI indicator and textual label (i.e., state 3) after a second zoom-in operation. In some implementations, the transitions between states will be animated to further draw in the attention of a user.

As can be appreciated, there is only so much space on a display of user device 130. Room on a display may cause labeling of POIs to conflict (i.e., overlap each other), which is undesirable. Conflicts may also occur if a venue contains numerous closely spaced POIs, preventing the use of labels for each POI. Accordingly, prior to displaying POIs in e.g., states 2 or 3, map application 132 calculates the size required to represent the POIs on the current view of the display area. If the representations of one or more POIs will overlap, map application 132 will hide one or more of the representations to keep the display area from being cluttered.

In some implementations, map application 132 will prioritize and process POI labeling to ensure that there are no overlapping/conflicting labels. In some implementations, map application 132 uses a prominence metric and analysis for determining which POIs should be represented more prominently in comparison to other POIs in the venue. In some implementations, a POI can be associated with a popularity metric, the more popular the POI to the particular venue or to the public in general, the more likely it will be represented more prominently than other POIs. In some implementations, POIs could be assigned other values (e.g., a value indicating that the POI is frequently visited by the particular user) to be considered in prioritizing the POIs.

POIs can also be associated with a particular size based on their structure. For example, POI sizes can be small, medium, large, extra-large and double extra-large. The size of the POI can also be considered in determining which POIs should be represented more prominently on the current map view.

Once prioritized, POIs that should be represented more prominently, will be represented by its structure, POI indicator and textual label (i.e., state 3) if the display conditions of the map allow. Otherwise, POIs that should be represented more prominently, will be represented by its structure, POI dot and textual label (i.e., state 2) if the display conditions of the map allow. Finally, POIs that should be represented more prominently, will be represented by its structure and POI dot (i.e., state 1). In some implementations, double extra-large POIs (unless hidden) will always be represented by its structure, POI dot and textual label, or POI indicator and textual label (i.e., they will only be represented via states 2 or 3) due to their size.

The remaining POIs on the current map view will be represented as discussed above unless they are occluded. In that case, the POI of an occluded POI will only be represented by its structure with further identification hidden from the view (i.e., state 4).

Figure 44A:
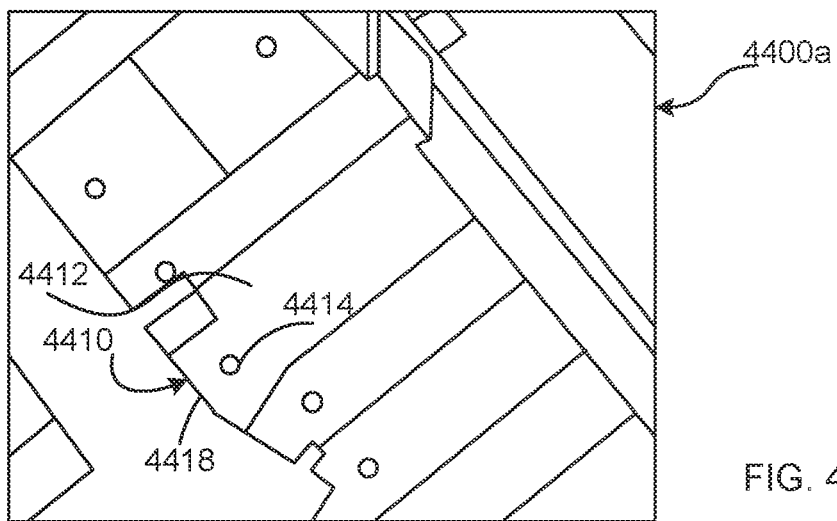
FIG. 44a is a portion of an example graphical user interface presenting example points of interest having a small footprint.

In some implementations, map application 132 places POI dots and indicators in one of two locations within the POI's structure based on a size of the POI's structure. FIG. 44a is a portion of an example graphical user interface 4400a presenting example points of interest having a small footprint. For example, POI 4410 is represented by structure 4412 having a small footprint or size. In this example, POI dot 4414 is placed at a front portion of structure 4412 slightly offset from entrance 4418. The offset can be a predetermined distance that is used for every POI. The offset can correspond to a distance based on the actual size of the structure of the POI as determined by the map data (e.g., 4 meters). In some implementations, the offset can correspond to a value suitable for the current zoom level of the current view. All that is required is that each POI represented in this manner uses the same offset to present a uniformed representation and esthetically pleasing view. Thus, the present disclosure should not be limited to any particular or actual offset value.

Figure 44B:
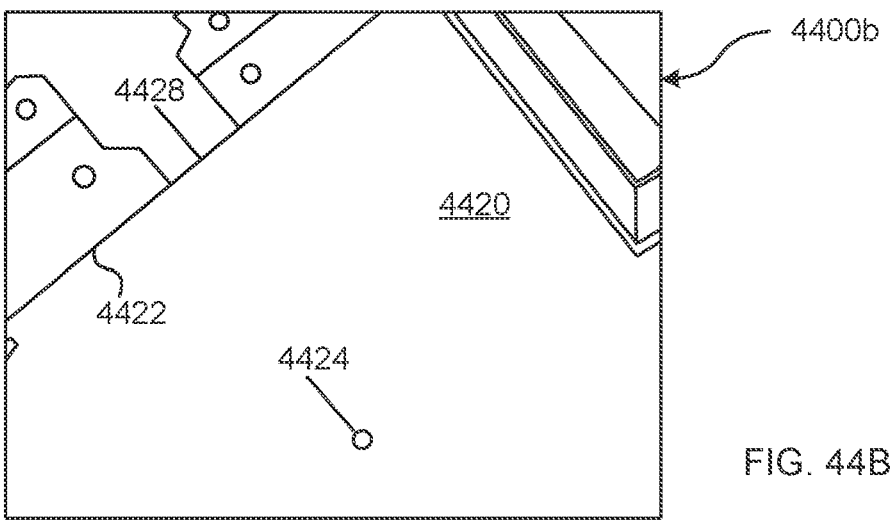
FIG. 44b is a portion of an example graphical user interface presenting an example point of interest having a large footprint.

FIG. 44b, on the other hand, is a portion of an example graphical user interface 4400b presenting an example point of interest having a large footprint. For example, POI 4420 is represented by structure 4422 having a large footprint or size. In this example, POI dot 4424 is placed at the approximate center of structure 4422 instead of being offset from entrance 4428. This type of placement is both esthetically pleasing and provides a good indication as to the size of structure 4422.

Figure 44C:
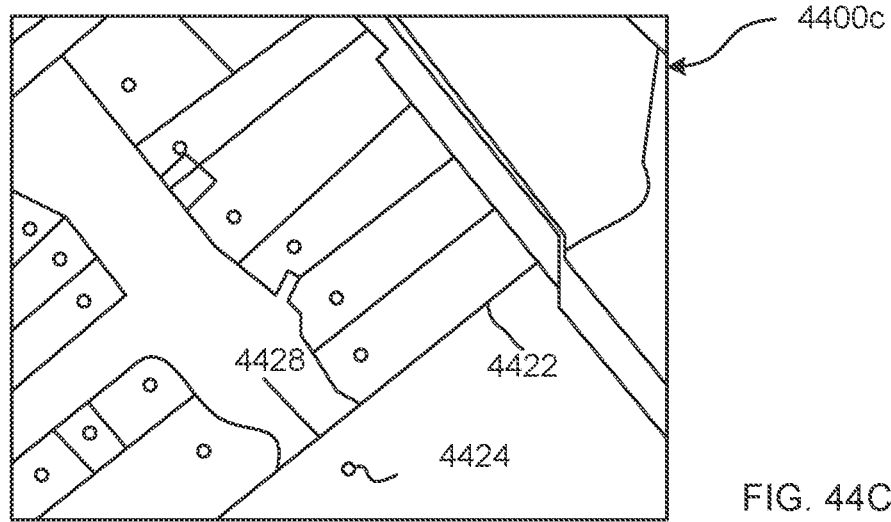
FIG. 44c is a portion of an example graphical user interface presenting an example point of interest having a large footprint in which only a portion is presented in the current view.

Sometimes, however, the entire structure of a large-sized POI will not be in the current view (e.g., due to the zoom level or position of the POI in the current view, some of the POI's structure will not be shown in the current view). In these situations, it is not desirable, or may not be possible, to position the POI's dot in the center of its structure. Accordingly, another technique should be used. FIG. 44c is a portion of an example graphical user interface 4400c presenting an example point of interest having a large footprint in which only a portion is presented in the current view. As can be seen, POI 4420's structure 4422 is only partially reproduced. Accordingly, in this example, POI dot 4424 is placed at the front of structure 4424 offset from entrance 4428 similar to the way POI dots are placed for smaller-sized POIs.

Figure 45A:
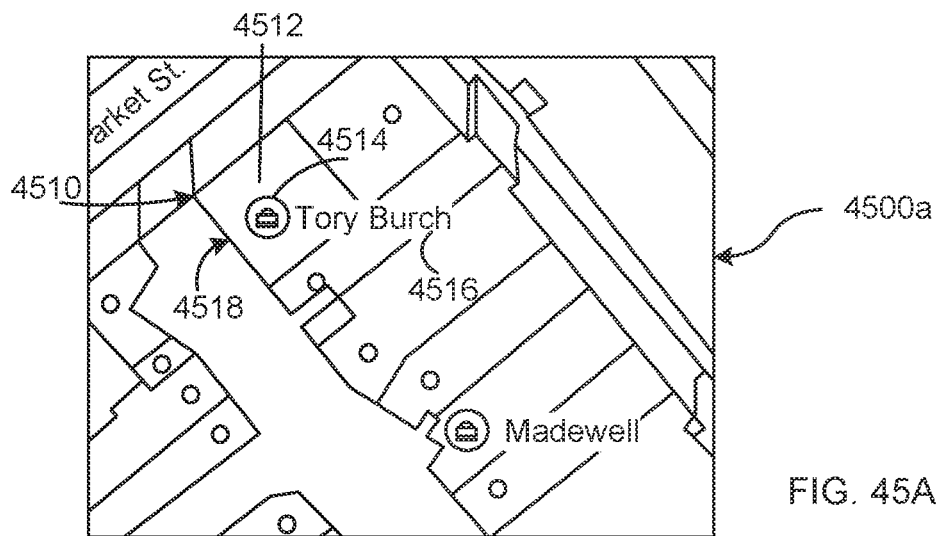
FIG. 45a is a portion of an example graphical user interface presenting example points of interest having a small footprint.
Figure 45B:
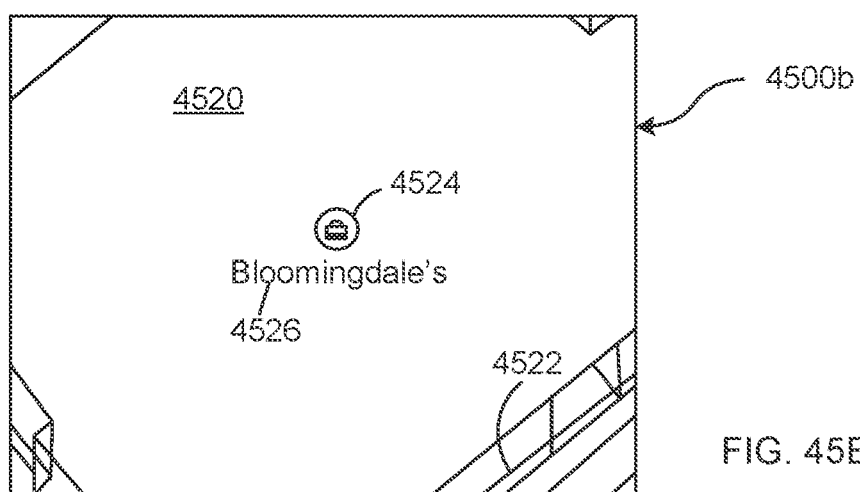
FIG. 45b is a portion of an example graphical user interface presenting an example point of interest having a large footprint.

In some implementations, the same type of POI placement is used when POIs are represented with labeling. For example, FIG. 45a is a portion of an example graphical user interface 4500*a* presenting example points of interest having a small footprint. For example, POI 4510 is represented by structure 4512 having a small footprint or size. In this example, POI indicator 4514 is placed at a front portion of structure 4512 slightly offset from entrance 4518. Textual label 4516 is anchored to POI indicator 4514 and is therefore also offset from entrance 4518. FIG. 45*b*, on the other hand, is a portion of an example graphical user interface 4500*b* presenting an example point of interest having a large footprint. For example, POI 4520 is represented by structure 4522 having a large footprint or size. In this example, POI indicator 4524 is placed at the approximate center of structure 4522 instead of being offset from entrance 4428. Textual label 4526 is anchored to POI indicator 4524 and is therefore also placed at the approximate center of structure 4522.

Figure 45C:
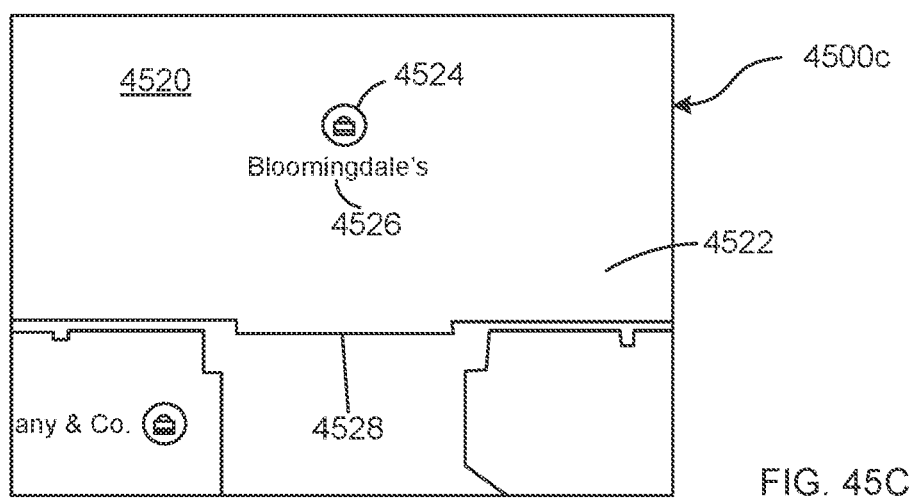
FIG. 45c is a portion of an example graphical user interface presenting an example point of interest having a large footprint in which only a portion is presented in the current view.

Sometimes, however, the entire structure of a large-sized POI will not be in the current view (e.g., due to the zoom level or position of the POI in the current view, some of the POI's structure will not be shown in the current view). In these situations, it is not desirable, or may not be possible, to position the POI's dot in the center of its structure. Accordingly, another technique should be used. FIG. 45*c* is a portion of an example graphical user interface 4500*c* presenting an example point of interest having a large footprint in which only a portion is presented in the current view. As can be seen, POI 4520's structure 4522 is only partially reproduced. Accordingly, in this example, POI indicator 4524 is placed at the front of structure 4524 offset from entrance 4528 similar to the way POI indicators are placed for smaller-sized POIs. Textual label 4526 is anchored to POI indicator 4524 and is therefore also offset from entrance 4528.

Figure 46:
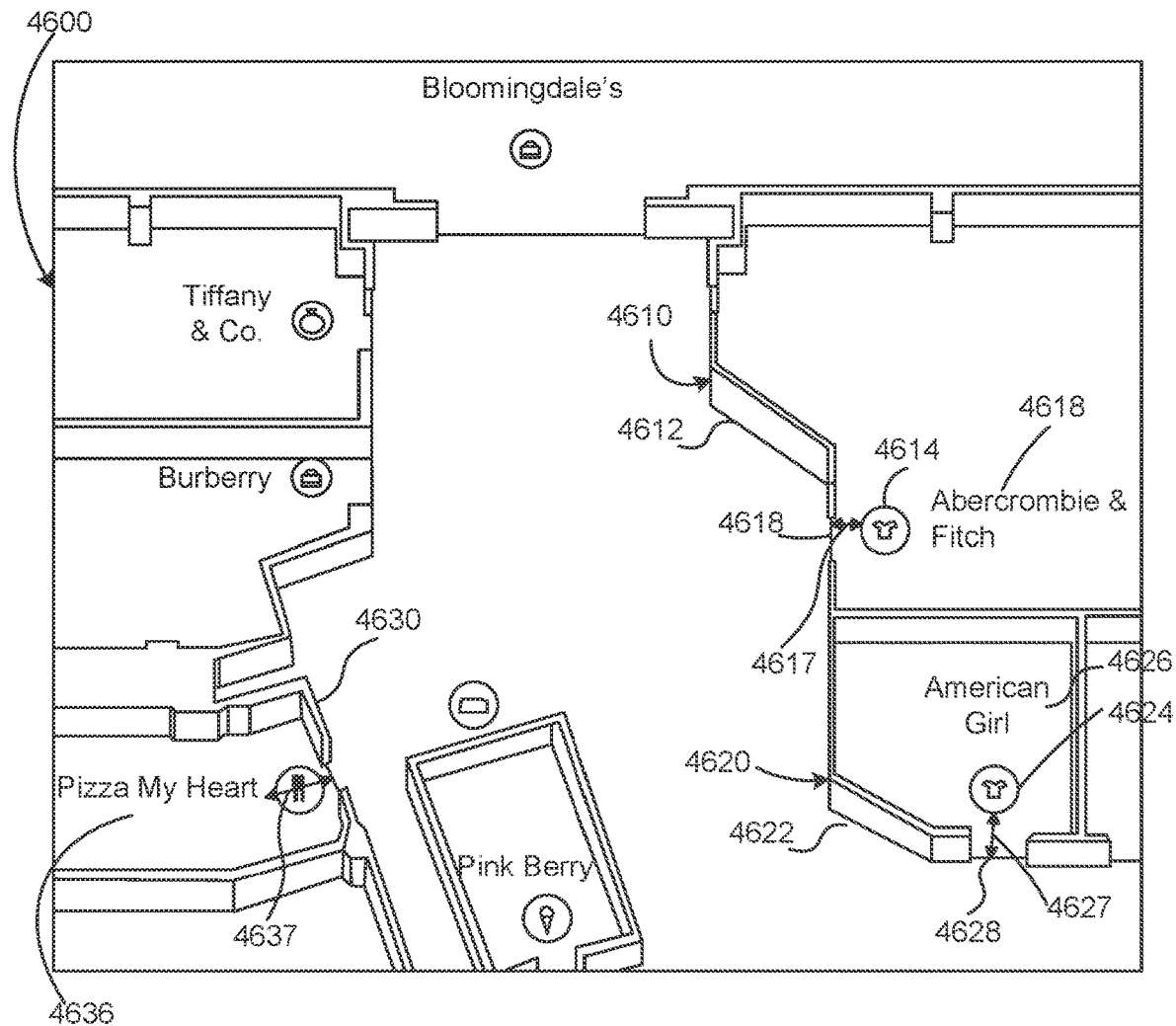
FIG. 46 is a portion of an example graphical user interface presenting different labeling for example points of interest.

In some implementations, map application 132 will place and anchor the textual labels of POIs with textual labels at different positions with respect to the associated POI dot or indicator in order to fit within the associated structure and to prevent overlaps with other POIs. FIG. 46 is a portion of an example graphical user interface 4600 presenting different labeling for example points of interest. For example, POI 4610 has structure 4612 with entrance 4618. Due to the position of entrance 4618 and location of adjacent POI 4620, textual label 4616 is anchored to the right of POI indicator 4614. POI indicator 4614 and therefore textual label 4616 are offset from entrance 4618 by distance 4617.

POI 4620 has structure 4622 with entrance 4628. Due to the position of entrance 4628 and location of adjacent POI 4610, textual label 4626 is anchored above POI indicator 4624. POI indicator 4624 and therefore textual label 4626 are offset from entrance 4628 by distance 4627. In addition, example POI 4630 has structure 4632 with entrance 4638. Due to the position of entrance 4638 and location of adjacent POIs, textual label 4636 is anchored to the left of POI indicator 4634. POI indicator 4634 and therefore textual label 4636 are offset from entrance 4638 by distance 4637. Although not shown in FIG. 46, textual labels can be anchored to their associated POI dots or indicators below the POI dot or indicator (see POI 4350 of FIG. 43).

In some implementations, after POI dots and indicators have been placed, map application 132 aligns them with respect to each other, providing an esthetically pleasing and uniform presentation of POIs. In some implementations, if a POI dot or indicator was offset from an entrance in a horizontal direction, the POI dot or indicator is aligned with other POI dots and indicators in the vertical direction. Likewise, if a POI dot or indicator was offset from an entrance in a vertical direction, the POI dot or indicator is aligned with other POI dots and indicators in the horizontal direction. Map application 132 aligns the POI dots and indicators such that they are separated by a static distance from each other.

Figure 47:
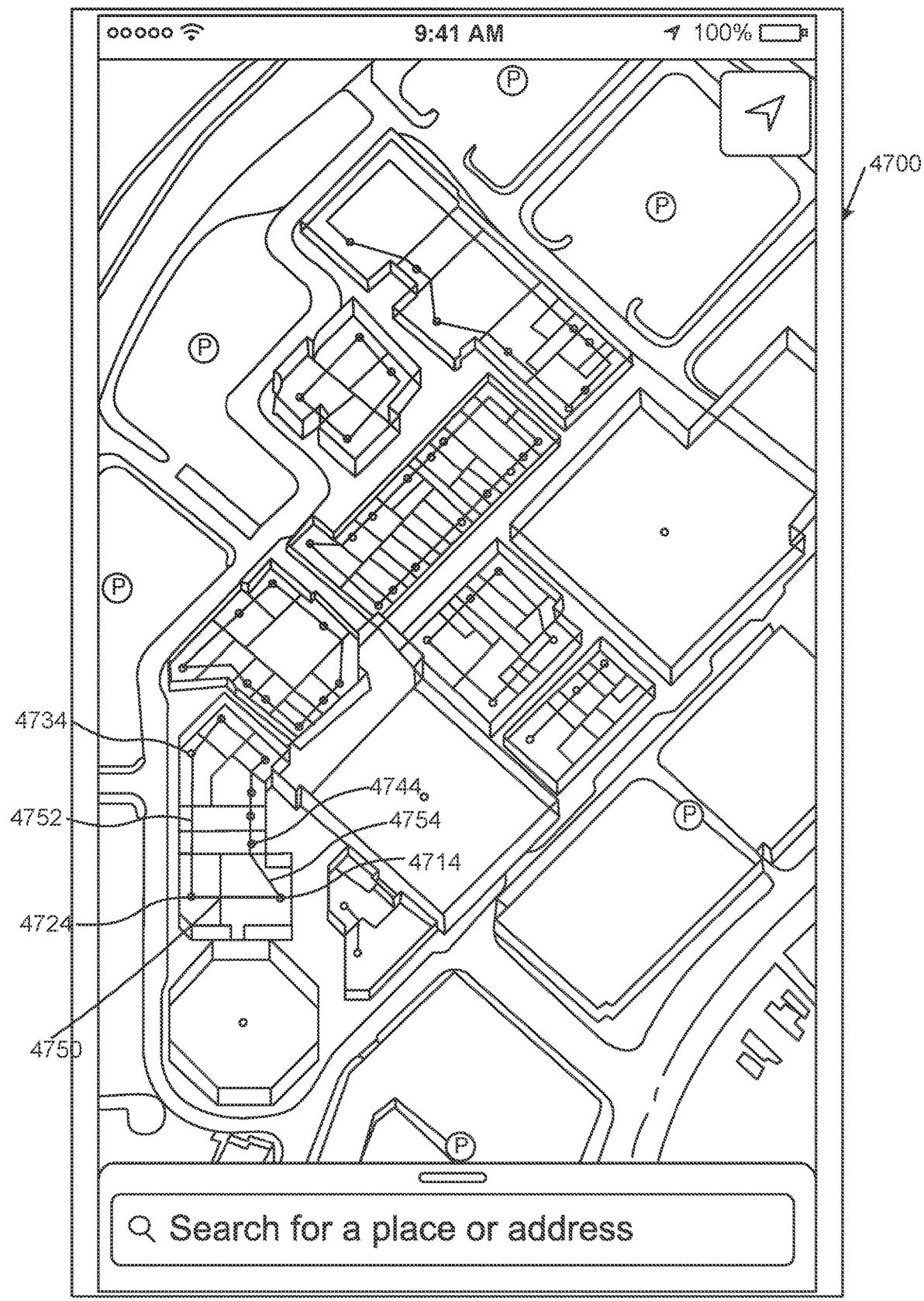
FIG. 47 is an example graphical user interface illustrating the alignment of example points of interest on an indoor map.

FIG. 47 is an example graphical user interface illustrating the alignment of example points of interest on an indoor map. For example, once POI dots 4714 and 4724 are initially placed as discussed above, map application 132 aligns them in a horizontal direction 4750. In addition, once POI dots 4724 and 4734 are initially placed as discussed above, map application 132 aligns them in a vertical direction 4752. Sometime POIs are aligned along a diagonal direction. For example, once POI dots 4714 and 4744 are initially placed as discussed above, map application 132 aligns them in a diagonal direction 4754.

Indoor Venue Routing

Once at a venue, it is desirable for map application 132 to provide a route and/or turn-by-turn navigation instructions to a destination within the venue when desired by the user. As can be appreciated, indoor navigation of a venue with multiple floors or structures is quite complex and difficult and requires adjustments to the presentation to ensure that the navigation route is not hidden from view while the user is traversing the route. Moreover, the presentation may be required to route the user between floors using e.g., an elevator, escalator or staircase and thus must be able to present the route and navigation instructions accordingly.

In some implementations, map application 132 presents indoor route and/or turn-by-turn navigation instructions on user device 130 by determining the position of device 130 and venue structure using an indoor navigation method such as the polygon routing method disclosed in U.S. patent application Ser. No. 14/869,830, filed Sep. 29, 2015, which is hereby incorporated by reference in its entirety. While desired, the disclosed embodiments should not be limited to a polygon routing method for by determining the position of device 130 and venue structure and that any suitable indoor navigation method (e.g., GPS-based) can be used to provide the indoor route and/or turn-by-turn navigation instructions in accordance with the disclosed principles.

In some implementations, map application 132 uses a virtual camera that, based on detected changes in the navigation context, dynamically modifies the way it captures portions of the indoor map to produce different navigation scenes in the navigation presentation for the venue. U.S. patent application Ser. No. 15/274,378, filed Sep. 23, 2016, which is hereby incorporated by reference in its entirety, discloses a context driven navigation presentation for an outdoor environment. Similar principles can be used by map application 132 to provide a context driven navigation presentation for an indoor environment such as one of the venues discussed herein.

To generate the indoor navigation scenes, map application 132 can (1) identify different sets of attributes that describe the venue's different navigation contexts at different times during the navigation presentation, and (2) use these different sets of attributes to identify different styles for operating the virtual camera. In some embodiments, map application 132 uses an identified style to specify the virtual camera's positional attributes, which, in turn, define the portions of the indoor map that the virtual camera identifies for rendering to produce several navigation scenes for a period of time (e.g., until the navigation context changes, or until the navigation presentation ends when the navigation context does not change again). During the indoor navigation presentation, each time the navigation context changes, the identified set of attributes may change, which may also can the style for operating the virtual camera.

Figure 48:
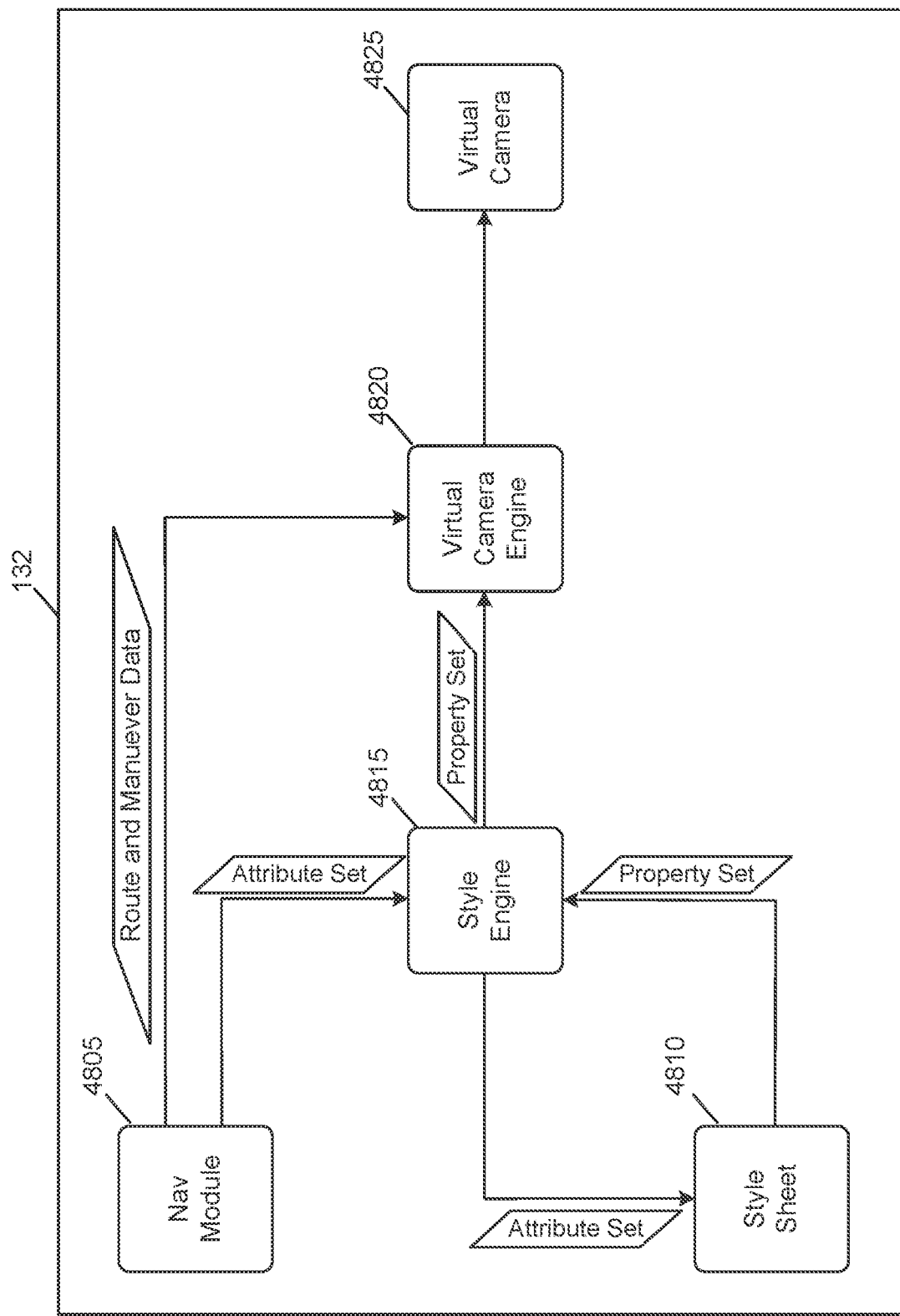
FIG. 48 is an example of components within the map application for providing an indoor navigation presentation for a venue.

FIG. 48 is an example illustrating components within map application 132 that can be used to implement the overview navigation mode and indoor context driven turn-by-turn navigation mode in accordance with the disclosed principles. Map application 132 includes navigation module 4805, style sheet 4810, style engine 4815, virtual camera engine 4820, and virtual camera 4825.

In some implementations, navigation module 4805 (1) identifies an indoor route for device 130 to navigate to a destination within the venue, (2) uses indoor navigation location services such as the polygon routing method disclosed in U.S. patent application Ser. No. 14/869,830 or another location-based service (e.g., GPS service) to identify the position of device 130 as it travels in a region of the venue, (3) correlates this position to venue locations on or near the generated route, and (4) generates sets of attributes that describe the different navigation contexts at different times during the indoor navigation presentation. Examples of such attributes include the type of walkway currently being navigated (e.g., surrounded by multiple points of interests, a hallway, an open area, a food court), whether the route is at a floor changing device (e.g., elevator, escalator, staircase), the distance to the next maneuver in the route, the type of next maneuver, the navigation status (e.g., on-route, off-route, recalculating-route), etc.

In some embodiments, each attribute set has several attributes and each time one of these attributes changes, the attribute set changes. In some embodiments, a change in the attribute set is viewed as a change to the navigation context. Each time the attribute set changes, navigation module 4805 in some embodiments provides this new attribute set to style engine 4815. In other embodiments, style engine 4815 iteratively queries the navigation module 4805 for the current attribute set that defines the current navigation context. In either of these approaches, style engine 4815 can repeatedly receive, from navigation module 4805, sets of attributes that express different navigation contexts at different instances of the navigation presentation.

Each time style engine 4815 receives a new attribute set from navigation module 4805, it examines the VC styles stored in style sheet 4810 to identify a VC style that matches the new attribute set. Style sheet 4810 is a data structure that stores several styles. In some embodiments, map application 132 can download new styles from a set of servers, which it then stores in style sheet 4810.

For each style, style sheet 4810 in some embodiments stores (1) a style identifier, and (2) a set of style properties. In some embodiments, the style identifier of a style is defined in terms of a set of attributes. Thus, to identify a VC style that matches a newly received attribute set, style engine 4815 in some embodiments compares the newly received attribute set with the set of attributes of the stored styles in order to identify a style with a matching attribute set. In some embodiments, the style identifiers are derived (e.g., are computed) from the associated attribute sets of the styles. For instance, in some embodiments, the style identifiers are hash values of the attribute sets. To identify a matching style, the style engine in these embodiments compares the newly received attribute set with the style identifiers, by first generating a hash of a newly received attribute set, and then using the computed hash value to identify a style in the style sheet with a matching style identifying hash value.

After identifying a style for a newly received attribute set, style engine 4815 determines whether the identified style is different from the previously identified style that is currently being used to define the operation of the virtual camera 4825. If not, style engine 4815 does not provide the VC engine a new style or a new set of VC properties. However, when the identified style is different from the previously identified style, style engine 4815 provides the new style's associated set of VC properties to VC engine 4820 of the map application.

VC engine 4820 identifies positional attributes of the virtual camera based on the properties sets of the VC styles that it receives from style engine 4815. These positional attributes, in turn, define the portions of the map that the virtual camera identifies for rendering to produce several navigation scenes for a period of time (e.g., until the navigation context changes, or until the end of the navigation presentation when the navigation context does not change again). When navigation module 4805 identifies different attribute sets to describe different navigation contexts, and the style engine 4815 identifies different VC styles based on these different attribute sets, style engine 4815 provides to VC engine 4820 different VC styles that specify different VC properties, which cause this engine to specify different ways that the virtual camera should define the portion of the map to render.

Based on a style's associated set of properties, VC engine 4820 of some embodiments identifies the virtual camera's angular pitch (e.g., from top-down position to a perspective angular position), the virtual camera's rotation (e.g., in an X-Y plane defined by x- and y-axes of the map's coordinate system), and the virtual camera's distance from a region on the map that it targets, e.g., from a location of a puck that represents the device in the navigation presentation as the puck navigates along a route in the presentation. In some embodiments, the virtual camera has a system of springs that specify its angular pitch, rotation, and height, and a style's associated set of properties are used to define one or more parameters of the spring system. The spring system in some embodiments also includes a spring for the position of the puck on the screen that displays the navigation presentation (i.e., the display screen on which the virtual camera captured view is projected). These embodiments use the spring system because this system provides an implicit way to specify the virtual camera's movement at different instances in time and an easy way to create the navigation presentation's animation. This is because the spring's properties (e.g., stiffness, damping, rest length, etc.) provide a set of parameters that the VC engine can rely on to bring the virtual camera's properties to their desired state smoothly In some of these embodiments, VC engine 4820 operates the virtual camera either in a tracking mode or a framing mode. During the tracking mode, the virtual camera tracks the puck along the route and maintains the device-representing puck (referred to below as the "puck") at desired location(s) on the display screen that displays the navigation presentation. The display screen is the display screen of the device in some embodiments, while it is a display screen that is being driven by the device in other embodiments. In the framing mode, the virtual camera defines frames (e.g., bounding polygons) to capture collection of points along the route (including the puck's location), and displays these frames at a desired region of interest on the display screen as the puck travels along the route.

To generate the navigation presentation, the map application of some embodiments uses the following four coordinate systems: (1) a map coordinate system, (2) a puck coordinate system, (3) a virtual camera coordinate system, and (4) a display screen coordinate system. In some of these embodiments, the first three coordinate systems are three dimensional systems, with x-, y-, and z-axes, while the fourth coordinate system is a two dimensional system with x- and y-axes.

Figure 49:
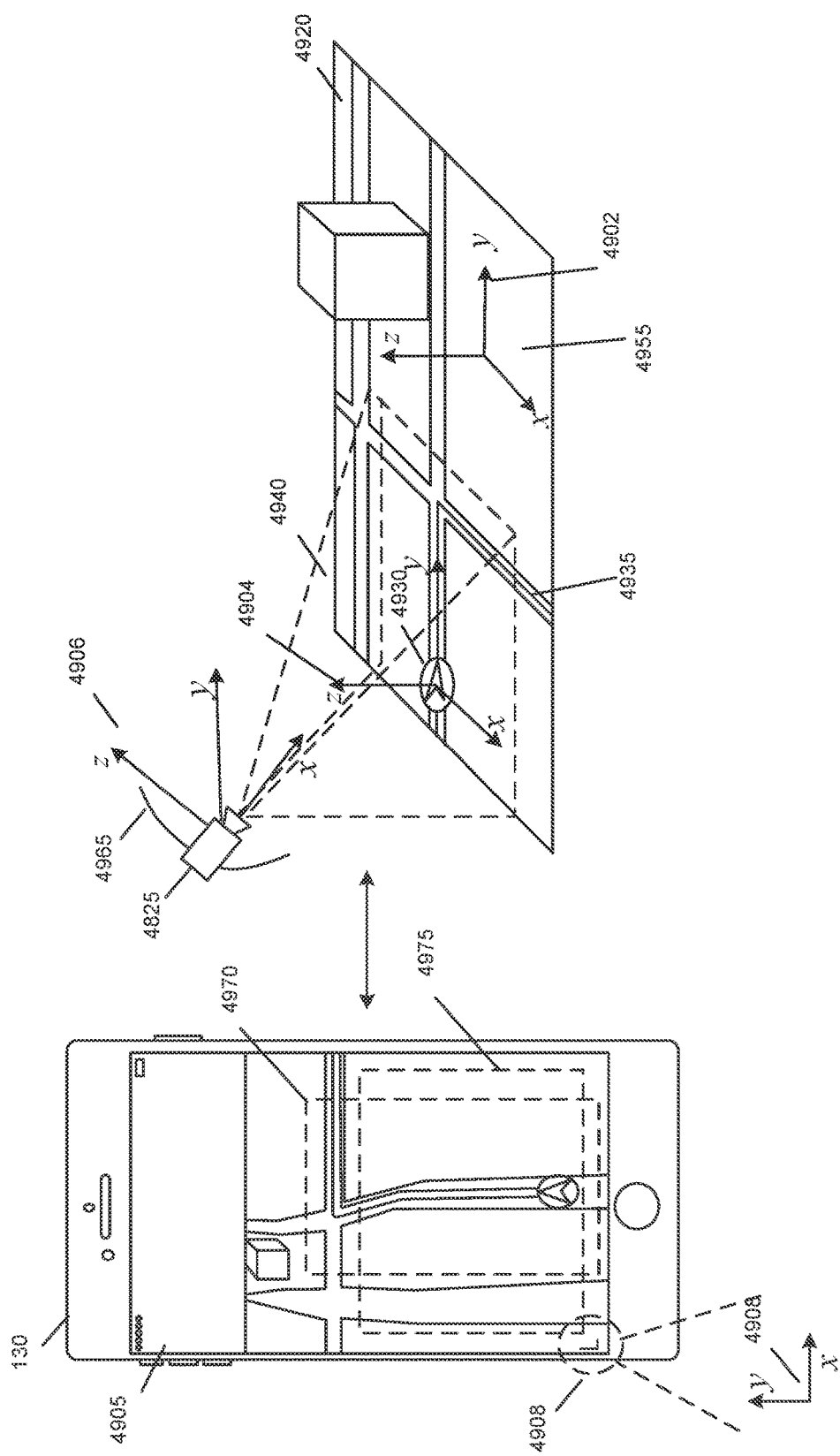
FIG. 49 illustrates an example of the four coordinate systems used by the map application disclosed herein.

FIG. 49 illustrates an example of the four coordinate systems. Specifically, it illustrates a 3D map 4920 of a region that is being captured by virtual camera 4825 as puck 4930 traverses along a route 4935. In this example, the virtual camera is at a perspective 3D position in a 3D map coordinate system 4902. From this perspective 3D position, the virtual camera defines a 3D perspective field of view 4940 that serves as all of, or a portion of, a 3D navigation scene of the 3D navigation presentation. The virtual camera is a conceptual representation of the field of view that is defined to emanate from a particular location and orientation in the 3D map coordinate system.

FIG. 49 also illustrates puck coordinate system 4904, VC coordinate system 4906, and display screen coordinate system 4908 (which is shown in small form on the screen and a larger form off the screen). This figure also illustrates an arc 4965 that represents the virtual camera angular tilt pitch towards the map. In some embodiments, the virtual camera can have a pitch that ranges from top-down view (that defines a 2D view of the map) to a low perspective pitch (that defines a low perspective view of the map). In this example, the display screen 4905 is the display screen of a mobile user device 130 on which map application 132 executes.

Also, in the example illustrated in FIG. 49, the map, puck and camera coordinate systems 4902, 4904, and 4906 are three dimensional systems, with x-, y-, and z-axes, while the display screen coordinate system 4908 is a two-dimensional system with x- and y-axes. When the virtual camera is at a perspective 3D position, the 3D navigation scene that it defines in its field of view 240 is projected onto the 2D coordinate system of the display screen by using a perspective-projection transform in some embodiments. The projection of this field of view 4940 is illustrated as box 4970 in FIG. 49.

During tracking mode, VC engine 4820 in some embodiments maintains the same angular orientation (e.g., a zero angular offset) between the VC's coordinate system 4906 and the puck's coordinate system 4904 in the x-y plane 4955 of the map's coordinate system. For instance, in some embodiments, virtual camera 4825 points in the same direction as the puck during the tracking mode in some embodiments. Also, during the tracking mode, VC engine 4820 in some embodiments maintains the positional relationship (e.g., a zero offset) between the origins of the VC's coordinate system 4906 and the puck's coordinate system 4904. In other embodiments, during tracking mode, VC engine 4820 usually maintains the angular orientation and/or positional relationship between the VC and puck coordinate systems, but allows the angular orientation and/or positional relationship between these two coordinate systems to change for a transient period of time (e.g., the time during which the puck makes a left or right turn) to show more context around a maneuver.

During framing mode, VC engine 4920 in some embodiments completely or partially disassociates the angular rotation of the virtual camera's coordinate system 4906 and the puck's coordinate system 4904. This allows the puck to rotate separately from the map during the framing mode, and allows virtual camera 4825 to capture more of the desired region of interest during this mode. During framing mode, VC engine 4820 in some embodiments no longer requires the origin of the VC's coordinate system 4906 to be held at a particular offset (e.g., zero offset) with respect to the puck's coordinate system 4904. This allows virtual camera 4825 to assume a variety of offset positions to capture more of the useful map areas around or ahead of the puck 4930.

In some embodiments, VC engine 4820 completely or partially disassociates the positional and angular relationships of virtual camera 4825 and puck 4930 during the framing mode by having the virtual camera frame a collection of points (e.g., points along the route, including the puck) for display at the field of focus on the display screen. In some embodiments, the field of focus is a region on the display screen that designers of the map application have designated as the desired location for showing the puck and important points about the puck and the route (e.g., points being framed, such as the puck and nearby maneuvers). FIG. 49 illustrates one example of a field of focus 4975 on the display screen 4905 of device 130.

During the framing mode, VC engine 4820 of some embodiments initially defines the virtual camera parameters that would define a VC field of view that frames the collection of points. After identifying these virtual camera parameters, the VC engine in some embodiments adjusts the virtual camera parameters (e.g., zoom level) in order to try to display the virtual camera's field of view at desired region(s) of interest on the display screen as the puck travels along the route. For example, in some embodiments, the puck is the only point that has to be framed in the collection of points that the VC engine tries to have the virtual camera frame in the framing mode. In some of these embodiments, a style can define a bounding shape (e.g., a bounding box) that is defined about the puck for a particular framing operation that is associated with the style.

During framing, VC engine 4820 projects the collection of points being framed to the display screen coordinate system (e.g., based on the virtual camera's expected, unadjusted position for the next navigation scene). A framing bounding shape (e.g., bounding box) is then defined in the screen space about the projection of the collection of points. The VC engine then uses the puck's bounding shape to determine how much the virtual camera's origin can be offset to capture as many of the collection of points being framed. This operation clips the framing bounding shape. The zoom level of the virtual camera is then adjusted to align one of the sides of the framing bounding shape with one of the sides of the sub-region that represents the display screen's field of focus.

Figure 50:
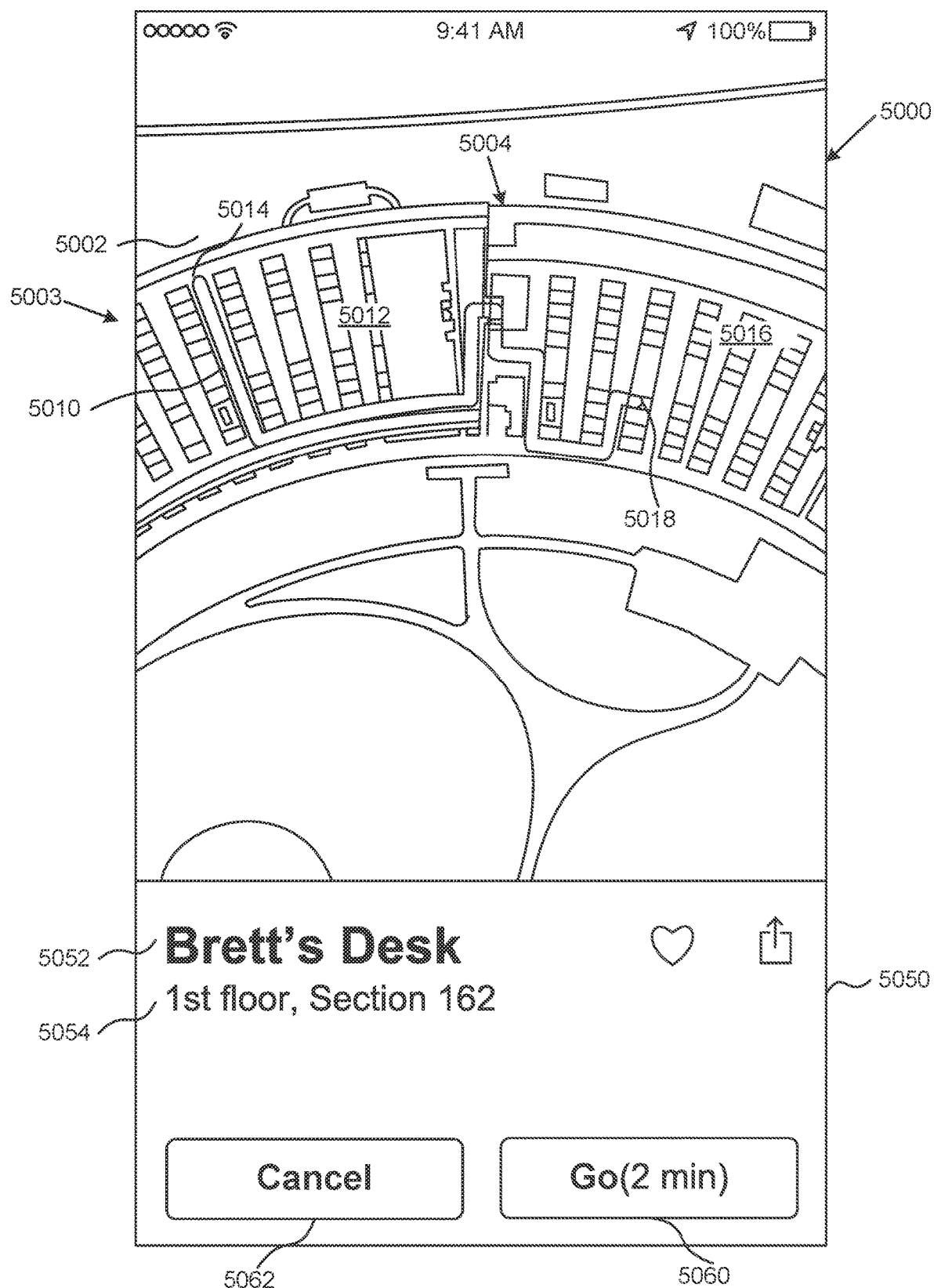
FIG. 50 is an example graphical user interface illustrating an overview of an indoor route on an indoor map of a venue.

FIG. 50 is an example graphical user interface 5000 illustrating an overview 5003 of indoor route 5010 on indoor map 5002 of venue 5004. The illustrated GUI 5000 is presented during the overview navigation mode (i.e., a mode in which only a route is resented to the user along with the user's position along the route). Overview 5000 is taken from an overhead view of the virtual camera. In the illustrated example, route 5010 begins at starting point 5014 on an upper floor 5012 of venue 5004 and ends at intended destination 5018 on lower floor 5016 of venue 5004. Starting point 5014 can be a current location of a user operating user device 130 or it may be a point entered by a user into map application 132. In addition, illustrated intended destination 5018 is an office located on first floor 5016. In the illustrated example, upper floor 5012 is the fifth floor of venue 5004 and lower floor 5016 is the first floor of venue 5004. Accordingly, a user must change floors during route 5010.

In some implementations, GUI 5000 also includes control area 5050 that has first field 5052 identifying intended destination 5018 as "Brett's Desk," by way of example. Control area 5050 also includes second field 5054 identifying the location of intended destination 5018 as "1st floor, Section 162," by way of example. Control area 5050 also includes first selector 5060 for starting an indoor navigation presentation, whereby the user can obtain turn-by-turn instructions for navigating route 5010, and second selector 5062 for cancelling out of overview 5003 presented by GUI 5000. In the illustrated example, first selector 5060 also indicates the projected time to intended destination 5018 shown as "2 min," by way of example.

Figure 51:
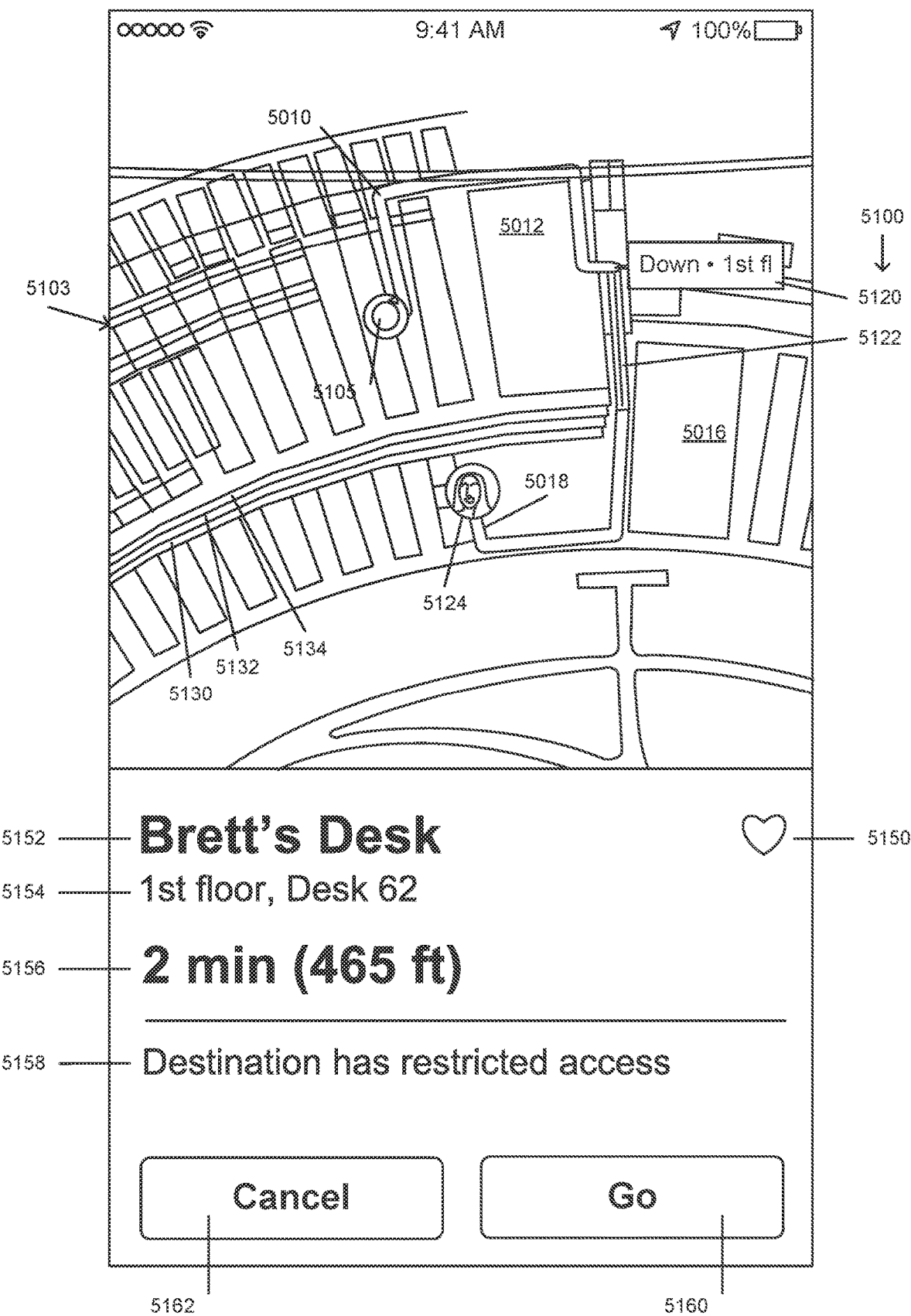
FIG. 51 is an example graphical user interface illustrating a slightly zoomed-in and rotated overview of the indoor route illustrated in FIG. 50.

FIG. 51 is an example graphical user interface 5100 illustrating a slightly zoomed-in and rotated overview 5103 of indoor route 5010. Overview 5103 includes user current location puck 5101 identifying the user's current location on route 5010. Overview 5103 also includes and a graphic 5124 identifying or associated with intended destination 5018. Graphic 5124 can be an image of or associated with intended destination 5018 or it can be a category indicator such as the indicators discussed herein.

As will become apparent, overview 5103 provides one way for a user to traverse route 5010. That is, the user and user device 130 may simply view route 5010 as they move along it. User location is updated using user current location puck 5101 and adherence to route 5010 can be observed by the manner in which route 5010 is presented. For example, if route 5010 is presented as getting shorter and user current location puck 5101 is getting closer to intended destination 5018, the user is on-route. However, if route 5010 is presented as getting longer and user current location puck 5101 is getting further away from intended destination 5018, the user is off-route or going in the wrong direction. Should the user desire turn-by-turn instructions, the user will need to activate turn-by-turn navigation mode.

Overview 5103 also includes textual instruction 5120 "Down—1st fl," indicating that in this example route 5010 goes down to first floor 5016. Overview 5103 also includes floor changing identifier 5122 illustrating a mechanism for moving from upper floor 5012 to lower floor 5016. In some implementations, floor changing identifier 5122 can be in a different color than the color used for route 5010. In addition to, or alternatively, floor changing identifier 5122 could be animated (e.g., flashing, giving the appearance that it is moving up and down) to further present to a user that floor changing identifier 5122 is for changing floors.

Overview 5103 also illustrates several floors 5130, 5132 and 5134 that are within venue 5004, but are being passed through by route 5010. In some implementations, bypassed floors 5130, 5132 and 5134, as well as other structures that are not needed to traverse route 5010, are presented in a deemphasized manner (e.g., grayed out, shown in phantom, etc.) in comparison to the structures along route 5010.

In some implementations, GUI 5100 also includes control area 5150 that has first field 5152 identifying intended destination 5018 as "Brett's Desk," by way of example. Control area 5150 also includes second field 5154 identifying the location of intended destination 5018 as "1st floor—Desk," by way of example. Control area 5150 also includes third field 5156 indicating that the projected route to intended destination 5018 is "2 min (465 ft)," by way of example. Control area 5150 can also include other information about intended destination 5018. For example, control area 5150 can also include fourth field 5158 indicating that intended destination 5018 has "restricted access," by way of example. This additional information can alert the user that a badge or other identifier is required at intended destination 5018.

Control area 5150 also includes first selector 5160 for starting an indoor navigation presentation, whereby the user can obtain turn-by-turn instructions for navigating route 5010, and second selector 5162 for cancelling out of overview 5103 presented by GUI 5100.

In the illustrated example, map application 132 has determined that the overhead overview 5103 is suitable based on the user position and the structural layout of route 5010. For example, map application 132 can determine that the user's current location and the path of the route are not obstructed by the floors, walls or other structures along the route. As noted above, however, it is desirable to ensure that the route does not get hidden as the user traverses the route. Thus, the presentation of route 5010 and structures along the route may require adjustment. In some implementations, adjustments may include separating, repositioning, adjusting the pitch/angle of the floors.

In addition, the context of maneuvers or structure along route 5010 or user behavior on route 5010 may require adjustments of the virtual camera as the route 5010 is being traversed by user device 130. For example, views can be zoomed out or in, floors on the map be separated further, pitch angle could be adjusted such that route 5010 becomes more visible and clearer in the presentation. As discussed above, the adjustments can be made based on a set of attributes such as e.g., the type of walkway currently being navigated (e.g., surrounded by multiple points of interests, a hallway, an open area, a food court), whether the route is at a floor changing device (e.g., elevator, escalator, staircase), the distance to the next maneuver in the route, the type of next maneuver, the navigation status (e.g., on-route, off-route, recalculating-route), etc. As noted above, bypassed floors and other structures that are not needed to traverse route 5010 can be presented in a deemphasized manner (e.g., grayed out, shown in phantom, etc.) in comparison to the structures along route 5010.

Figure 52:
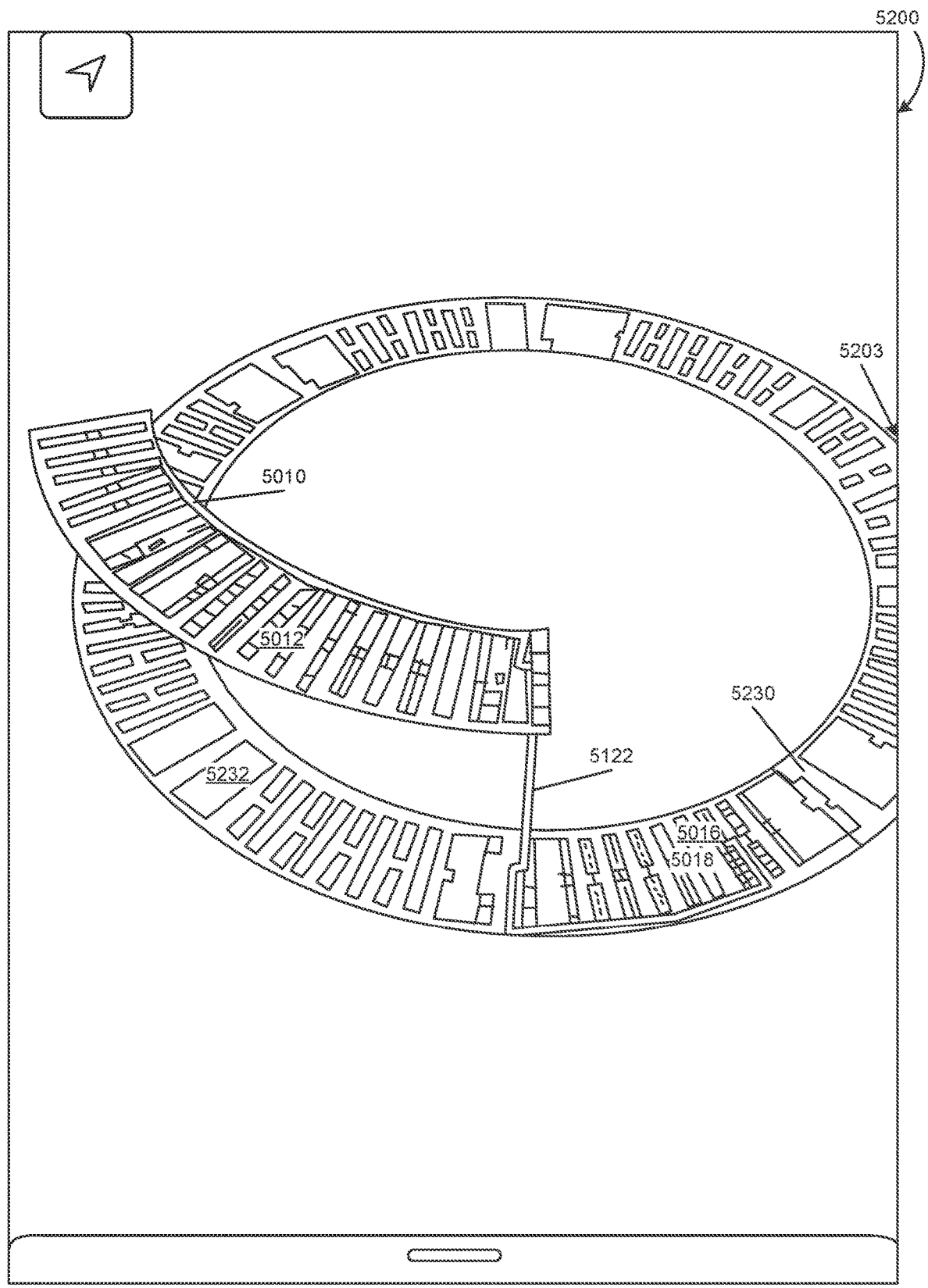
FIG. 52 is an example graphical user interface illustrating a slightly zoomed-out overview of the indoor route illustrated in FIG. 51.

FIG. 52 is an example graphical user interface 5200 illustrating a slightly zoomed-out overview 5203 of indoor route 5010. In the illustrated example, upper floor 5012 has been separated from lower floor 5016 with additional portions 5230 and 5232 of lower floor 5016 being deemphasized. In addition, floor changing identifier 5122 is illustrated between upper floor 5012 has been separated from lower floor 5016 and could be animated (e.g., flashing, giving the appearance that it is moving up and down) to further present to a user that floor changing identifier 5122 is for changing floors. In some implementations, indicator 5122 can have a different visual appearance or be animated differently based on whether the route is suggesting stairs, an elevator or escalator to change floors.

Figure 53:
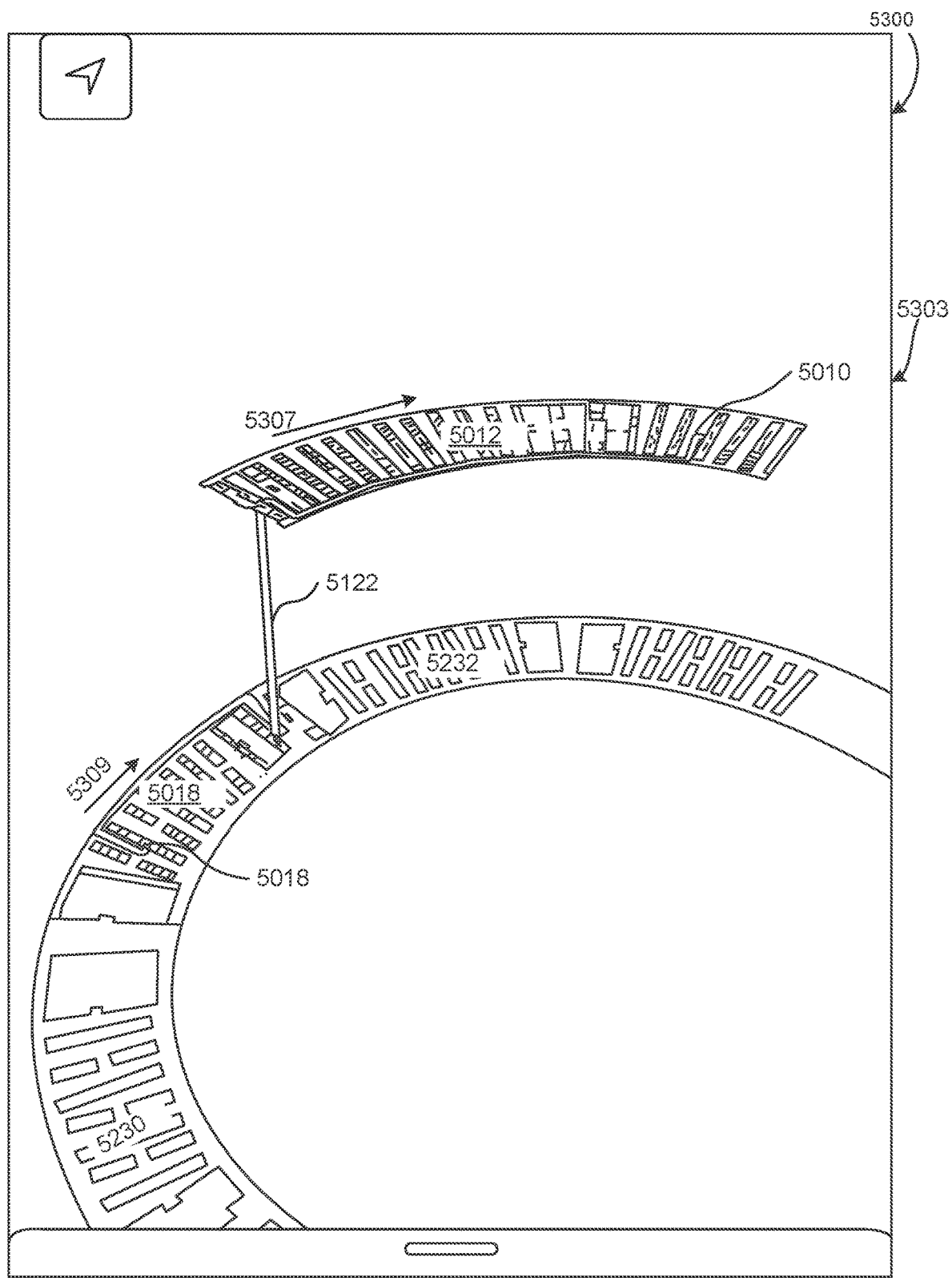
FIG. 53 is an example graphical user interface illustrating a slightly zoomed-in and rotated overview of the indoor route illustrated in FIG. 52.

FIG. 53 is an example graphical user interface 5300 illustrating a slightly zoomed-in and rotated overview 5303 of indoor route 5010. In the illustrated example, upper floor 5012 and lower floor 5016 have been rotated clockwise as shown by arrows 5307 and 5309, respectively. In the illustrated example, portions 5230 and 5232 of lower floor 5016 are zoomed-in since overview 5303 is a zoomed-in view in comparison to overview 5203. As in the prior example, upper floor 5012 and lower floor 5016 remain deemphasized as they are not needed to traverse route 5010.

Figure 54:
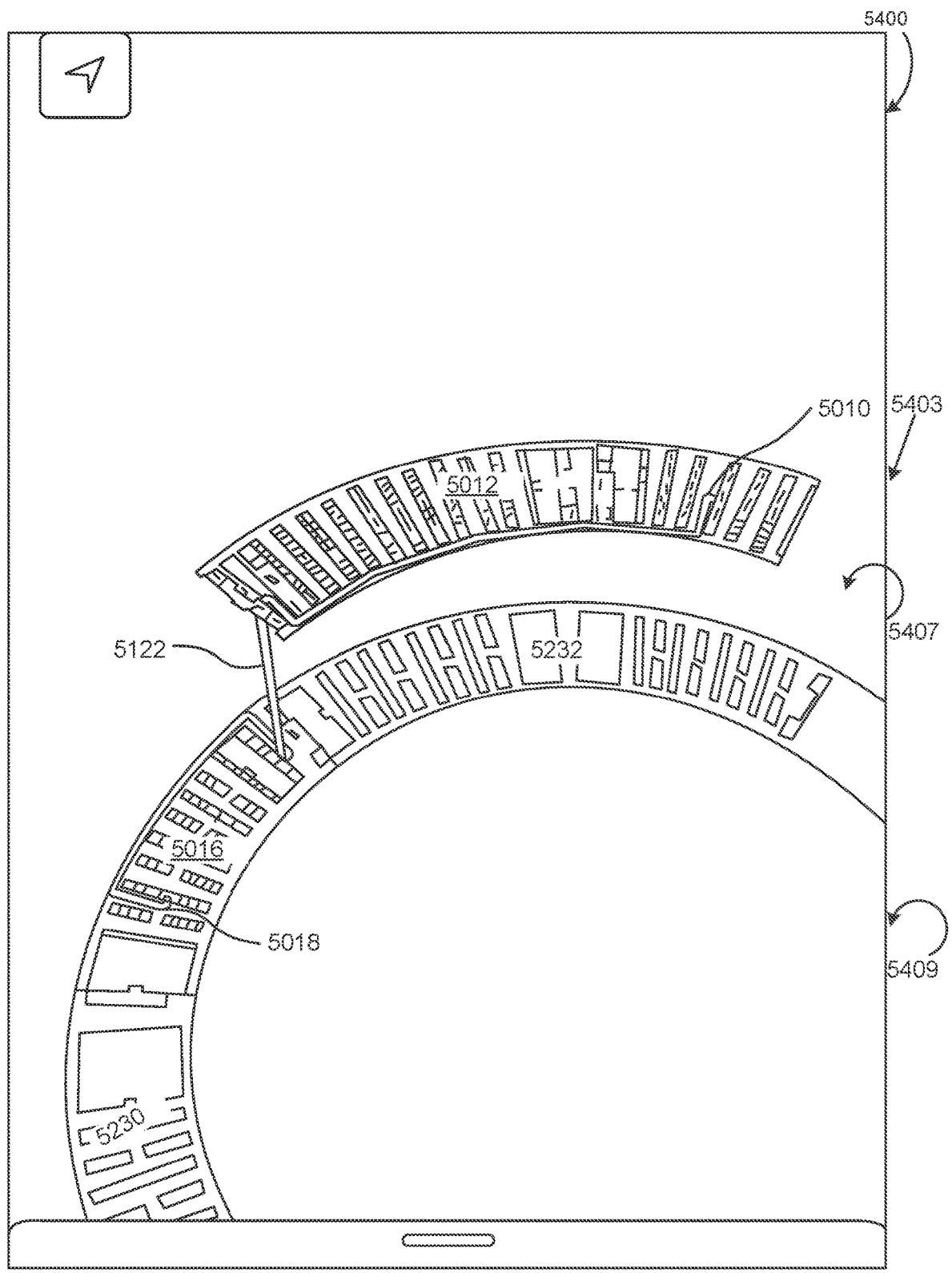
FIG. 54 is an example graphical user interface illustrating an overview of the indoor route having a different pitch than the overview of FIG. 53.

FIG. 54 is an example graphical user interface 5400 illustrating overview 5403 of indoor route 5010 having a different pitch than overview 5303 of FIG. 53. In the illustrated example, the pitch of upper floor 5012 and lower floor 5016 have been changed as shown by arrows 5407 and 5409, respectively. In the illustrated example, portions 5230 and 5232 of lower floor 5016 remain deemphasized as they are not needed to traverse route 5010.

Figure 55:
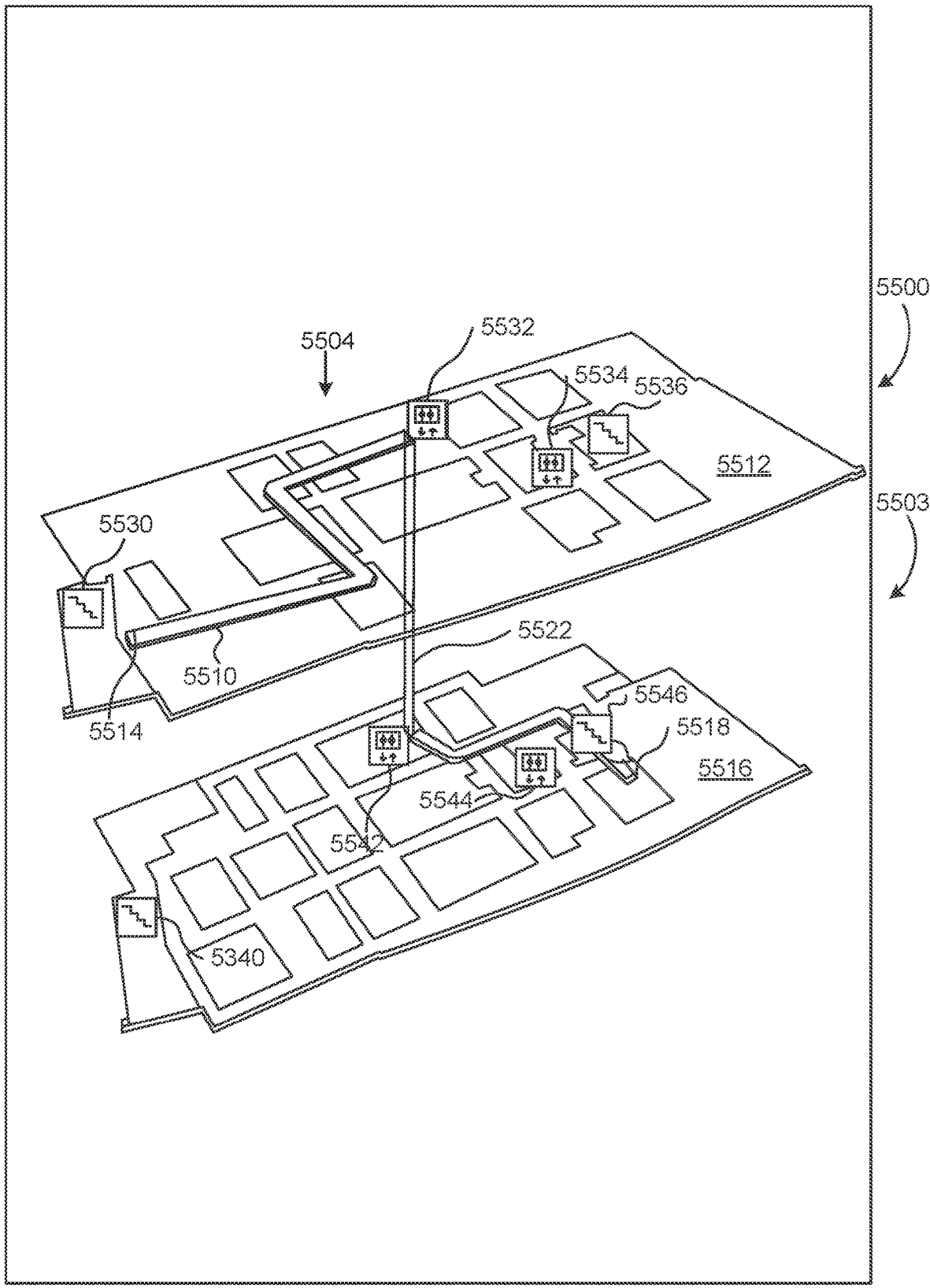
FIG. 55 is an example graphical user interface illustrating overview of a different indoor route for a venue.

FIG. 55 is an example graphical user interface 5500 illustrating overview 5503 of a different indoor route 5510.

In the illustrated example, route 5510 begins at starting point 5514 on an upper floor 5512 of venue 5504 and ends at intended destination 5518 on lower floor 5516 of venue 5004. Starting point 5514 can be a current location of a user operating user device 130 or it may be a point entered by a user into map application 132. In the illustrated example, intended destination 5518 can be a point of interest within venue 5504 such as the points of interest described herein.

As is clear from overview 5503, a user must change floors to traverse route 5510. Accordingly, floor changing identifier 5522 is illustrated in overview 5503 as part of route 5510. In some implementations, one or more graphics or other indicators can be used in conjunction with floor changing identifier 5122 to identify a mechanism within venue 5504 that can be used to change floors. For example, overview 5503 includes graphic 5532 representing an elevator bay on upper floor 5512 and graphic 5542 representing an elevator bay on lower floor 5516 that is part of route 5510. Graphic 5532 and graphic 5542 are connected to floor changing identifier 5122 to present to the user how to get from upper floor 5512 to lower floor 5516. Graphic 5532 and graphic 5542 could be animated to (e.g., giving the appearance that they are moving up and down) to further present to a user that graphics 5532 and 5542 represent an elevator bay.

GUI 5500 illustrates other floor changing devices that are not part of route 5510. For example, overview 5503 includes graphic 5530 representing a staircase on upper floor 5512, graphic 5534 representing another elevator bay on upper floor 5512, and graphic 5536 representing an escalator on upper floor 5512. Graphic 5534 and graphic 5536 could be animated to (e.g., giving the appearance that they are moving up and down) to further present to a user that graphic 5534 represents an elevator bay and graphic 5536 represents an escalator.

In addition, overview 5503 includes corresponding graphics on lower floor 5516. For example, overview 5503 includes graphic 5540 representing a staircase on lower floor 5516, graphic 5544 representing another elevator bay on lower floor 5516, and graphic 5546 representing an escalator on lower floor 5516. Graphic 5544 and graphic 5546 could be animated to (e.g., giving the appearance that they are moving up and down) to further present to a user that graphic 5544 represents an elevator bay and graphic 5546 represents an escalator. Based on overview 5503, a user can determine that there are other methods for moving between floors 5512 and 5516 should the user go off-route.

In some implementations, map application 132 can provide a turn-by-turn navigation presentation for a route within a venue in a turn-by-turn navigation mode. In some implementations, the turn-by-turn navigation presentation will be context driven and based on one or more attributes discussed herein.

Figure 56:
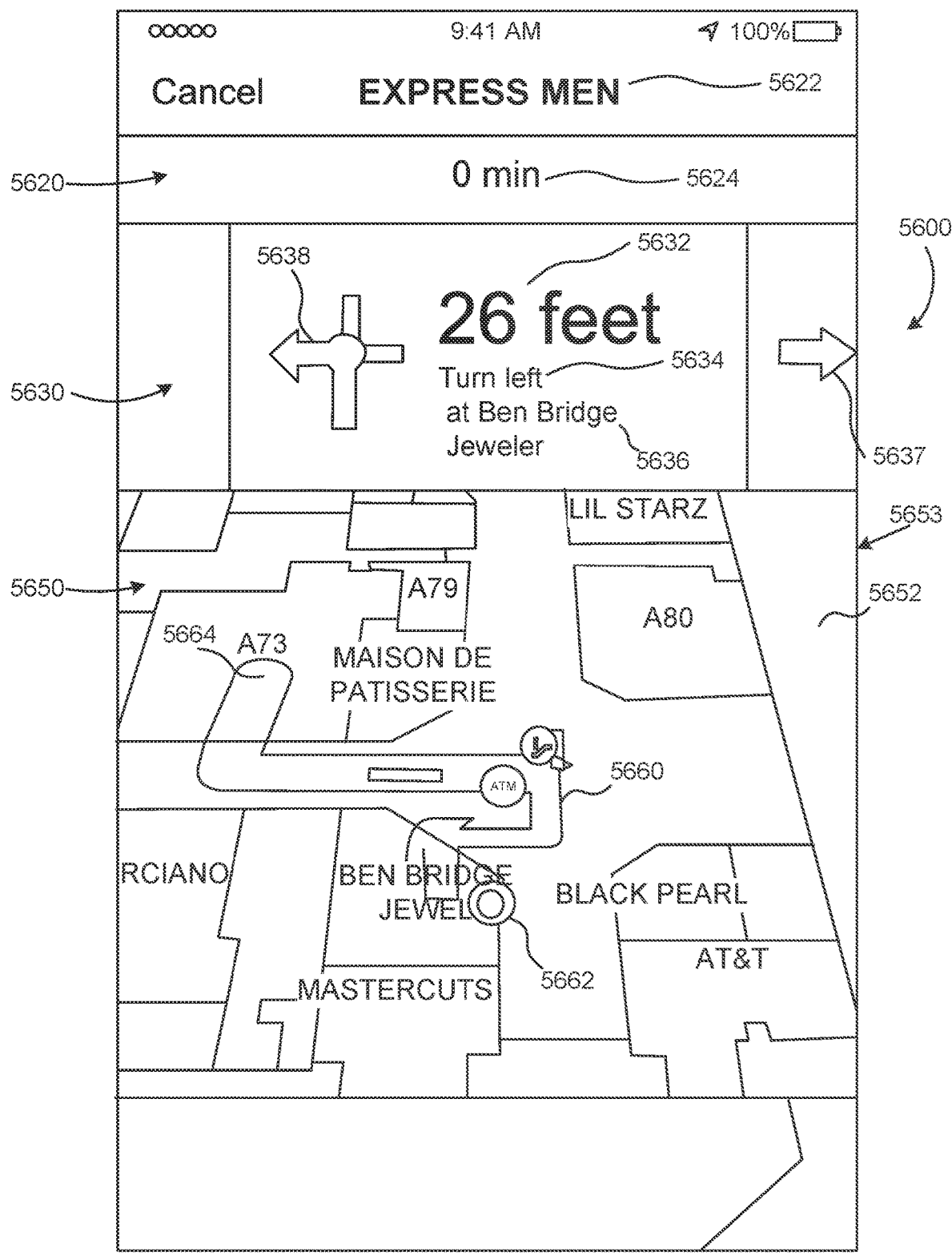
FIG. 56 is an example graphical user interface presenting a context driven indoor turn-by-turn navigation presentation for a route to an intended destination within a venue.

FIG. 56 is an example graphical user interface 5600 presenting a context driven indoor turn-by-turn navigation presentation for route 5660 to intended destination 5664 within a venue. In the illustrated embodiment, GUI 5600 includes first display area 5620 providing first field 5622 identifying intended destination 5664 as "Express Men," by way of example. First display area 5620 also includes second field 5622 indicating that intended destination 5664 is 0 minutes away in this example.

In some implementations, GUI 5600 includes second display area 5630 for providing turn-by-turn instructions and other information for route 5660 to intended destination 5664. For example, second display area 5630 includes field 5632 presenting the distance to the next maneuver in route 5660. Field 5632 decrements the distance if the user is on-route and is heading towards intended destination 5664. Field 5632, however, will increment the distance if the user is off-route or is heading in the wrong direction. Thus, field 5632 is useful in orienting the user during route 5660.

Second display area 5630 also includes field 5634 describing the next maneuver as e.g., a left turn and field 5636 identifying where the next maneuver is to be made (e.g., "at Ben Bridge Jeweler"). Graphic 5638 may also be provided to illustrate the next maneuver on route 5660. In some implementations, second display area 5630 includes selector 5637 allowing a user to view a maneuver that occurs after the next scheduled maneuver, thus providing the user with a method for peeking ahead at subsequent instructions.

In some implementations, GUI 5600 includes third display area 5650 for presenting graphical view 5653 of route 5660. Graphical view 5653 includes map 5652, which can be an indoor map as disclosed herein. Graphical view 5653 presents route 5660 between current location puck 5662 and intended destination 5664. In the illustrated example, map application 132 has determined that graphical view 5653 is suitable based on the context of the current maneuver and layout within map 5652. However, as the user traverses route 5660, the context may change and the view presented by map application 132 may need to be changed.

Figure 57:
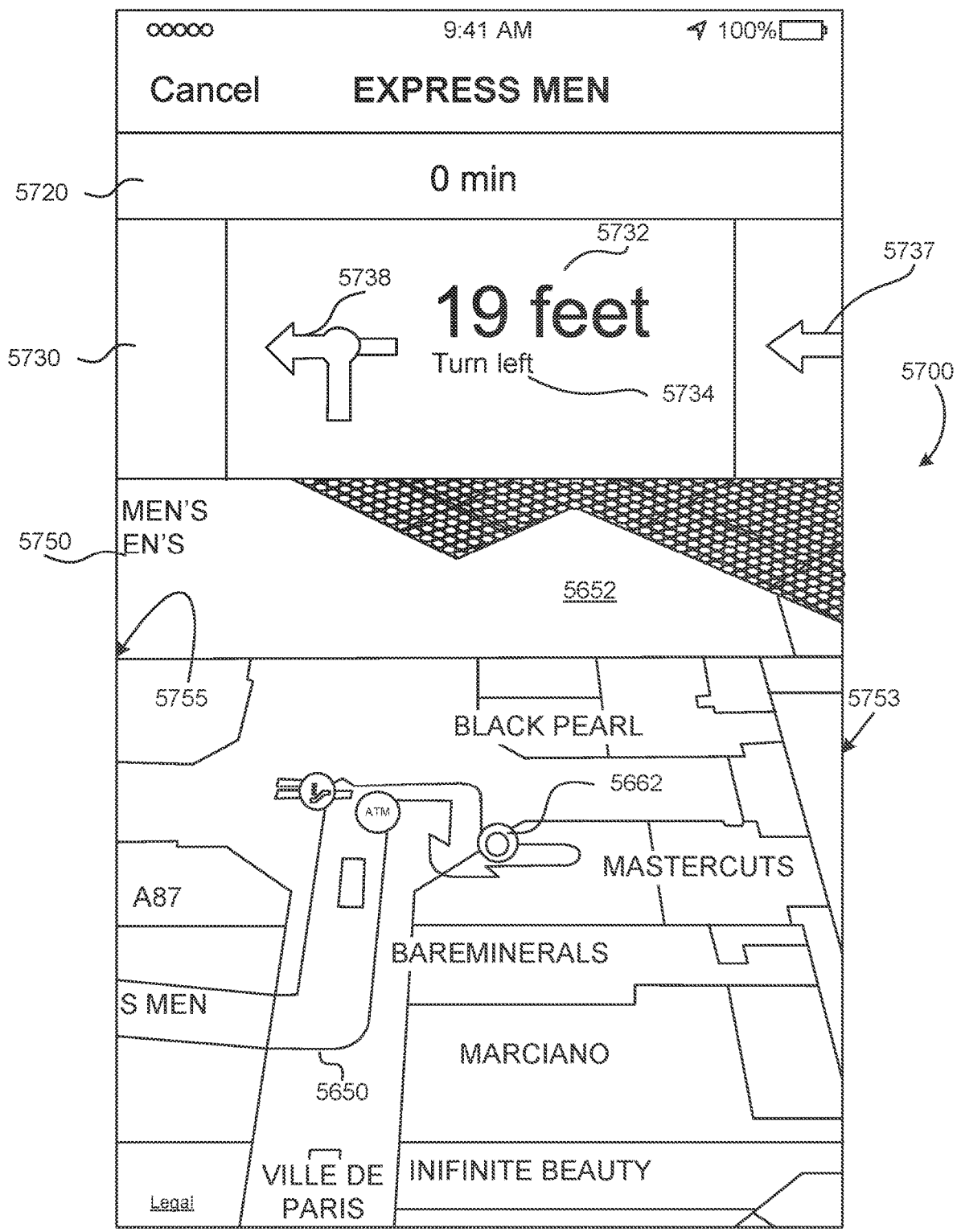
FIG. 57 is an example graphical user interface presenting a rotated graphical view of the indoor route of FIG. 56.

FIG. 57 is an example graphical user interface 5700 presenting a rotated graphical view 5753 of indoor route 5660. In the illustrated example, graphical view 5753 represents a counter-clockwise rotation of map 5652 shown in graphical view 5653 (FIG. 56) as indicated by arrow 5755. In the illustrated example, the change was introduced as a response to one or more attributes of the maneuver or venue structure along route 5660.

GUI 5700 includes first display are 5720, which in the illustrated example is unchanged from first display area 5620 of GUI 5600. GUI 5700 also includes second display area 5730 for providing turn-by-turn instructions and other information for route 5660. For example, second display area 5730 includes field 5732 presenting the distance to the next maneuver in route 5660. Field 5732 decrements the distance if the user is on-route and is heading towards intended destination 5664. Field 5732, however, will increment the distance if the user is off-route or is heading in the wrong direction. Thus, field 5732 is useful in orienting the user during route 5660.

Second display area 5730 also includes field 5734 describing the next maneuver as e.g., a left turn. Graphic 5738 may also be provided to illustrate the next maneuver on route 5660. In some implementations, second display area 5730 includes selector 5737 allowing a user to view the prior maneuver. Second display area 5730 can include a selector allowing the user to view a subsequent maneuver instead.

In some implementations, GUI 5700 includes third display area 5750 for presenting graphical view 5753 of route 5660. Graphical view 5753 includes map 5652, which can be an indoor map as disclosed herein. As mentioned above, graphical view 5753 represents a counter-clockwise rotation of map 5652 shown in graphical view 5653 (FIG. 56). In the illustrated example, map application 132 has determined that graphical view 5753 is suitable based on the context of the current maneuver and layout within map 5652.

Figure 58:
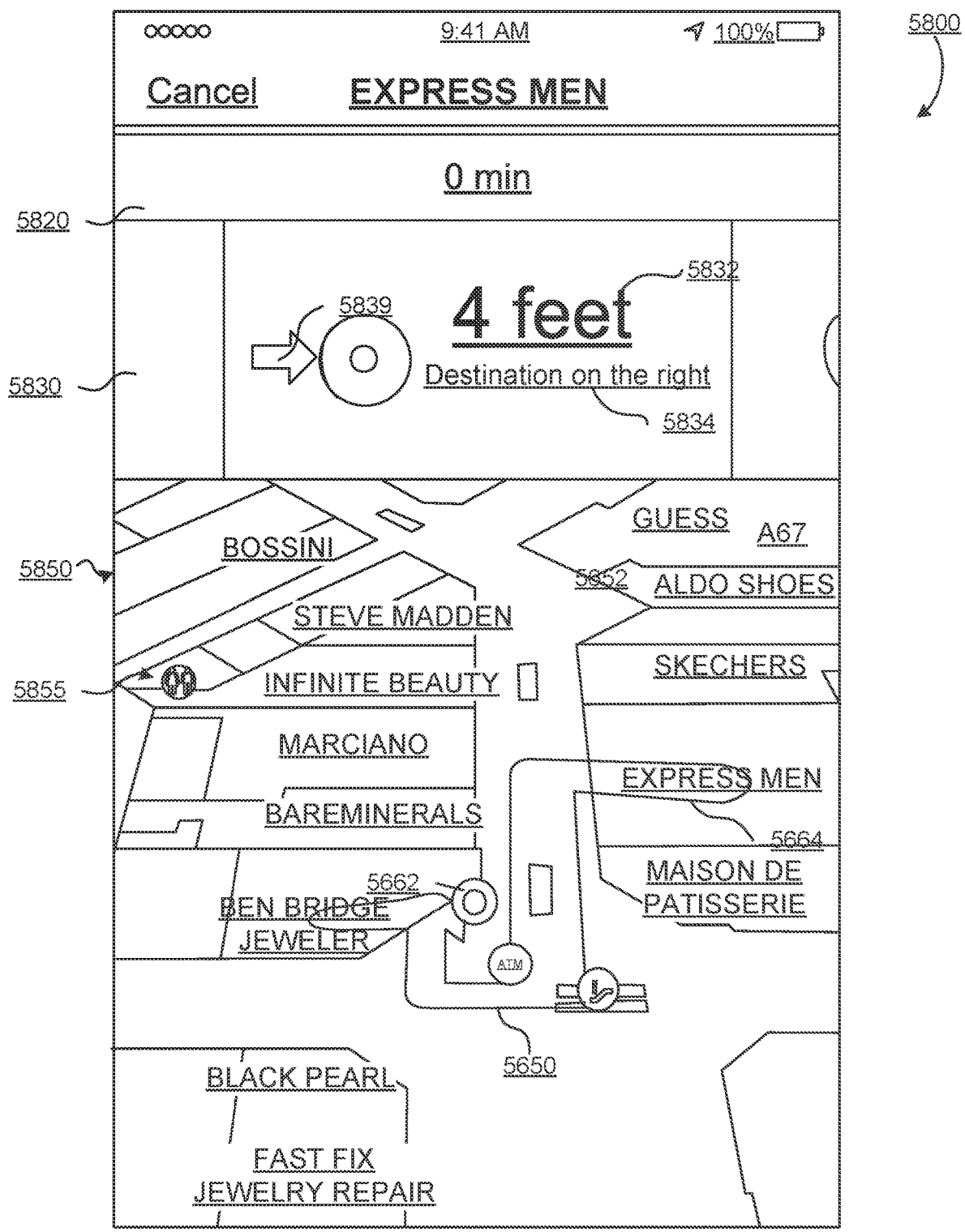
FIG. 58 is an example graphical user interface presenting another rotated graphical view of the indoor route.

FIG. 58 is an example graphical user interface 5800 presenting another rotated graphical view 5853 of indoor route 5660. In the illustrated example, graphical view 5783 represents a clockwise rotation of map 5652 shown in graphical view 5753 (FIG. 57) as indicated by arrow 5855.

In the illustrated example, the change was introduced as a response to one or more attributes of the maneuver or venue structure along route 5660.

GUI 5800 includes first display are 5820, which in the illustrated example is unchanged from first display area 5620 of GUI 5600. GUI 5800 also includes second display area 5830 for providing turn-by-turn instructions and other information for route 5660. For example, second display area 5830 includes field 5832 presenting the distance to the next maneuver in route 5660. Field 5832 decrements the distance if the user is on-route and is heading towards intended destination 5664. Field 5832, however, will increment the distance if the user is off-route or is heading in the wrong direction. Thus, field 5832 is useful in orienting the user during route 5660.

Second display area 5830 also includes field 5334 describing the next maneuver as e.g., the destination is on the right. Graphic 5838 may also be provided to illustrate that the destination is approaching.

In some implementations, GUI 5800 includes third display area 5850 for presenting graphical view 5853 of route 5660. Graphical view 5853 includes map 5652, which can be an indoor map as disclosed herein. As mentioned above, graphical view 5853 represents a clockwise rotation of map 5652 shown in graphical view 5753 (FIG. 57). In the illustrated example, map application 132 has determined that graphical view 5853 is suitable based on the context of the current maneuver and layout within map 5652.

Figure 59:
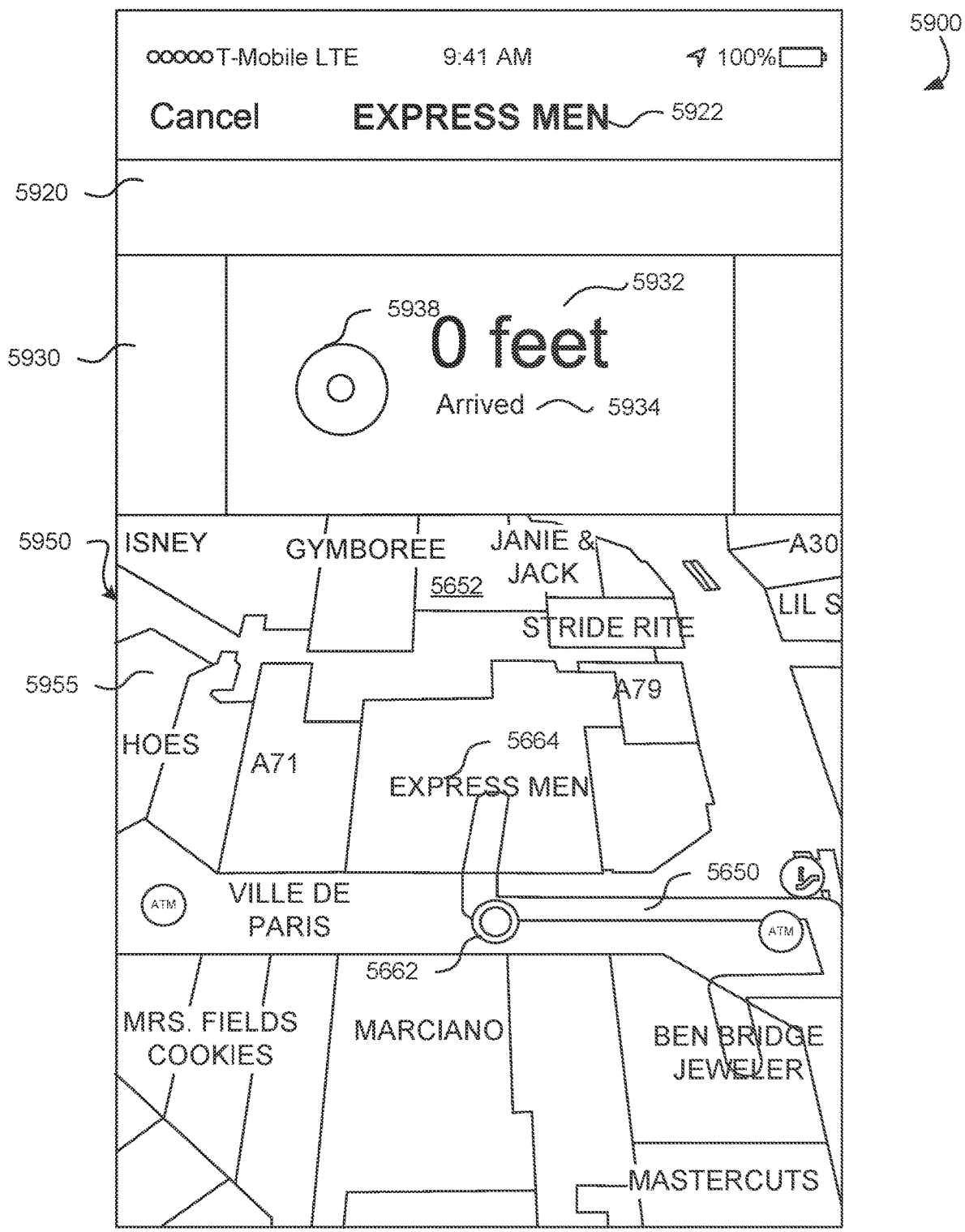
FIG. 59 is an example graphical user interface presenting another rotated graphical view of the indoor route when the user has reached intended destination.

FIG. 59 is an example graphical user interface 5900 presenting another rotated graphical view 5953 of indoor route 5660 when the user has reached intended destination 5664 (i.e., has reached the "arrived" state for route 5660). In the illustrated example, graphical view 5983 represents a counter-clockwise rotation of map 5652 shown in graphical view 5853 (FIG. 58) as indicated by arrow 5955. In the illustrated example, the change was introduced as a response to one or more attributes of the maneuver or venue structure along route 5660.

GUI 5900 includes first display are 5920, which in the illustrated example includes field 5922 identifying intended destination 5664 as "Express Men," by way of example. GUI 5900 also includes second display area 5930 for providing information at the arrived state of route 5660. For example, second display area 5930 includes field 5932 presenting the distance to the destination, which is 0 feet since the destination has been reached. Second display area 5930 also includes field 5334 indicating that the user has arrived at the destination. Graphic 5938 may also be provided to illustrate that the user has reached its destination.

In some implementations, GUI 5900 includes third display area 5950 for presenting graphical view 5953 of route 5660. Graphical view 5953 includes map 5652, which can be an indoor map as disclosed herein. As mentioned above, graphical view 5953 represents a counter-clockwise rotation of map 5652 shown in graphical view 5853 (FIG. 58). In the illustrated example, map application 132 has determined that graphical view 5953 is suitable based on the context of the current maneuver and layout within map 5652.

In some implementations, map application 132 may route user device 130 inside intended destination 5664 instead of routing the user to the entrance of intended destination 5664. This may be desirable when e.g., entrances of two points of interest are adjacent each other.

In some implementations, the turn-by-turn navigation instructions will include additional information to help orient the user or to guide the user through a specific structure (i.e., a food court, open area, elevator bay) associated with a venue. For example, if the user needs to change floors and there are e.g., multiple elevator bays or other options available to change floors, map application 132 will provide an instruction such as "take an elevator to floor 3" or "proceed to floor 3." Due to uncertain nature of how the user arrives on the third floor, map application 132 must ensure the orientation of the user by providing a leading/orienting instruction such as e.g., "head towards the Apple Store" or "Sears" or some point of interest that includes prominent marking within the venue to put the user on-route. Other types of instructions could be used to properly orient the user.

In-Venue Search

Figure 60:
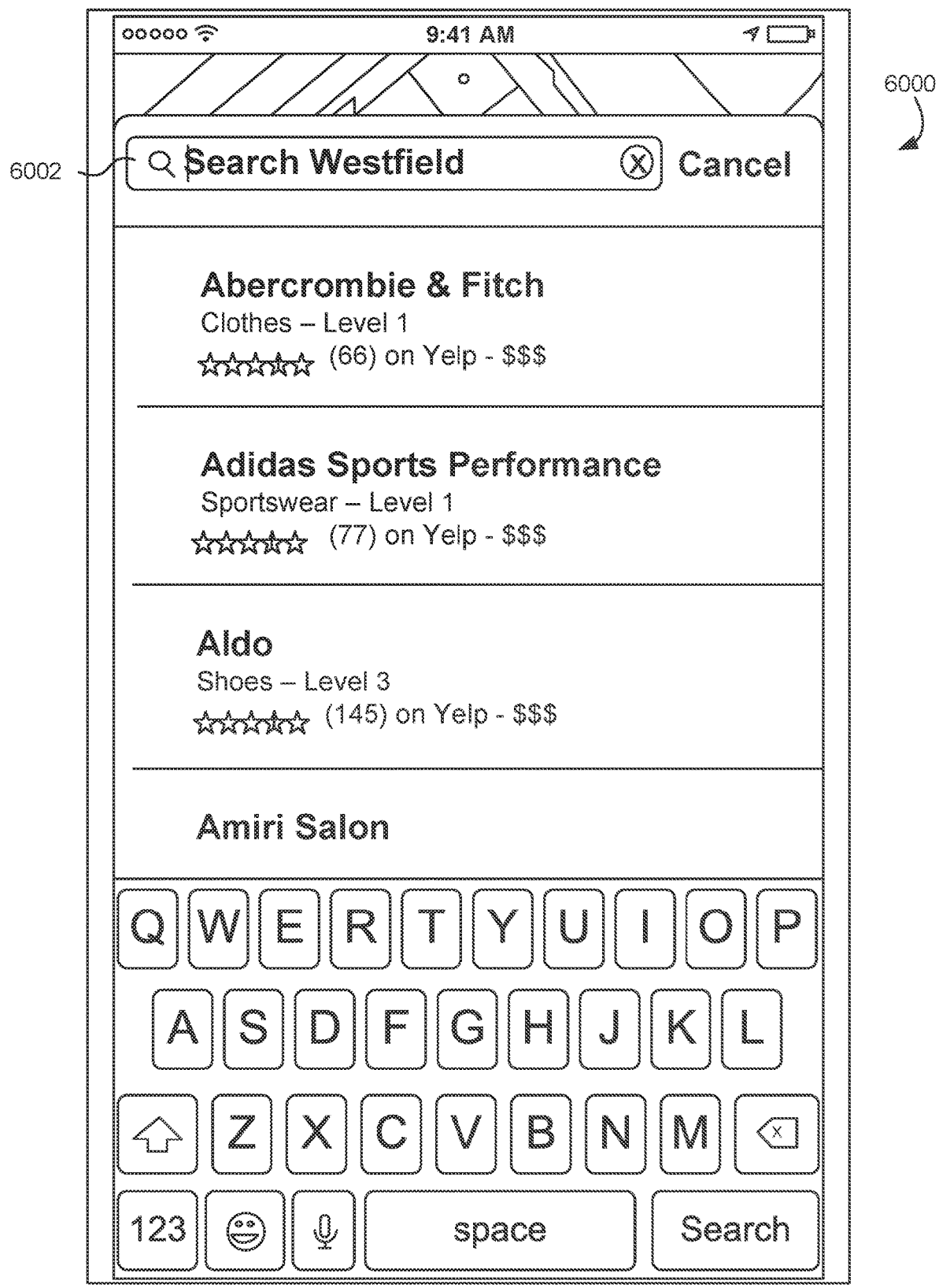
FIG. 60 illustrates an example graphical user interface that contains a manual search field for initiating a limited venue search in accordance with the disclosed principles.

As noted above with respect to FIG. 14, map application 132 can provide search selector 1476 or another field that can be used by a user to initiate a manual search for a category or specific POI within venue. When selector 1476 or the other field is selected, a user is provided with a way to perform the manual search. For example, FIG. 60 illustrates an example graphical user interface 6000 presented by map application 132 that contains a manual search field 6002 for initiating a limited venue search in accordance with the disclosed principles. GUI 6000 also includes a keyboard 6040 for entering text into field 6002.

Figure 61:
FIG. 61 illustrates an example graphical user interface with a search in progress.

FIG. 61 illustrates an example graphical user interface 6100 with a search in progress. GUI 6100 illustrates text being entered into field 6002 to initiate the search. In some implementations, map application 132 uses an auto-complete feature to suggest POIs within or in close proximity of the venues. In the illustrated example, the user has not finished typing the search query, but map application 132 has displayed listing 6150 of search results 6160 at the venue (e.g., "At Westfield") and search results 6170 nearby the venue that are populated as the user enters text into field 6002. In some implementations, search results 6160, 6170 can contain the fields, information and selectable links discussed above with respect to directory searching.

Figure 62:
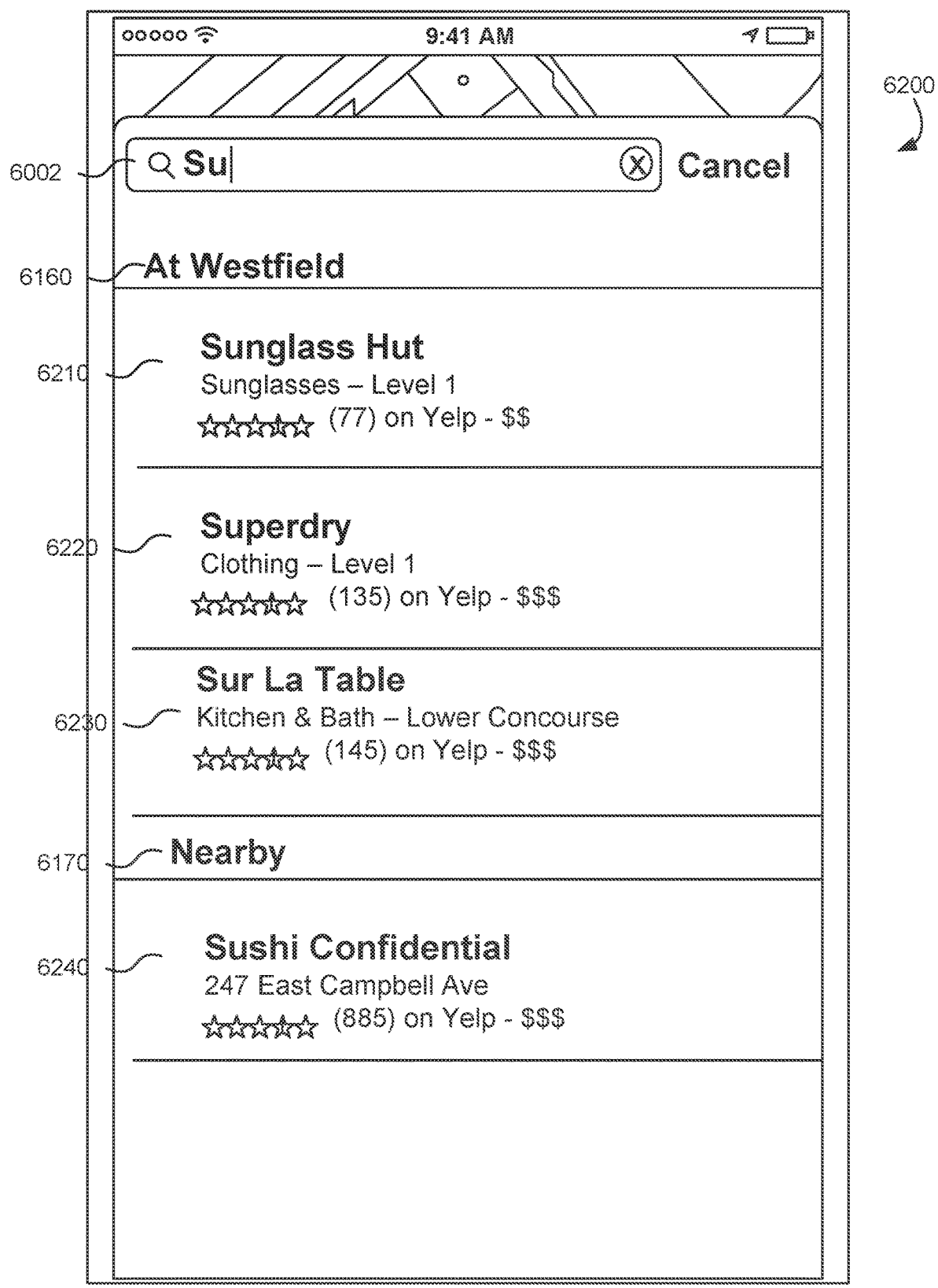
FIG. 62 illustrates an example graphical user interface with a search in progress.

FIG. 62 illustrates an example graphical user interface 6200 with a search in progress. GUI 6200 does not include the keyboard so more search results can be viewed by the user. In the illustrated example, search results 6160 contains three fields 6210, 6220, 6230 identifying POIs within the venue that match the search. In addition, search results 6170 includes one field 6240 identifying one POI located outside the venue. As discussed above, search results can be prioritized differently based on whether the user is inside or outside the venue. For example, when inside a venue, the search results can be prioritized based on prior user activity, information included on the user's device (e.g., loyalty card information in emails, text messages, contacts), calendar information, a particular POI, etc., or a store credit card enrolled in Apple pay or another electronic wallet application. When outside a venue, the search results can be prioritized such that a venue with an inside view is listed first. Alternatively, when outside a venue, the search results can be prioritized such that a venue with an inside view is listed normally among other search results with no preference over the other search results.

Figure 63:
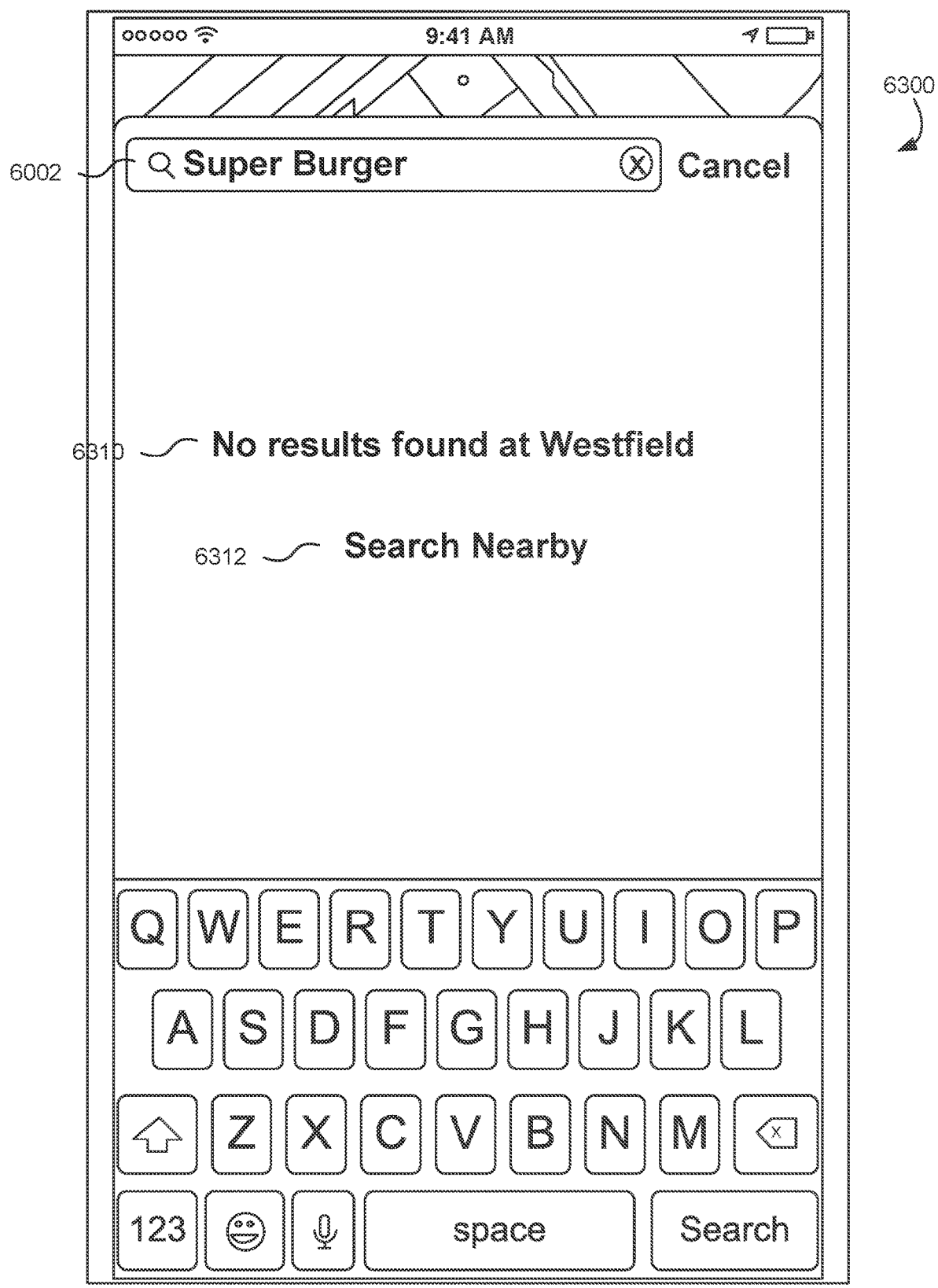
FIG. 63 illustrates an example graphical user interface presented when there are no search results within the venue.

FIG. 63 is an example graphical user interface 6300 presented when there are no search results within the venue. For example, GUI 6300 include textual indicator 6310 indicating that there are no search results within the venue. To allow the user to search for the POI in the nearby proximity of the venue, GUI 6300 includes selector 6312 which can be used to initiate a search for the POI outside of the current venue.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 64:
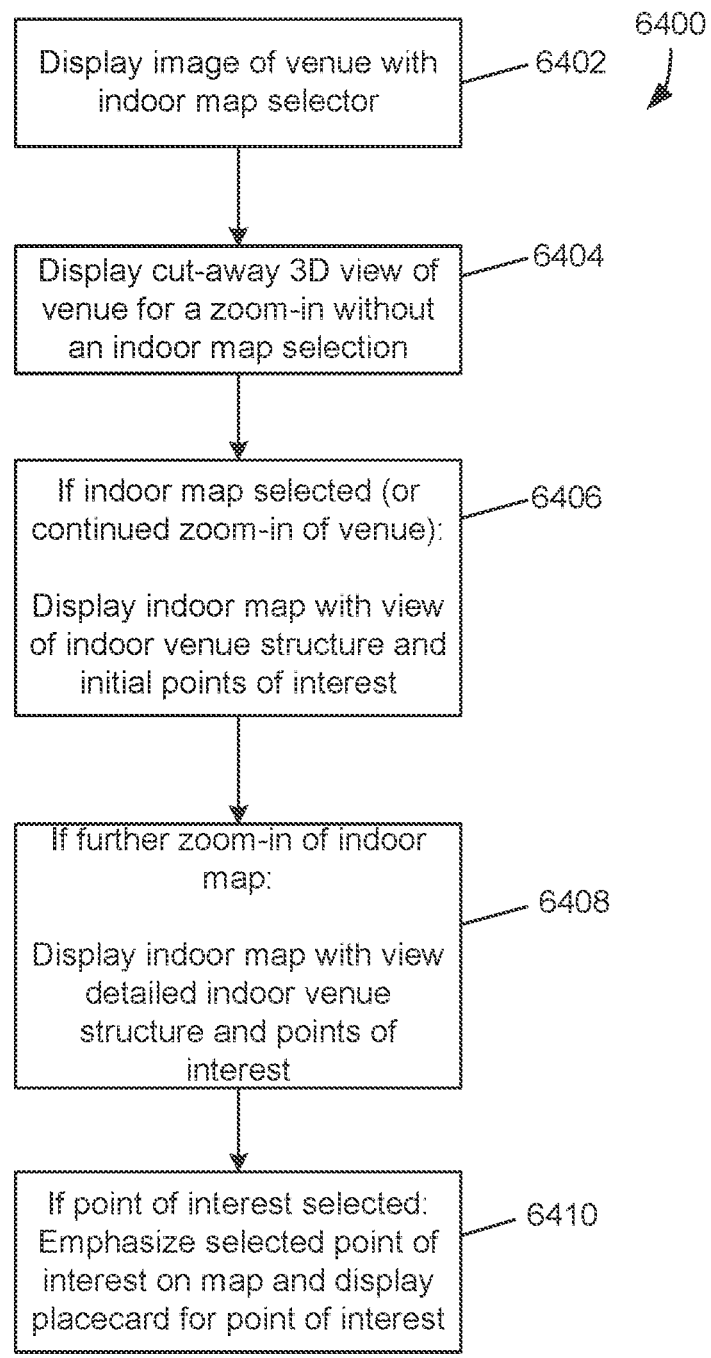
FIG. 64 is a flow diagram of an example process for presenting an indoor map for a venue in accordance with the disclosed principles.

FIG. 64 is a flow diagram of an example process 6400 for presenting an indoor map for a venue in accordance with the disclosed principles. For example, process 6400 can be performed by map application 132 running on user device 130.

At step 6402, map application 132 can present a graphical user interface displaying an outdoor map with an image of one or more venues having an indoor map selector. For example, map application 132 can present GUI 200 of FIG. 2, GUI 300 of FIG. 3, GUI 800 of FIG. 8, or GUI 900 of FIG. 9.

At step 6404, map application 132 can present a graphical user interface displaying a cut-away 3D view of a venue based upon a zoom-in operation performed by a user using user device 130. For example, map application 132 can present GUI 400 of FIG. 4.

At step 6406, in response to a selection of an indoor map selector (e.g., selector 312 of FIG. 3 or FIG. 4, selector 912 of FIG. 10) or a zoom-in operation of the prior GUI, map application 132 can present a graphical user interface displaying an indoor map illustrating the indoor structure of the venue as well as an initial set of points of interest. For example, map application 132 can present GUI 500 of FIG. 5 or GUI 1000 of FIG. 10. The initial set of points of interest can be determined and displayed as discussed herein with respect to FIGS. 43-47 and process 6450 of FIG. 64A.

At step 6408, in response to a zoom-in operation of a prior GUI illustrating an indoor map (e.g., map 502 of FIG. 5 or map 1002 of FIG. 10), map application 132 can present a graphical user interface displaying an indoor map illustrating a detailed view of the venue's structure and points of interest. For example, map application 132 can present GUI 600 of FIG. 6.

At step 6410, in response to a selection of a specific point of interest on an indoor map (e.g., POI 610 of FIG. 6), map application 132 can present a graphical user interface emphasizing the selected point of interest. In addition, the graphical user interface can have a placecard of the selected point of interest. For example, map application 132 can present GUI 700 of FIG. 7.

As noted above, some points of interest can have their own indoor map or sub-map (e.g., POI 1020 of FIG. 11) that can be selected by a user. Accordingly, at step 6012, in response to a selection of a POI's indoor map selector (e.g., selector 1128 of FIG. 11) or a zoom-in operation of the point of interest, map application 132 can present a graphical user interface displaying an indoor map of the point of interest (i.e., venue sub-map) illustrating the indoor structure of the point of interest as well as an initial set of points of interest within that point of interest. For example, map application 132 can present GUI 1200 of FIG. 12.

Figure 64A:
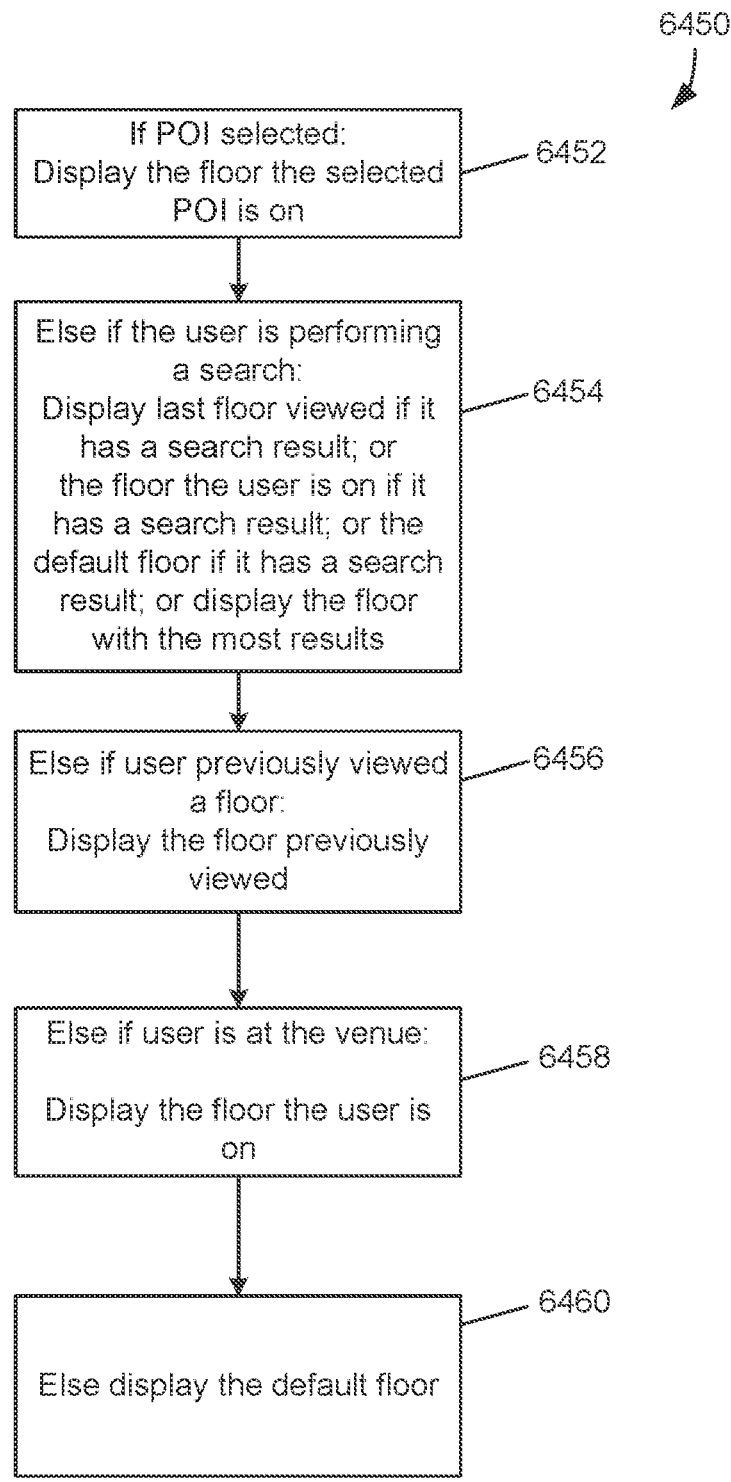
FIG. 64A is a flow diagram of an example process 6050 for determining and presenting a floor with an initial set of points of interest in accordance with the disclosed principles.

FIG. 64A is a flow diagram of an example process 6450 for determining and presenting a floor with an initial set of points of interest in accordance with the disclosed principles. At step 6452, map application 132 determines is a POI was selected from any GUI. If a POI was selected, map application 132 presents a graphical user interface displaying the floor containing the selected POI.

If it was determined at step 6452 that a POI was not selected, at step 6454, map application 132 determines if the user is performing a search operation. If a search operation is being performed, map application can present a graphical user interface displaying the last floor viewed by the user if it has a search result, the floor the user is on if it has a search result, the default floor for the venue if it has a search result, or the floor with the most search results.

If it was determined at step 6454 that the user is not performing a search, at step 6456, map application 132 determines if the user previously viewed a floor. If the user previously viewed a floor, map application can present a graphical user interface displaying the floor previously viewed by the user.

If it was determined at step 6456 that the user did not previously view a floor, map application 132, at step 6458, determines if the user is at the venue. If the user is at the venue, map application 132 can present a graphical user interface displaying the floor the user is on.

If it was determined at step 6458 that the user is not at the venue, map application 132, at step 6460 can present a graphical user interface displaying the default floor for the venue.

Figure 65:
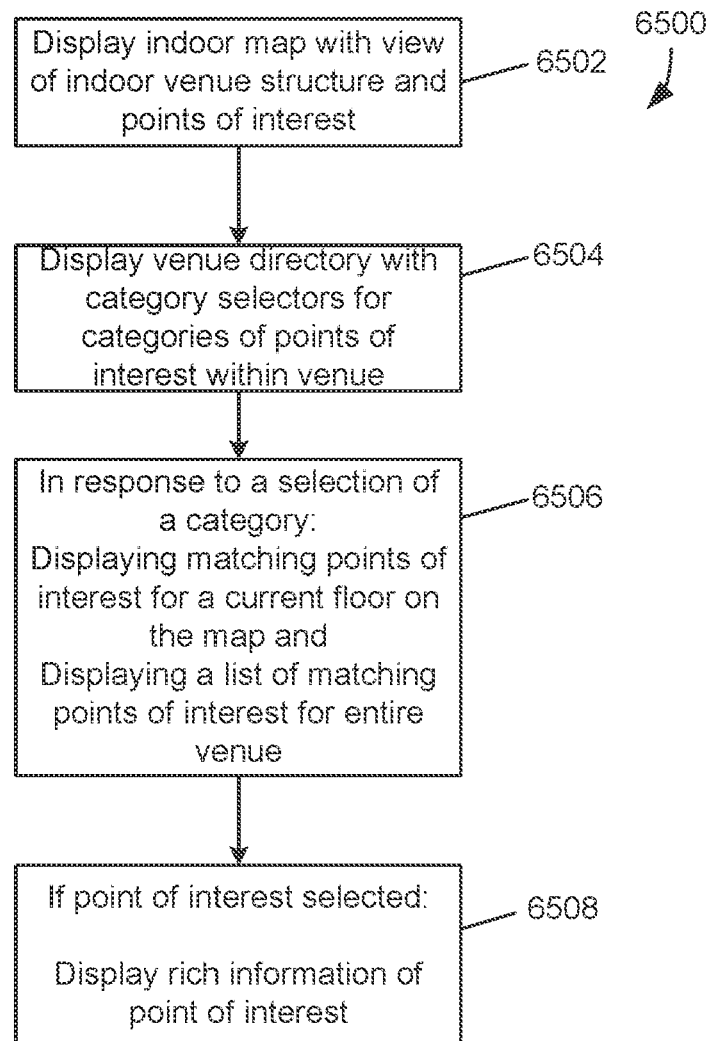
FIG. 65 is a flow diagram of an example process for presenting a venue directing and providing searching for points of interest within a venue in accordance with the disclosed principles.

FIG. 65 is a flow diagram of an example process 6500 for presenting a venue directing and providing searching for points of interest within a venue in accordance with the disclosed principles. For example, process 6500 can be performed by map application 132 running on user device 130.

At step 6502, map application 132 can present a graphical user interface displaying an indoor map illustrating the indoor structure of the venue as well as points of interest within the venue. For example, map application 132 can present GUI 1300 of FIG. 13, GUI 1400 of FIG. 14, or GUI 2300 of FIG. 23. Map application can perform the same step for a sub-map associated with a specific point of interest. For example, map application can present GUI 2600 of FIG. 26.

At step 6504, map application 132 will also present a venue directory within the graphical user interface presented at step 6502. For example, map application 132 can present GUI 1400 of FIG. 14 or GUI 2300 of FIG. 23. Map application can perform the same step for a point of interest directory of a sub-map associated with a specific point of interest. For example, map application can present GUI 2600 of FIG. 26 or GUI 2700 of FIG. 27.

At step 6506, in response to a selection of a specific category of points of interest (e.g., one of category selectors 1462, 1464, 1466, 1468, 1470, 1472 or 1474 of FIG. 14 or one of category selectors 2362, 2364, or 2366 of FIG. 23), map application 132 can present a graphical user interface emphasizing points of interest on a current floor of the venue that match the selected category. In addition, the graphical user interface will include a list of all points of interest with the venue that match the selected category. For example, map application 132 can present GUI 1500 of FIG. 15, GUI 1600 of FIG. 16, GUI 1700 of FIG. 17, GUI 1800 of FIG. 18, GUI 1900 of FIG. 19, GUI 2400 of FIG. 24, GUI 2500 of FIG. 25, GUI 2800 of FIG. 28, or GUI 3000 of FIG. 30.

In some implementations, map application 132 can present a floor switcher (e.g., floor switcher 2120 of FIG. 21) allowing the user to switch from the current floor to a different floor, including floors that also contains POIs matching the selected POI category. For example, map application 132 can present GUI 2100 of FIG. 21 or GUI 2200 of FIG. 22.

At step 6508, in response to a selection of a specific points of interest from the map or from the list presented at step 6506, map application 132 can present a graphical user interface comprising rich information concerning the selected point of interest. For example, map application 132 can present GUI 2000 of FIG. 20 or GUI 2900 of FIG. 29.

Figure 66:
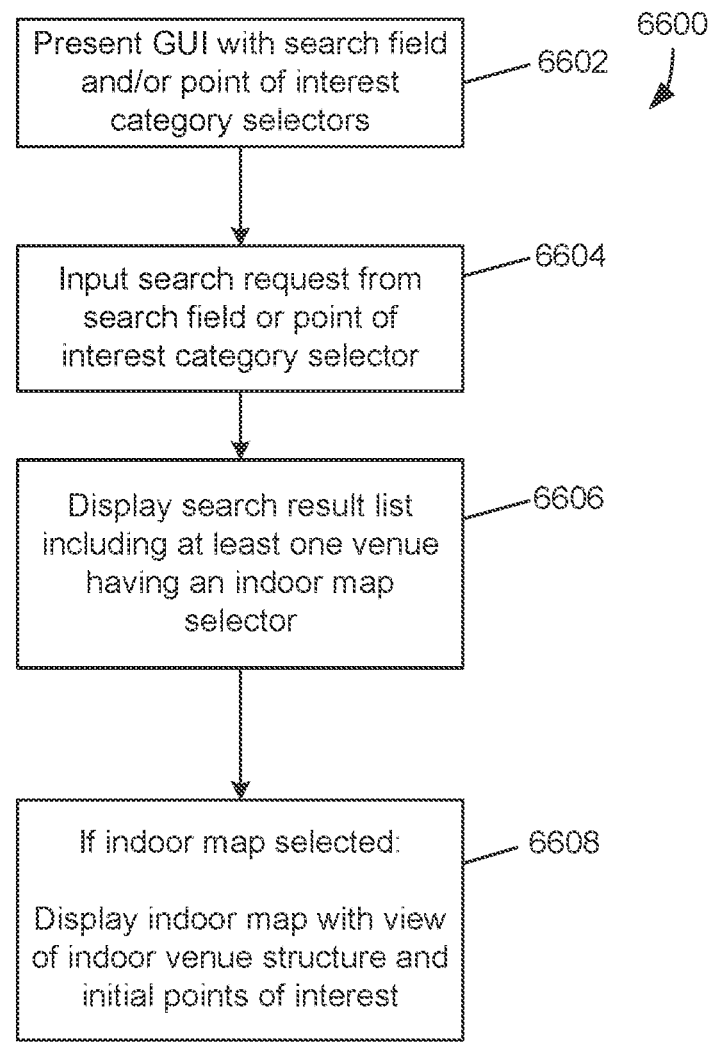
FIG. 66 is a flow diagram of an example process for providing venue searching in accordance with the disclosed principles.

FIG. 66 is a flow diagram of an example process 6600 for providing venue searching in accordance with the disclosed principles. For example, process 6600 can be performed by map application 132 running on user device 130. In addition to, or alternatively, process 6600 can be performed by an external application (e.g., web browser, search application, voice commands through an intelligent personal assistant) on user device 130 that will receive input from map application 132.

At step 6602, map application 132 or external application can present a graphical user interface displaying a search field and/or point of interest category selectors for performing a search of venue, item or category of points of interest as described herein. For example, map application 132 can present GUI 3100 of FIG. 31, GUI 3200 of FIG. 32, GUI 3300 of FIG. 33 or GUI 3400 of FIG. 34. A browser application, e.g., could present GUI 3500 of FIG. 35. A search application could present GUI 3600 of FIG. 36. An intelligent personal assistant could present GUI 3700 of FIG. 37.

At step 6604, map application 132 or external application can input a search request via the graphical user interface presented at step 6602. At step 6606, map application 132 or external application can display search results on the graphical user interface presented at step 6602. At least one search result will be a venue having an indoor map in accordance with the disclosed principles.

At step 6608, in response to a selection of an indoor map selector (e.g., selector 3267 of FIG. 32, selector 3367 of FIG. 33, selector 3467 of FIG. 34, selector 3567 of FIG. 35, selectors 3667 or 3677 of FIG. 36 or selectors 3767 or 3777 of FIG. 37), map application 132 can present a graphical user interface displaying an indoor map illustrating the indoor structure of the venue as well as an initial set of points of interest. For example, map application 132 can present GUI 500 of FIG. 5 or GUI 1000 of FIG. 10. The initial set of points of interest can be determined and displayed as discussed herein with respect to FIGS. 43-47 and process 6450 of FIG. 64A.

Figure 67:
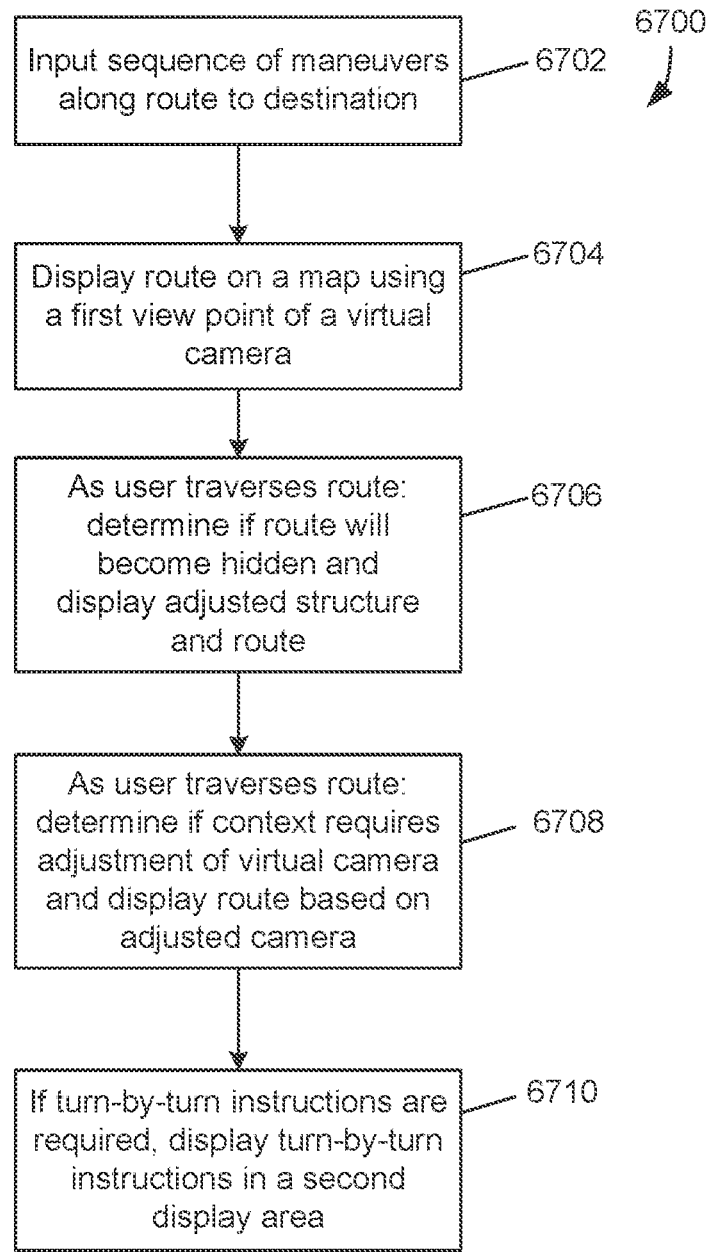
FIG. 67 is a flow diagram of an example process for providing indoor routing and context driven navigational routing within a venue in accordance with the disclosed principles.

FIG. 67 is a flow diagram of an example process 6700 for providing indoor routing and context driven navigational routing within a venue in accordance with the disclosed principles. For example, process 6700 can be performed by map application 132 running on user device 130.

At step 6702, map application 132 inputs the sequence of maneuvers for a route to a destination. In some implementations, the sequence of instructions are input from map service 104 over network 120.

At step 6704, map application 132 presents a graphical user interface comprising a view of the route based on a first view point of a virtual camera. For example, map application 132 can present GUI 5000 of FIG. 50, GUI 5100 of FIG. 51, GUI 5500 of FIG. 55 or GUI 5600 of FIG. 56.

At step 6706, and as the user is traversing the route, map application 132 determines if the any portion of route will be obstructed or hidden from view. If so, map application 132 presents a graphical user interface comprising a view of the route with adjusted structure for the route. For example, map application 132 can present GUI 5200 of FIG. 52, GUI 5300 of FIG. 53, or GUI 5400 of FIG. 54.

At step 6708, and as the user is traversing the route, map application 132 determines if the context of the user's position, next maneuver and/or venue structure requires adjustment of the virtual camera to ensure that the route remains visible. If an adjustment is required, map application 132 presents a graphical user interface comprising a view of the route at the adjusted view of the virtual camera. For example, map application 132 can present GUI 5600 of FIG. 56, GUI 5700 of FIG. 57, GUI 5800 of FIG. 58, or GUI 5900 of FIG. 59.

At step 6710, if the user requested turn-by-turn indoor navigation instructions map application 132 can display turn-by-turn indoor navigation instructions in a second display area in the graphical user interface. For example, map application 132 can present GUI 5600 of FIG. 56, GUI 5700 of FIG. 57, GUI 5800 of FIG. 58, or GUI 5900 of FIG. 59.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 68:
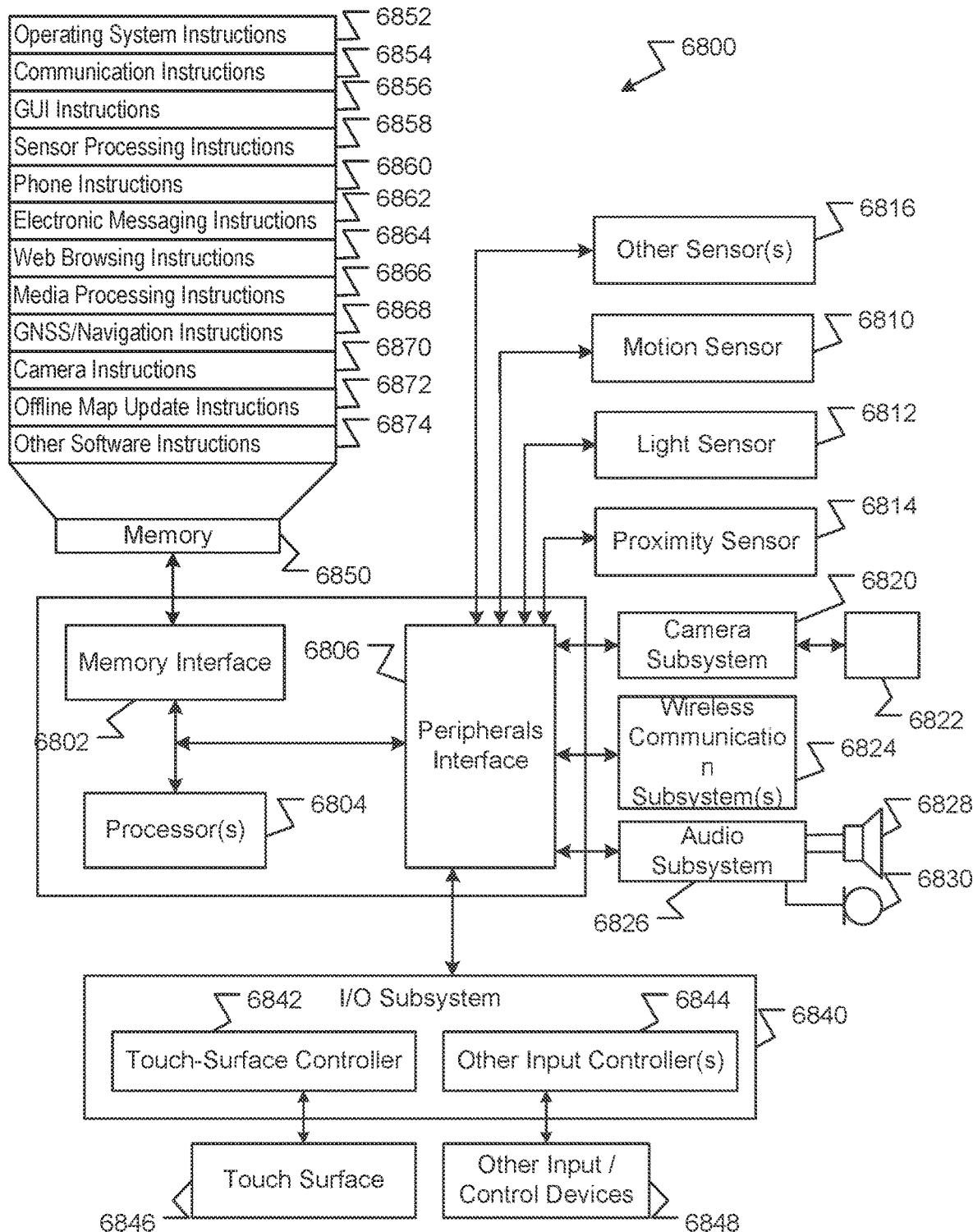
FIG. 68 is a block diagram of an example computing device that can implement the features and processes of FIGS. 1-67.

FIG. 68 is a block diagram of an example computing device 6800 that can implement the features and processes of FIGS. 1-67. The computing device 6800 can include a memory interface 6802, one or more data processors, image processors and/or central processing units 6804, and a peripherals interface 6806. The memory interface 6802, the one or more processors 6804 and/or the peripherals interface 6806 can be separate components or can be integrated in one or more integrated circuits. The various components in the computing device 6800 can be coupled by one or more communication buses or signal lines.

Sensors, devices, and subsystems can be coupled to the peripherals interface 6806 to facilitate multiple functionalities. For example, a motion sensor 6810, a light sensor 6812, and a proximity sensor 6814 can be coupled to the peripherals interface 6806 to facilitate orientation, lighting, and proximity functions. Other sensors 6816 can also be connected to the peripherals interface 6806, such as a global navigation satellite system (GNSS) (e.g., GPS receiver), a temperature sensor, a biometric sensor, magnetometer or other sensing device, to facilitate related functionalities.

A camera subsystem 6820 and an optical sensor 6822, e.g., a charged coupled device (CCD) or a complementary metal-oxide semiconductor (CMOS) optical sensor, can be utilized to facilitate camera functions, such as recording photographs and video clips. The camera subsystem 6820 and the optical sensor 6822 can be used to collect images of a user to be used during authentication of a user, e.g., by performing facial recognition analysis.

Communication functions can be facilitated through one or more wireless communication subsystems 6824, which can include radio frequency receivers and transmitters and/or optical (e.g., infrared) receivers and transmitters. The specific design and implementation of the communication subsystem 6824 can depend on the communication network(s) over which the computing device 6800 is intended to operate. For example, the computing device 6800 can include communication subsystems 6824 designed to operate over a GSM network, a GPRS network, an EDGE network, a Wi-Fi or WiMax network, and a Bluetooth™ network. In particular, the wireless communication subsystems 6824 can include hosting protocols such that the device 130 can be configured as a base station for other wireless devices.

An audio subsystem 6826 can be coupled to a speaker 6828 and a microphone 6830 to facilitate voice-enabled functions, such as speaker recognition, voice replication, digital recording, and telephony functions. The audio subsystem 6826 can be configured to facilitate processing voice commands, voiceprinting and voice authentication, for example.

The I/O subsystem 6840 can include a touch-surface controller 6842 and/or other input controller(s) 6844. The touch-surface controller 6842 can be coupled to a touch surface 6846. The touch surface 6846 and touch-surface controller 6842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 6846.

The other input controller(s) 6844 can be coupled to other input/control devices 6848, such as one or more buttons, rocker switches, thumb-wheel, infrared port, USB port, and/or a pointer device such as a stylus. The one or more buttons (not shown) can include an up/down button for volume control of the speaker 6828 and/or the microphone 6830.

In one implementation, a pressing of the button for a first duration can disengage a lock of the touch surface 6846; and a pressing of the button for a second duration that is longer than the first duration can turn power to the computing device 6800 on or off. Pressing the button for a third duration can activate a voice control, or voice command, module that enables the user to speak commands into the microphone 6830 to cause the device to execute the spoken command. The user can customize a functionality of one or more of the buttons. The touch surface 6846 can, for example, also be used to implement virtual or soft buttons and/or a keyboard.

In some implementations, the computing device 6800 can present recorded audio and/or video files, such as MP3, AAC, and MPEG files. In some implementations, the computing device 6800 can include the functionality of an MP3 player, such as an iPod™. The computing device 6800 can, therefore, include a 36-pin connector that is compatible with the iPod. Other input/output and control devices can also be used.

The memory interface 6802 can be coupled to memory 6850. The memory 6850 can include high-speed random access memory and/or non-volatile memory, such as one or more magnetic disk storage devices, one or more optical storage devices, and/or flash memory (e.g., NAND, NOR). The memory 6850 can store an operating system 6852, such as Darwin, RTXC, LINUX, UNIX, OS X, WINDOWS, or an embedded operating system such as VxWorks.

The operating system 6852 can include instructions for handling basic system services and for performing hardware dependent tasks. In some implementations, the operating system 6852 can be a kernel (e.g., UNIX kernel). In some implementations, the operating system 6852 can include instructions for performing voice authentication. For example, operating system 6852 can implement the venue and indoor map features as described with reference to FIGS. 1-67.

The memory 6850 can also store communication instructions 6854 to facilitate communicating with one or more additional devices, one or more computers and/or one or more servers. The memory 6850 can include graphical user interface instructions 6856 to facilitate graphic user interface processing; sensor processing instructions 6858 to facilitate sensor-related processing and functions; phone instructions 6860 to facilitate phone-related processes and functions; electronic messaging instructions 6862 to facilitate electronic-messaging related processes and functions; web browsing instructions 6864 to facilitate web browsing-related processes and functions; media processing instructions 6866 to facilitate media processing-related processes and functions; GNSS/Navigation instructions 6868 to facilitate GNSS and navigation-related processes and instructions; and/or camera instructions 6870 to facilitate camera-related processes and functions.

The memory 6850 can store other software instructions 6872 to facilitate other processes and functions, such as the venue and indoor map processes and functions as described with reference to FIGS. 1-67.

The memory 6850 can also store other software instructions 6874, such as web video instructions to facilitate web video-related processes and functions; and/or web shopping instructions to facilitate web shopping-related processes and functions. In some implementations, the media processing instructions 6866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 6850 can include additional instructions or fewer instructions. Furthermore, various functions of the computing device 6800 can be implemented in hardware and/or in software, including in one or more signal processing and/or application specific integrated circuits.

What is claimed is:

1. A method implemented by a mapping application executing on a mobile device having a display screen, the method comprising:
    receiving, by the mapping application, indication of a destination within a venue;
    identifying, by the mapping application, an indoor route to navigate to the destination within the venue;
    monitoring, by the mapping application, a current position of a computing device within the venue as the computing device traverses the route;
    determining, by the mapping application, a current context within the venue based on the current position of the computing device along the route;
    presenting, by the mapping application, a navigation presentation on a display screen that guides a user along the route, the navigation presentation including a map; and
    dynamically adjusting, by the mapping application, the map of the navigation presentation to account for the current context within the venue as the computing device traverses the route;
    wherein dynamically adjusting, by the mapping application, the map of the navigation presentation comprises at least one of:
    (a) graying out and/or showing in phantom a particular structure of a plurality of structures in the venue, wherein the particular structure is dynamically selected, by the mapping application, based on a selection criteria for dynamic adjustment;
    (b) separating floors, in the map, to corresponding separate illustrations;
    (c) repositioning a floor in the map; or
    (d) rotating a floor in the map.

2. The method as recited in claim 1, wherein dynamically adjusting the map of the navigation presentation comprises:
    determining, by the mapping application, that the route will be hidden from view by at least one structure along the route; and
    in response to the determination: superimposing, by the mapping application, the route in front of the at least one structure from a perspective of a virtual camera used to generate a viewpoint for the map of the navigation presentation.

3. The method as recited in claim 1, wherein dynamically adjusting the map of the navigation presentation comprises:
    changing, by the mapping application, a style of a virtual camera used to generate viewpoint for the map of the navigation presentation based on the current context within the venue.

4. The method as recited in claim 1, wherein dynamically adjusting the map of the navigation presentation comprises:
    adjusting, by the mapping application, a set of attributes of a virtual camera attributes used to generate viewpoint for the navigation presentation to dynamically modify how the virtual camera captures a portion of the map.

5. The method as recited in claim 4, wherein the set of attributes of the virtual camera comprises an angular pitch for the virtual camera.

6. The method as recited in claim 4, wherein the set of attributes of the virtual camera comprises a rotation of the virtual camera.

7. The method as recited in claim 4, wherein the set of attributes of the virtual camera comprises a distance of the virtual camera from a region on the map.

8. The method of claim 1, wherein dynamically, by the mapping application, adjusting the map of the navigation presentation comprises one of: changing a perspective, changing a zoom level, and modifying a display of a structure shown in the map.

9. The method of claim 8, wherein dynamically adjusting, by the mapping application, the map of the navigation presentation comprises animating an element in the map.

10. The method of claim 8, wherein dynamically adjusting, by the mapping application, the map of the navigation presentation comprises one of: zooming in a view of a floor in the map and zooming out a view of a floor in the map.

11. The method of claim 1, wherein the particular structure is dynamically selected, by the mapping application, responsive to determining that the particular structure obstructs a view of the route.

12. The method of claim 1, wherein the particular structure is dynamically selected, by the mapping application, responsive to determining that presentation of the particular structure is unnecessary in order to display the route.

13. The method of claim 1, wherein dynamically adjusting, by the mapping application, the map of the navigation presentation comprises graying out and/or showing in phantom the particular structure of the plurality of structures in the venue, wherein the particular structure is dynamically selected, by the mapping application, based on the selection criteria for dynamic adjustment.

14. The method of claim 1, wherein dynamically adjusting, by the mapping application, the map of the navigation presentation comprises separating floors, in the map, to corresponding separate illustrations.

15. The method of claim 1, wherein dynamically adjusting, by the mapping application, the map of the navigation presentation comprises repositioning the floor in the map.

16. The method of claim 1, wherein dynamically adjusting, by the mapping application, the map of the navigation presentation comprises rotating the floor in the map.

17. A non-transitory computer-readable medium storing a mapping application, the mapping application comprising a set of instructions, that when executed by the at least one computing device, causes the at least one computing device to perform operations comprising:
  receiving, by the mapping application, indication of a destination within a venue;
  identifying, by the mapping application, an indoor route to navigate to the destination within the venue;
  monitoring, by the mapping application, a current position of a computing device within the venue as the computing device traverses the route;
  determining, by the mapping application, a current context within the venue based on the current position of the computing device along the route;
  presenting, by the mapping application, a navigation presentation on a display screen that guides a user along the route, the navigation presentation including a map; and
  dynamically adjusting, by the mapping application, the map of the navigation presentation to account for the current context within the venue as the computing device traverses the route;
  wherein dynamically adjusting, by the mapping application, the map of the navigation presentation comprises at least one of:
  (a) graying out and/or showing in phantom a particular structure of a plurality of structures in the venue, wherein the particular structure is dynamically selected, by the mapping application, based on a selection criteria for dynamic adjustment;
  (b) separating floors, in the map, to corresponding separate illustrations;
  (c) repositioning a floor in the map; or
  (d) rotating a floor in the map.

18. The non-transitory computer-readable medium as recited in claim 17, wherein dynamically adjusting the map of the navigation presentation comprises:
  determining, by the mapping application, that the route will be hidden from view by at least one structure along the route; and
  in response to the determination: superimposing, by the mapping application, the route in front of the at least one structure from a perspective of a virtual camera used to generate a viewpoint for the map of the navigation presentation.

19. The non-transitory computer-readable medium as recited in claim 17, wherein dynamically adjusting the map of the navigation presentation comprises:
  changing, by the mapping application, a style of a virtual camera used to generate viewpoint for the map of the navigation presentation based on the current context within the venue.

20. The non-transitory computer-readable medium as recited in claim 17, wherein dynamically adjusting the map of the navigation presentation comprises:
  adjusting, by the mapping application, a set of attributes of a virtual camera attributes used to generate viewpoint for the navigation presentation to dynamically modify how the virtual camera captures a portion of the map.

21. The non-transitory computer-readable medium as recited in claim 20, wherein the set of attributes of the virtual camera comprises an angular pitch for the virtual camera.

22. The non-transitory computer-readable medium as recited in claim 20, wherein the set of attributes of the virtual camera comprises a rotation of the virtual camera.

23. The non-transitory computer-readable medium as recited in claim 20, wherein the set of attributes of the virtual camera comprises a distance of the virtual camera from a region on the map.

24. A system comprising:
  a display screen;
  one or more processors; and
  a non-transitory computer-readable medium storing a mapping application, the mapping application comprising a set of instructions, that when executed by the one or more processors, causes the one or more processors to perform operations comprising:
    receiving, by the mapping application, indication of a destination within a venue;
    identifying, by the mapping application, an indoor route to navigate to the destination within the venue;
    monitoring, by the mapping application, a current position of a computing device within the venue as the computing device traverses the route;
    determining, by the mapping application, a current context within the venue based on the current position of the computing device along the route;
    presenting, by the mapping application, a navigation presentation on a display screen that guides a user along the route, the navigation presentation including a map; and
    dynamically adjusting, by the mapping application, the map of the navigation presentation to account for the current context within the venue as the computing device traverses the route;
    wherein dynamically adjusting, by the mapping application, the map of the navigation presentation comprises at least one of:
    (a) graying out and/or showing in phantom a particular structure of a plurality of structures in the venue, wherein the particular structure is dynamically selected, by the mapping application, based on a selection criteria for dynamic adjustment;
    (b) separating floors, in the map, to corresponding separate illustrations;
    (c) repositioning a floor in the map; or
    (d) rotating a floor in the map.

25. The system as recited in claim 24, wherein dynamically adjusting the map of the navigation presentation comprises:
- determining, by the mapping application, that the route will be hidden from view by at least one structure along the route; and
- in response to the determination: superimposing, by the mapping application, the route in front of the at least one structure from a perspective of a virtual camera used to generate a viewpoint for the map of the navigation presentation.

26. The system as recited in claim 24, wherein dynamically adjusting the map of the navigation presentation comprises:
- changing, by the mapping application, a style of a virtual camera used to generate viewpoint for the map of the navigation presentation based on the current context within the venue.

27. The system as recited in claim 24, wherein dynamically adjusting the map of the navigation presentation comprises:
- adjusting, by the mapping application, a set of attributes of a virtual camera attributes used to generate viewpoint for the navigation presentation to dynamically modify how the virtual camera captures a portion of the map.

28. The system as recited in claim 27, wherein the set of attributes of the virtual camera comprises at least one of: an angular pitch for the virtual camera and a rotation of the virtual camera.

29. The system as recited in claim 27, wherein the set of attributes of the virtual camera comprises a distance of the virtual camera from a region on the map.

* * * * *